(12) United States Patent
Bennett et al.

(10) Patent No.: US 10,793,181 B2
(45) Date of Patent: Oct. 6, 2020

(54) ALL-TERRAIN VEHICLE

(71) Applicant: Polaris Industries Inc., Medina, MN (US)

(72) Inventors: Jeffrey D. Bennett, Roseau, MN (US); Ryan K. Lovold, North Branch, MN (US); Parry G. Ragland, White Bear Lake, MN (US)

(73) Assignee: Polaris Industries Inc., Medina, MN (US)

( * ) Notice: Subject to any disclaimer, the term of this patent is extended or adjusted under 35 U.S.C. 154(b) by 212 days.

(21) Appl. No.: 15/895,495

(22) Filed: Feb. 13, 2018

(65) Prior Publication Data

US 2019/0248405 A1    Aug. 15, 2019

(51) Int. Cl.

| | |
|---|---|
| *B62D 5/04* | (2006.01) |
| *B62D 39/00* | (2006.01) |
| *B62D 21/18* | (2006.01) |
| *B62D 65/02* | (2006.01) |
| *B62D 3/12* | (2006.01) |
| *B62K 5/01* | (2013.01) |
| *B62K 21/00* | (2006.01) |

(Continued)

(52) U.S. Cl.
CPC ............ *B62D 5/0403* (2013.01); *B60G 3/20* (2013.01); *B62D 3/126* (2013.01); *B62D 5/04* (2013.01); *B62D 21/183* (2013.01); *B62D 39/00* (2013.01); *B62D 65/02* (2013.01); *B62K 5/01* (2013.01); *B62K 21/00* (2013.01); *B62K 25/04* (2013.01); *B60G 2200/144* (2013.01); *B60G 2206/011* (2013.01); *B60G 2300/07* (2013.01); *B60G 2300/124* (2013.01); *B62K 2005/001* (2013.01)

(58) Field of Classification Search
CPC .... B62D 5/0403; B62D 3/126; B62D 21/183; B62K 21/00; B62K 2005/001; B60G 2300/124
See application file for complete search history.

(56) References Cited

U.S. PATENT DOCUMENTS

| | | |
|---|---|---|
| 610,132 A | 8/1898 | Goodridge |
| 2,309,432 A | 1/1943 | Alden |

(Continued)

FOREIGN PATENT DOCUMENTS

| | | |
|---|---|---|
| AU | 2013317853 | 4/2015 |
| AU | 2015/266694 | 1/2017 |

(Continued)

OTHER PUBLICATIONS

International Search Report issued by the European Patent Office, dated Aug. 4, 2009, for International Patent Application No. PCT/US2009/045900; 3 pages.

(Continued)

*Primary Examiner* — Jacob D Knutson
*Assistant Examiner* — Michael R Stabley
(74) *Attorney, Agent, or Firm* — Faegre Drinker Biddle & Reath LLP

(57) ABSTRACT

An ATV is shown having a steering system comprised of a power steering unit having drive and driven pitman arms coupled to a drag link. The drive pitman arm is laterally offset from a vehicle centerline and is driven by the power steering unit. An alternate power steering system includes a pack and pinion subassembly coupled to a power steering motor, which then couples to steering arms of the ATV.

29 Claims, 40 Drawing Sheets

(51) Int. Cl.
  *B60G 3/20* (2006.01)
  *B62K 25/04* (2006.01)
  *B62K 5/00* (2013.01)

(56) References Cited

U.S. PATENT DOCUMENTS

| | | | |
|---|---|---|---|
| 2,553,795 A | 5/1951 | Staude | |
| 2,672,103 A | 3/1954 | Hohmes | |
| 2,834,608 A | 5/1958 | Wixson | |
| 3,259,211 A | 7/1966 | Ryskamp | |
| 3,336,074 A | 8/1967 | Barnes | |
| RE26,775 E | 1/1970 | Smieja | |
| 3,688,856 A | 9/1972 | Boehm | |
| 3,712,398 A * | 1/1973 | Althaus | B62D 55/084 180/9.48 |
| 3,712,416 A | 1/1973 | Swanson | |
| 3,814,201 A | 6/1974 | O'Brien | |
| 3,833,253 A | 9/1974 | Butler | |
| 3,840,082 A | 10/1974 | Olson | |
| 3,856,323 A | 12/1974 | Aming | |
| 3,858,902 A | 1/1975 | Howells | |
| 3,917,310 A | 11/1975 | Mitsuishi | |
| 3,933,213 A | 1/1976 | Trowbridge | |
| 3,966,014 A | 6/1976 | Gowing | |
| 3,969,895 A | 7/1976 | Krizman | |
| RE28,922 E | 8/1976 | Lloyd, III | |
| 3,977,493 A | 8/1976 | Richardson | |
| 4,027,892 A | 6/1977 | Parks | |
| 4,045,075 A | 8/1977 | Pulver | |
| 4,079,807 A * | 3/1978 | Hornagold | B60B 35/003 180/403 |
| 4,089,542 A | 5/1978 | Westerman | |
| 4,098,414 A | 7/1978 | Abiera | |
| 4,222,453 A | 9/1980 | Fixsen | |
| 4,254,746 A | 3/1981 | Chiba | |
| 4,314,618 A | 2/1982 | Tamura | |
| 4,339,156 A | 7/1982 | Livesay | |
| 4,340,124 A | 7/1982 | Leonard | |
| 4,407,386 A | 10/1983 | Yasui | |
| 4,442,913 A | 4/1984 | Grine | |
| 4,561,323 A | 12/1985 | Stromberg | |
| 4,577,716 A | 3/1986 | Norton | |
| 4,626,024 A | 12/1986 | Swann | |
| 4,627,512 A | 12/1986 | Clohessy | |
| 4,657,271 A | 4/1987 | Salmon | |
| 4,679,450 A | 7/1987 | Hayakawa | |
| 4,686,433 A | 8/1987 | Shimizu | |
| 4,695,089 A | 9/1987 | Fukutomi | |
| 4,700,982 A | 10/1987 | Kuraoka | |
| 4,782,912 A | 11/1988 | Wandless | |
| 4,821,825 A | 4/1989 | Somerton-Rayner | |
| 4,858,722 A | 8/1989 | Abe | |
| 4,917,207 A | 4/1990 | Yasui | |
| 4,934,737 A | 6/1990 | Nakatsuka | |
| 4,987,965 A | 1/1991 | Bourret | |
| 5,010,970 A | 4/1991 | Yamamoto | |
| 5,020,616 A | 6/1991 | Yagi | |
| 5,021,721 A | 6/1991 | Oshita | |
| 5,027,915 A | 7/1991 | Suzuki | |
| 5,036,939 A | 8/1991 | Johnson | |
| 5,042,835 A | 8/1991 | Burns | |
| 5,057,062 A | 10/1991 | Yamasaki | |
| 5,060,745 A | 10/1991 | Yasui | |
| 5,078,225 A | 1/1992 | Ohmura | |
| 5,078,229 A | 1/1992 | Kikuchi | |
| 5,107,951 A | 4/1992 | Kawamura | |
| 5,205,371 A | 4/1993 | Karnopp | |
| 5,251,713 A | 10/1993 | Enokimoto | |
| 5,253,730 A | 10/1993 | Hayashi | |
| 5,327,989 A | 7/1994 | Furuhashi | |
| 5,370,198 A | 12/1994 | Karpik | |
| 5,393,194 A | 2/1995 | Smith | |
| 5,429,290 A | 7/1995 | Greene | |
| 5,588,660 A | 12/1996 | Paddison | |
| 5,692,579 A | 12/1997 | Peppel | |
| 5,692,759 A | 12/1997 | Flynn | |
| 5,697,332 A | 12/1997 | Masahiro | |
| 5,704,866 A | 1/1998 | Pritchard | |
| 5,708,238 A | 1/1998 | Asao | |
| 5,727,643 A | 3/1998 | Kawano | |
| 5,753,300 A | 5/1998 | Wessels et al. | |
| 5,779,272 A | 7/1998 | Panek | |
| 5,842,732 A | 12/1998 | Daggett | |
| 5,860,486 A | 1/1999 | Boivin | |
| 5,863,277 A | 1/1999 | Melbourne | |
| 5,881,834 A | 3/1999 | Karpik | |
| 5,887,671 A | 3/1999 | Yuki | |
| 5,904,216 A | 5/1999 | Furusawa | |
| 5,944,134 A | 8/1999 | Peppel | |
| 5,947,217 A | 9/1999 | Snare | |
| 5,950,750 A | 9/1999 | Dong | |
| 5,971,434 A | 10/1999 | Neufeld | |
| 6,029,750 A | 2/2000 | Carrier | |
| 6,070,689 A | 6/2000 | Tanaka | |
| 6,092,877 A | 7/2000 | Rasidescu | |
| 6,126,227 A | 10/2000 | Romolo | |
| 6,149,540 A | 11/2000 | Johnson | |
| 6,161,853 A | 12/2000 | Jung | |
| 6,161,908 A | 12/2000 | Takayama | |
| 6,199,894 B1 | 3/2001 | Anderson | |
| 6,206,124 B1 | 3/2001 | Mallette | |
| 6,227,323 B1 | 5/2001 | Ashida | |
| 6,283,241 B1 | 9/2001 | Kubota | |
| 6,293,605 B2 | 9/2001 | Neubrand | |
| 6,321,864 B1 | 11/2001 | Forbes | |
| 6,343,578 B1 | 2/2002 | Kerkau | |
| 6,378,645 B1 | 4/2002 | Uegane | |
| 6,379,411 B1 | 4/2002 | Turner | |
| 6,390,219 B1 | 5/2002 | Vaisanen | |
| 6,412,797 B1 | 7/2002 | Park | |
| 6,416,108 B1 | 7/2002 | Elswick | |
| 6,431,569 B2 | 8/2002 | Handa | |
| 6,461,208 B2 | 10/2002 | Suzuki | |
| 6,467,561 B1 | 10/2002 | Boivin | |
| 6,467,787 B1 | 10/2002 | Marsh | |
| 6,478,098 B2 | 11/2002 | Boivin | |
| 6,520,284 B2 | 2/2003 | Spannbauer | |
| 6,551,385 B2 | 4/2003 | Turner | |
| 6,554,665 B1 | 4/2003 | Kaneko | |
| RE38,124 E | 5/2003 | Mallette | |
| 6,557,530 B1 | 5/2003 | Benson | |
| 6,557,922 B1 | 5/2003 | Hommel | |
| 6,568,030 B1 | 5/2003 | Watanabe | |
| 6,595,309 B1 | 7/2003 | Savage | |
| 6,622,968 B1 | 9/2003 | St. Clair | |
| 6,626,258 B1 | 9/2003 | Forbes | |
| 6,631,778 B2 | 10/2003 | Mallette | |
| 6,695,083 B2 | 2/2004 | Nakamura | |
| 6,695,566 B2 | 2/2004 | Rodriguez Navio | |
| 6,715,460 B2 | 4/2004 | Ashida | |
| 6,715,575 B2 | 4/2004 | Karpik | |
| 6,725,958 B2 | 4/2004 | Ashida | |
| 6,725,962 B1 | 4/2004 | Fukuda | |
| 6,745,862 B2 | 6/2004 | Morii | |
| 6,752,235 B1 | 6/2004 | Bell | |
| 6,755,271 B1 | 6/2004 | Berg | |
| 6,767,022 B1 | 7/2004 | Chevalier | |
| 6,786,526 B1 | 9/2004 | Blalock | |
| 6,796,395 B1 | 9/2004 | Berg | |
| 6,799,779 B2 | 10/2004 | Shibayama | |
| 6,799,781 B2 | 10/2004 | Rasidescu | |
| 6,823,834 B2 | 11/2004 | Benson | |
| 6,851,691 B2 * | 2/2005 | Rasidescu | B60G 3/14 280/124.135 |
| 6,916,142 B2 | 7/2005 | Hansen | |
| 6,923,507 B1 | 8/2005 | Billberg | |
| 6,926,108 B1 | 8/2005 | Polakowski | |
| 6,942,050 B1 | 9/2005 | Honkala | |
| 6,966,399 B2 | 11/2005 | Tanigaki | |
| 6,978,857 B2 | 12/2005 | Korenjak | |
| 7,040,437 B1 | 5/2006 | Fredrickson | |
| 7,047,924 B1 | 5/2006 | Waters | |
| 7,055,454 B1 | 6/2006 | Whiting | |
| 7,063,057 B1 | 6/2006 | Waters | |

(56) References Cited

U.S. PATENT DOCUMENTS

| | | | |
|---|---|---|---|
| 7,070,012 B2 | 7/2006 | Fecteau | |
| 7,077,233 B2 | 7/2006 | Hasegawa | |
| 7,096,988 B2 | 8/2006 | Moriyama | |
| 7,124,853 B1 | 10/2006 | Kole | |
| 7,125,134 B1 | 10/2006 | Hedlund | |
| 7,165,702 B1 | 1/2007 | Billberg | |
| 7,182,165 B1 | 2/2007 | Keinath | |
| 7,182,169 B2 | 2/2007 | Suzuki | |
| 7,185,732 B2 | 3/2007 | Saito | |
| 7,210,547 B2 | 5/2007 | Nojima | |
| 7,216,733 B2 | 5/2007 | Iwami | |
| 7,222,882 B2 | 5/2007 | Boucher | |
| 7,237,789 B1 | 7/2007 | Herman | |
| 7,237,802 B2 | 7/2007 | Nguyen | |
| 7,237,803 B2 | 7/2007 | Nguyen | |
| 7,239,032 B1 | 7/2007 | Wilson | |
| 7,240,472 B2 | 7/2007 | Evers | |
| 7,240,960 B2 | 7/2007 | Fallis | |
| 7,249,652 B2 | 7/2007 | Wolf | |
| 7,331,896 B1 | 2/2008 | Kroppe | |
| 7,370,724 B2 | 5/2008 | Saito | |
| 7,374,012 B2 | 5/2008 | Inui | |
| 7,380,622 B2 | 6/2008 | Shimizu | |
| 7,380,805 B1 | 6/2008 | Turner | |
| 7,395,890 B2 | 7/2008 | Visscher | |
| 7,410,182 B1 | 8/2008 | Giese | |
| 7,431,024 B2 | 10/2008 | Buchwitz | |
| 7,444,236 B2 | 10/2008 | Wiles | |
| 7,455,141 B2 | 11/2008 | Hildebrand | |
| 7,458,593 B2 | 12/2008 | Saito | |
| 7,481,293 B2 | 1/2009 | Ogawa | |
| 7,485,984 B2 | 2/2009 | Fulks | |
| 7,497,299 B2 | 3/2009 | Kobayashi | |
| 7,497,471 B2 | 3/2009 | Kobayashi | |
| 7,500,709 B2 | 3/2009 | Heselhaus | |
| 7,523,799 B2 | 4/2009 | Yoshihara | |
| 7,540,511 B2 | 6/2009 | Saito | |
| 7,559,596 B2 | 7/2009 | Garska | |
| 7,565,944 B2 | 7/2009 | Sakamoto | |
| 7,565,945 B2 | 7/2009 | Okada | |
| 7,568,732 B2 | 8/2009 | Schlup | |
| 7,578,523 B2 | 8/2009 | Kosuge | |
| 7,600,603 B2 | 10/2009 | Okada | |
| 7,604,084 B2 | 10/2009 | Okada | |
| 7,610,132 B2 | 10/2009 | Yanai | |
| 7,632,327 B2 | 11/2009 | Ogawa | |
| 7,665,792 B1 | 2/2010 | Flynn | |
| 7,677,599 B2 | 3/2010 | Kurten | |
| 7,677,634 B2 | 3/2010 | Flynn | |
| 7,717,495 B2 | 5/2010 | Leonard | |
| 7,753,162 B2 | 7/2010 | Shiozawa | |
| 7,761,217 B2 | 7/2010 | Waters | |
| 7,762,567 B2 | 7/2010 | Marur | |
| 7,775,318 B2 | 8/2010 | Okada | |
| 7,782,000 B2 | 8/2010 | Suzuki | |
| 7,795,602 B2 | 9/2010 | Leonard | |
| 7,819,220 B2 | 10/2010 | Sunsdahl | |
| 7,854,290 B1 | 12/2010 | McKoskey | |
| 7,871,106 B2 | 1/2011 | Leonard | |
| RE42,086 E | 2/2011 | Saito | |
| 7,896,422 B2 | 3/2011 | Willard | |
| 7,900,743 B2 | 3/2011 | Kaku | |
| 7,922,201 B2 | 4/2011 | Kurten | |
| 7,950,486 B2 | 5/2011 | Van Bronkhorst | |
| 7,967,365 B2 | 6/2011 | Gerhardt | |
| 7,971,904 B2 | 7/2011 | David | |
| 7,992,671 B2* | 8/2011 | Okada | B60R 16/04 180/444 |
| 8,029,021 B2 | 10/2011 | Leonard | |
| 8,104,524 B2 | 1/2012 | Manesh | |
| 8,122,993 B2* | 2/2012 | Ripley | B62D 5/04 180/233 |
| 8,176,957 B2 | 5/2012 | Manesh | |
| 8,191,952 B2 | 6/2012 | Mokhtari | |
| 8,205,910 B2 | 6/2012 | Leonard | |
| 8,240,748 B2 | 8/2012 | Chapman | |
| 8,328,235 B2 | 12/2012 | Schneider | |
| 8,353,534 B2 | 1/2013 | Arnold | |
| 8,376,078 B2* | 2/2013 | Hiddema | A01C 23/008 180/209 |
| 8,382,130 B2 | 2/2013 | Nakamura | |
| 8,408,354 B2 | 4/2013 | Nozaki | |
| 8,454,041 B2 | 6/2013 | Fujii | |
| 8,517,135 B2* | 8/2013 | Schapf | B60G 3/20 180/233 |
| 8,517,140 B2* | 8/2013 | West | B60G 3/20 180/360 |
| 8,544,582 B2 | 10/2013 | Kaku | |
| 8,596,709 B2 | 12/2013 | Ugolini | |
| 8,602,159 B2 | 12/2013 | Harris | |
| 8,613,335 B2 | 12/2013 | Deckard | |
| 8,640,814 B2 | 2/2014 | Deckard | |
| 8,651,800 B2 | 2/2014 | Li | |
| 8,662,216 B2* | 3/2014 | Roucka | B62D 49/0678 180/9.46 |
| 8,746,719 B2 | 6/2014 | Safranski | |
| 8,893,835 B2 | 11/2014 | Nam | |
| 8,944,465 B2 | 2/2015 | Shinbori | |
| 8,967,666 B2 | 3/2015 | Lardella | |
| 8,979,124 B2 | 3/2015 | Shinbori | |
| 9,096,289 B2 | 8/2015 | Hedlund | |
| 9,150,182 B1 | 10/2015 | Schlangen | |
| 9,248,861 B2* | 2/2016 | Koren | B62D 21/11 |
| 9,248,886 B1 | 2/2016 | Giese | |
| 9,358,836 B2* | 6/2016 | David | B60B 35/1054 |
| 9,440,671 B2 | 9/2016 | Schlangen | |
| 9,506,407 B2 | 11/2016 | Blake | |
| 9,540,072 B2 | 1/2017 | Hedlund | |
| 9,592,782 B2 | 3/2017 | Raska | |
| 9,623,912 B2 | 4/2017 | Schlangen | |
| 9,776,481 B2 | 10/2017 | Deckard | |
| 9,845,004 B2 | 12/2017 | Hedlund | |
| 9,873,316 B2 | 1/2018 | Lovold | |
| 9,895,946 B2 | 2/2018 | Schlangen | |
| 9,988,083 B1 | 6/2018 | Smith | |
| 10,077,087 B2* | 9/2018 | Lubben | B62D 55/084 |
| 10,358,187 B2 | 7/2019 | Vistad | |
| 2002/0093168 A1 | 7/2002 | Hibbert | |
| 2002/0107101 A1 | 8/2002 | Bowen | |
| 2002/0147072 A1 | 10/2002 | Goodell | |
| 2002/0178968 A1 | 12/2002 | Christensen | |
| 2002/0179356 A1 | 12/2002 | Morii | |
| 2003/0001409 A1 | 1/2003 | Semple | |
| 2003/0006081 A1 | 1/2003 | Burke | |
| 2003/0089166 A1 | 5/2003 | Mizuno | |
| 2003/0172907 A1 | 9/2003 | Nytomt | |
| 2003/0211913 A1 | 11/2003 | Spitale | |
| 2004/0026948 A1 | 2/2004 | Novajovsky | |
| 2004/0079561 A1 | 4/2004 | Ozawa | |
| 2004/0089492 A1 | 5/2004 | Eide | |
| 2004/0099470 A1 | 5/2004 | Tanigaki | |
| 2004/0108159 A1 | 6/2004 | Rondeau | |
| 2004/0153782 A1 | 8/2004 | Fukui | |
| 2004/0159483 A1 | 8/2004 | Imamura | |
| 2004/0187826 A1 | 9/2004 | Kino | |
| 2004/0195797 A1 | 10/2004 | Nash | |
| 2004/0216945 A1 | 11/2004 | Inui | |
| 2004/0221669 A1 | 11/2004 | Shimizu | |
| 2004/0226384 A1 | 11/2004 | Shimizu | |
| 2004/0242090 A1 | 12/2004 | Gibbs | |
| 2004/0262064 A1 | 12/2004 | Lefort | |
| 2005/0012421 A1 | 1/2005 | Fukuda | |
| 2005/0016784 A1 | 1/2005 | Fecteau | |
| 2005/0040000 A1 | 2/2005 | Kelley | |
| 2005/0045414 A1 | 3/2005 | Takagi | |
| 2005/0067220 A1 | 3/2005 | Keller | |
| 2005/0072613 A1* | 4/2005 | Maltais | B62M 27/02 180/182 |
| 2005/0073140 A1 | 4/2005 | Boucher | |
| 2005/0161283 A1 | 7/2005 | Emler | |
| 2005/0073177 A1 | 8/2005 | Smith | |
| 2005/0173180 A1 | 8/2005 | Hypes | |
| 2005/0173940 A1 | 8/2005 | Smith | |
| 2005/0199432 A1 | 9/2005 | Abe | |

(56) References Cited

U.S. PATENT DOCUMENTS

| | | |
|---|---|---|
| 2005/0199433 A1 | 9/2005 | Abe |
| 2005/0205320 A1 | 9/2005 | Girouard |
| 2005/0225067 A1 | 10/2005 | Nguyen |
| 2005/0231145 A1 | 10/2005 | Mukai |
| 2005/0235767 A1 | 10/2005 | Shimizu |
| 2005/0235768 A1 | 10/2005 | Shimizu |
| 2005/0242677 A1 | 11/2005 | Akutsu |
| 2005/0248116 A1 | 11/2005 | Franson |
| 2005/0252592 A1 | 11/2005 | Albright |
| 2005/0257989 A1 | 11/2005 | Iwami |
| 2005/0257990 A1 | 11/2005 | Shimizu |
| 2005/0267660 A1 | 12/2005 | Fujiwara |
| 2005/0279552 A1 | 12/2005 | Schuehmacher |
| 2006/0022619 A1 | 2/2006 | Koike |
| 2006/0042862 A1 | 3/2006 | Saito |
| 2006/0043754 A1 | 3/2006 | Smith |
| 2006/0055139 A1 | 3/2006 | Furumi |
| 2006/0065472 A1 | 3/2006 | Ogawa |
| 2006/0075840 A1 | 4/2006 | Saito |
| 2006/0076180 A1 | 4/2006 | Saito |
| 2006/0085966 A1 | 4/2006 | Kerner |
| 2006/0108174 A1 | 5/2006 | Saito |
| 2006/0162990 A1 | 7/2006 | Saito |
| 2006/0169510 A1 | 8/2006 | Visscher |
| 2006/0169514 A1 | 8/2006 | Lim |
| 2006/0169525 A1 | 8/2006 | Saito |
| 2006/0175124 A1 | 8/2006 | Saito |
| 2006/0180370 A1 | 8/2006 | Polakowski |
| 2006/0180385 A1 | 8/2006 | Yanai |
| 2006/0185741 A1 | 8/2006 | McKee |
| 2006/0185919 A1 | 8/2006 | Hibbert |
| 2006/0185927 A1 | 8/2006 | Sakamoto |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito |
| 2006/0196722 A1 | 9/2006 | Makabe |
| 2006/0201270 A1 | 9/2006 | Kobayashi |
| 2006/0207823 A1 | 9/2006 | Okada |
| 2006/0207824 A1 | 9/2006 | Saito |
| 2006/0207825 A1 | 9/2006 | Okada |
| 2006/0208564 A1 | 9/2006 | Yuda |
| 2006/0212200 A1 | 9/2006 | Yanai |
| 2006/0219452 A1 | 10/2006 | Okada |
| 2006/0219469 A1 | 10/2006 | Okada |
| 2006/0219470 A1 | 10/2006 | Imagawa |
| 2006/0273566 A1 | 12/2006 | Hepner |
| 2006/0288800 A1 | 12/2006 | Mukai |
| 2007/0017480 A1 | 1/2007 | Kondo |
| 2007/0028877 A1 | 2/2007 | McDonald |
| 2007/0068726 A1 | 3/2007 | Shimizu |
| 2007/0074588 A1 | 4/2007 | Harata |
| 2007/0074589 A1 | 4/2007 | Harata |
| 2007/0074927 A1 | 4/2007 | Okada |
| 2007/0074928 A1 | 4/2007 | Okada |
| 2007/0087890 A1 | 4/2007 | Hamrin |
| 2007/0090621 A1* | 4/2007 | Vigen ............... B60G 3/20 280/124.134 |
| 2007/0095601 A1 | 5/2007 | Okada |
| 2007/0096449 A1 | 5/2007 | Okada |
| 2007/0175686 A1 | 8/2007 | Yoshihara |
| 2007/0175696 A1 | 8/2007 | Saito |
| 2007/0199753 A1 | 8/2007 | Giese |
| 2007/0225105 A1 | 9/2007 | Bowen |
| 2007/0227810 A1 | 10/2007 | Sakurai |
| 2007/0242398 A1 | 10/2007 | Ogawa |
| 2007/0246283 A1 | 10/2007 | Giese |
| 2007/0290493 A1 | 12/2007 | David |
| 2008/0023240 A1 | 1/2008 | Sunsdahl |
| 2008/0023249 A1 | 1/2008 | Sunsdahl |
| 2008/0141957 A1 | 1/2008 | Hayashi |
| 2008/0053743 A1 | 3/2008 | Tomita |
| 2008/0199253 A1 | 8/2008 | Okada |
| 2008/0257630 A1 | 10/2008 | Takeshima |
| 2008/0284124 A1 | 11/2008 | Brady |
| 2009/0078491 A1 | 3/2009 | Tsutsumikoshi |
| 2009/0078492 A1 | 3/2009 | Tsutsumikoshi |
| 2009/0152035 A1 | 6/2009 | Okada |
| 2009/0152036 A1 | 6/2009 | Okada |
| 2009/0217908 A1 | 9/2009 | Watanabe |
| 2009/0294197 A1 | 12/2009 | Polakowski |
| 2009/0301830 A1 | 12/2009 | Kinsman |
| 2009/0308682 A1 | 12/2009 | Ripley |
| 2010/0012412 A1 | 1/2010 | Deckard |
| 2010/0060026 A1 | 3/2010 | Bowers |
| 2010/0071982 A1 | 3/2010 | Giese |
| 2010/0089355 A1 | 4/2010 | Fredrickson |
| 2010/0090430 A1 | 4/2010 | Weston |
| 2010/0108427 A1 | 5/2010 | Richer |
| 2010/0170231 A1 | 7/2010 | Yamaguchi |
| 2010/0269771 A1 | 10/2010 | Wermuth |
| 2011/0088968 A1 | 4/2011 | Kempf |
| 2011/0100340 A1 | 5/2011 | Mukkala |
| 2011/0139529 A1 | 6/2011 | Eichenberger |
| 2011/0240395 A1 | 10/2011 | Hurd |
| 2011/0298189 A1 | 12/2011 | Schneider |
| 2012/0143465 A1 | 6/2012 | Kim |
| 2012/0205902 A1 | 8/2012 | Beavis |
| 2012/0223500 A1 | 9/2012 | Kinsman |
| 2013/0048409 A1 | 2/2013 | Fujii |
| 2013/0125535 A1 | 5/2013 | Schultz |
| 2013/0175779 A1* | 7/2013 | Kvien ............... B60G 3/20 280/124.15 |
| 2013/0180798 A1 | 7/2013 | Matsushima |
| 2013/0233265 A1 | 9/2013 | Zurface |
| 2013/0240272 A1 | 9/2013 | Gass |
| 2013/0256050 A1 | 10/2013 | Novotny |
| 2014/0124279 A1 | 5/2014 | Schlangen |
| 2014/0210234 A1 | 7/2014 | Ricketts |
| 2014/0262583 A1 | 9/2014 | Uri |
| 2014/0353956 A1 | 12/2014 | Bjerketvedt |
| 2015/0165886 A1 | 6/2015 | Bennett |
| 2015/0197128 A1 | 7/2015 | Miller |
| 2015/0210115 A1* | 7/2015 | David ............... B60B 35/1054 301/128 |
| 2015/0210319 A1 | 7/2015 | Tiramani |
| 2015/0354149 A1* | 12/2015 | Dahm ............... E01C 19/4886 404/98 |
| 2016/0347350 A1 | 12/2016 | Heon |
| 2017/0101142 A1 | 4/2017 | Hedlund |
| 2017/0137059 A1 | 5/2017 | Ohba |
| 2017/0210192 A1* | 7/2017 | Reybrouck ............... B60G 3/18 |
| 2017/0274935 A1 | 9/2017 | Deckard |
| 2018/0154717 A1 | 6/2018 | Neu |
| 2018/0170134 A1 | 6/2018 | Schlangen |

FOREIGN PATENT DOCUMENTS

| | | |
|---|---|---|
| AU | 2017204255 | 7/2017 |
| CA | 1150752 | 7/1983 |
| CA | 2561337 | 9/1999 |
| CA | 2265693 | 1/2004 |
| CH | 317335 | 11/1956 |
| CN | 101511664 | 8/2009 |
| DE | 116605 | 2/1900 |
| DE | 1755101 | 4/1971 |
| DE | 3033707 | 4/1982 |
| DE | 351667 | 11/1986 |
| DE | 4122690 | 1/1992 |
| DE | 102010017784 | 2/2012 |
| EP | 0238077 | 9/1987 |
| EP | 0287038 | 10/1988 |
| EP | 0709247 | 5/1996 |
| EP | 0794096 | 9/1997 |
| EP | 1215107 | 6/2002 |
| EP | 1557345 | 7/2005 |
| EP | 1564123 | 8/2005 |
| EP | 1769998 | 4/2007 |
| EP | 3328717 | 6/2018 |
| FR | 2678886 | 1/1993 |
| JP | S62218209 | 9/1987 |
| JP | H01113527 | 5/1989 |
| JP | H11334447 | 7/1999 |

(56) References Cited

FOREIGN PATENT DOCUMENTS

| JP | 2000177434 | 6/2000 |
|---|---|---|
| JP | 2001065344 | 3/2001 |
| JP | 2003011843 | 1/2003 |
| JP | 3385382 | 3/2003 |
| JP | 2003343373 | 12/2003 |
| JP | 2005-193788 | 7/2005 |
| JP | 2006-232058 | 9/2006 |
| JP | 2006-232061 | 9/2006 |
| JP | 2006-256579 | 9/2006 |
| JP | 2006-256580 | 9/2006 |
| JP | 2006-281839 | 10/2006 |
| JP | 2007038709 | 2/2007 |
| JP | 2007-106319 | 4/2007 |
| JP | 2018-523603 | 8/2018 |
| WO | WO 1995/01503 | 1/1995 |
| WO | WO 97/46407 | 12/1997 |
| WO | WO 98/12095 | 3/1998 |
| WO | WO 2001/05613 | 1/2001 |
| WO | WO 2002/087957 | 11/2002 |
| WO | WO 2007/100751 | 9/2007 |
| WO | 2009/062823 | 5/2009 |
| WO | WO 2009/096998 | 8/2009 |
| WO | WO 2009/114414 | 9/2009 |
| WO | WO 2009/151995 | 12/2009 |
| WO | WO 2011/093847 | 8/2011 |
| WO | WO 2011/099959 | 8/2011 |
| WO | WO 2013/119958 | 8/2013 |
| WO | WO 2014/047488 | 3/2014 |
| WO | WO 2015/071904 | 5/2015 |
| WO | WO 2015/105974 | 7/2015 |
| WO | WO 2015/105976 | 7/2015 |
| WO | WO 2015/184354 | 12/2015 |
| WO | WO 2017/023726 | 2/2017 |

OTHER PUBLICATIONS

Written Opinion of the International Searching Authority, dated Aug. 4, 2009, for International Patent Application No. PCT/US2009/045900; 6 pages.
International Preliminary Report on Patentability issued by the European Patent Office, dated Dec. 13, 2010, for International Patent Application No. PCT/US2009/045900; 7 pages.
Examination Report No. 1 issued by the Australian Government IP Australia, dated Nov. 19, 2018, for Australian Patent Application No. 2016303426; 3 pages.
Examination Report No. 1 issued by the Australian Government IP Australia, dated Jun. 28, 2018, for Australian Patent Application No. 2017204255; 3 pages.
International Search Report and Written Opinion issued by the European Patent Office, dated Jan. 16, 2014, for International Patent Application No. PCT/US2013/061002; 13 pages.
Strike Razor: Light Tactical Vehicle, Advanced Mobile Systems, copyright 2011; 2 pages.
Brochure, Fully Equipped LTATV Sales, available at http://chrishainesoffroad.com/vehicles/pdf, last accessed Jul. 15, 2014, copyright 2010-2011; 2 pages.
Webpage, RP Advanced Mobile Systems: Military SxS Tactical Defense Vehicles, available at http://web.archive.org/web/20120324210549/http://www.rpadvancedmobilesystems.com/, available as early as Mar. 24, 2012, last accessed Jul. 15, 2014; 4 pages.
Brochure, Strike Razer, Advanced Mobile Systems for Rapid Response; 5 pages.
Written Opinion issued by the European Patent Office, dated Aug. 27, 2008, for International Patent Application No. PCT/US2008/003485; 7 pages.
Written Opinion issued by the European Patent Office, dated Sep. 1, 2008, for International Patent Application No. PCT/US2008/003480; 12 pages.
Written Opinion issued by the European Patent Office, dated Oct. 2, 2008, for International Patent Application No. PCT/US2008/003483; 10 pages.
Examination Report No. 1 issued by the Australian Government IP Australia, dated Sep. 29, 2016, for Australian Patent Application No. 2013317853; 5 pages.
International Search Report and Written Opinion issued by the European Patent Office, dated Aug. 8, 2015, for International Patent Application No. PCT/US2015/033327; 8 pages.
Examination Report No. 1 issued by the Australian Government IP Australia, dated Jul. 24, 2017, for Australian Patent Application No. 2015266694; 4 pages.
Decision on Appeal, Inter Partes Reexamination Control 95/002,010 of U.S. Pat. No. 7,854,285, Appeal 2015-004514, dated Sep. 28, 2015; 32 pages.
Decision on Appeal, Inter Partes Reexamination Control 95/002,011 of U.S. Pat. No. 8,151,923, Appeal 2015-004515, dated Sep. 28, 2015; 36 pages.
Communication Pursuant to Article 94(3) EPC issued by the European Patent Office, dated Nov. 14, 2018, for European Patent Application No. 15700942.4; 4 pages.
Communication Pursuant to Article 94(3) of the European Patent Convention, dated Feb. 6, 2018, for European Patent Application No. 15700942.4; 4 pages.
International Preliminary Report on Patentability issued by the European Patent Office, dated Jun. 17, 2016, for International Patent Application No. PCT/US2015/010623; 20 pages.
International Preliminary Report on Patentability issued by the European Patent Office, dated Jul. 12, 2016, for International Patent Application No. PCT/US2015/010621; 12 pages.
International Preliminary Report on Patentability issued by the European Patent Office, dated Mar. 30, 2011, for International Patent Application No. PCT/US2009/066110; 12 pages.
International Search Report and Written Opinion issued by the European Patent Office, dated Sep. 18, 2014, for International Patent Application No. PCT/US2013/025354; 13 pages.
International Search Report issued by the European Patent Office, dated Mar. 18, 2010, for International Patent Application No. PCT/US2009/066110; 5 pages.
International Preliminary Report on Patentability issued by the European Patent Office, dated Jun. 4, 2014, for International Patent Application No. PCT/US2013/025354; 18 pages.
International Search Report and Written Opinion issued by the European Patent Office, dated Nov. 6, 2007, for International Patent Application No. PCT/US2007/004895; 20 pages.
International Preliminary Report on Patentability issued by the European Patent Office, dated Jun. 10, 2008, for International Patent Application No. PCT/US2007/004895; 22 pages.
International Search Report and Written Opinion issued by the European Patent Office, dated Jul. 2, 2010, for International Patent Application No. PCT/US2009/066093; 14 pages.
Annex to Form PCT/ISA/206 Communication Relating to the Results of the Partial International Search issued by the European Patent Office, dated Mar. 2, 2010, for International Patent Application No. PCT/US2009/066093; 6 pages.
International Preliminary Report on Patentability issued by the International Bureau of WIPO, dated Jul. 19, 2011, for International Patent Application No. PCT/US2009/066093; 9 pages.
International Search Report and Written Opinion issued by the European Patent Office, dated Mar. 24, 2015, for International Patent Application No. PCT/US2015/010623; 11 pages.
International Search Report and Written Opinion issued by the European Patent Office, dated Aug. 12, 2014, for International Patent Application No. PCT/US2015/010621; 17 pages.
Written Opinion issued by the European Patent Office, dated Feb. 5, 2016, for International Patent Application No. PCT/US2015/010623; 8 pages.
"Kawasaki Teryx 6" Lift Kit", https://www.superatv.com/kawasaki-teryx-6-lift-kit; Jan. 23, 2016; 10 pages.
"6" Lift Kit-Kawasaki Teryx 4", https://www.pureoffroad.com/assets/images/superatv/IN-LK-K-TRX4-6, Nov. 13, 2015; 4 pages.
SuperATVMedia: "Kawasaki Teryx 4 6" Lift Kit-SuperATV", Dec. 3, 2015, https://www.youtube.com/watch?v=a6ewNg5De_g; 3 pages.
International Search Report and Written Opinion issued by the European Patent Office, dated Jul. 11, 2019, for International Patent Application No. PCT/US2019/017438; 22 pages.

(56) References Cited

OTHER PUBLICATIONS

International Preliminary Report on Patentability issued by the European Patent Office, dated Jun. 18, 2020, for International Patent Application No. PCT/US2019/017438; 19 pages.

* cited by examiner

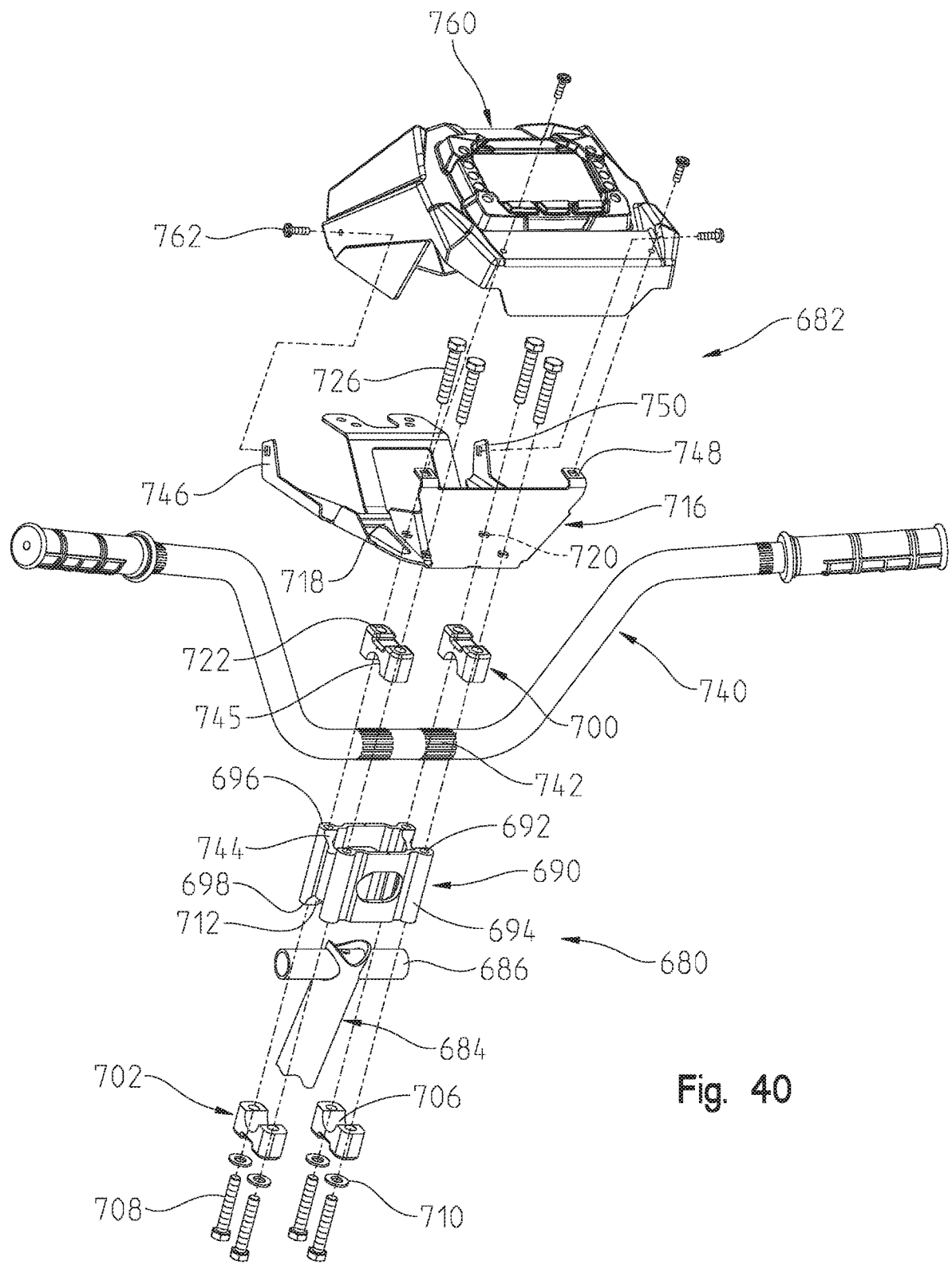

US 10,793,181 B2

ALL-TERRAIN VEHICLE

BACKGROUND OF THE DISCLOSURE

The present disclosure generally relates to an ALL TERRAIN VEHICLE (ATV) and, more particularly, to an ATV having improved ergonomics and performance.

Generally, ATVs are used to carry one or two passengers and a small amount of cargo over a variety of terrains. Due to increasing recreational interest in ATVs, specialty ATVs, such as those used for trail riding, racing, and cargo hauling have entered the market place. Most ATVs include an engine including between one and three cylinders. Most ATVs include a straddle or saddle type seat positioned above the engine.

SUMMARY OF THE DISCLOSURE

In one example of the invention, a method of making multiple widths of all-wheel drive vehicles is described which includes the steps of providing a frame having a front portion and a rear portion; providing a power train and coupling the power train to the frame, the power train comprising a primary motive unit, a transmission, a front final drive, a rear final drive and couplings between the transmission and the front and rear final drives; providing a plurality of front and rear suspension components of different lengths; providing a plurality of front and rear half shafts of different lengths; selecting sets of front and rear suspension components and front and rear half shafts to define a measured distance from a longitudinal centerline of the vehicle; and providing front and rear wheels, where a distance measured from outside the front and rear wheels is different for the different sets.

In another illustrative embodiment, an all-terrain vehicle (ATV) comprises a frame; ground engaging members supporting the frame, including front and rear ground engaging members; front right and left suspensions; front wheel steering mechanisms including right and left knuckles pivotally coupled to the respective front right and left suspension; a power steering unit coupled to the frame, the power steering unit including an output shaft which is laterally offset from a vertical centerline of the vehicle; right and left steering arms coupled to respective right and left knuckles, and a linkage coupling the output shaft to the steering arms, where the right and left steering arms are substantially the same length.

In another illustrative embodiment, an all-terrain vehicle (ATV) comprises a frame; ground engaging members supporting the frame, including front and rear ground engaging members; front right and left suspensions; front wheel steering mechanisms including right and left knuckles pivotally coupled to the respective front right and left suspension; a first stop member positioned on each of the front right and left suspension; and a second stop member positioned on each of the right and left knuckles; wherein the first and second stop members cooperate to provide extreme rotational positions.

In another embodiment includes an all-terrain vehicle (ATV) comprising a frame; ground engaging members supporting the frame, including front and rear ground engaging members; front right and left suspensions; a power steering unit coupled to the frame; a steering post providing torsional input to the power steering unit; a steering system support bracket coupled to the frame for supporting the power steering unit; and a steering stop coupled between the steering shaft and the steering system support bracket, to provide extreme rotational positions of the steering shaft.

Finally, in another embodiment, an all-terrain vehicle (ATV) comprises a frame; ground engaging members supporting the frame, including front and rear ground engaging members; front right and left suspensions; a power steering unit coupled to the frame, the power steering unit comprising a power steering motor having an output shaft and a rack and pinion subassembly coupled to the power steering unit, the rack and pinion subassembly having a housing and a pinion gear driving coupled by the output shaft, and a rack drivingly coupled to the pinion gear; a steering post providing torsional input to the power steering unit; and steering arms coupled to the rack; wherein torsional input to the power steering unit causes rotation of the output shaft and pinion, and linear movement of the rack and steering arms.

BRIEF DESCRIPTION OF THE DRAWINGS

The invention will now be described by way of reference to the drawing figures, where:

FIG. 40 is an exploded view of the assembly of FIG. 39.

Corresponding reference characters indicate corresponding parts throughout the several views. Unless stated otherwise the drawings are proportional.

DETAILED DESCRIPTION OF THE DRAWINGS

Figure 1:
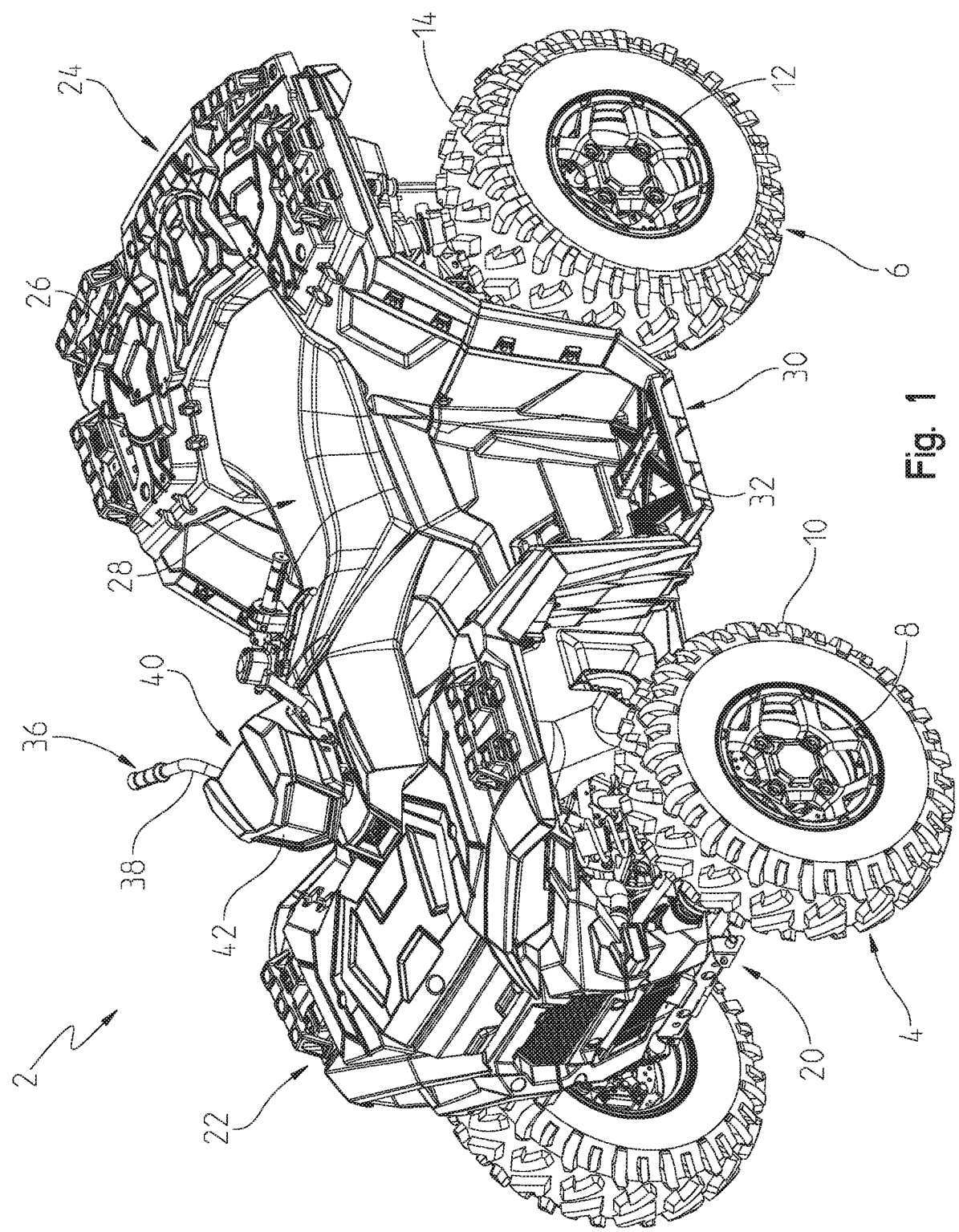
FIG. 1 is a front left perspective view of the ATV of the present disclosure.
Figure 2:
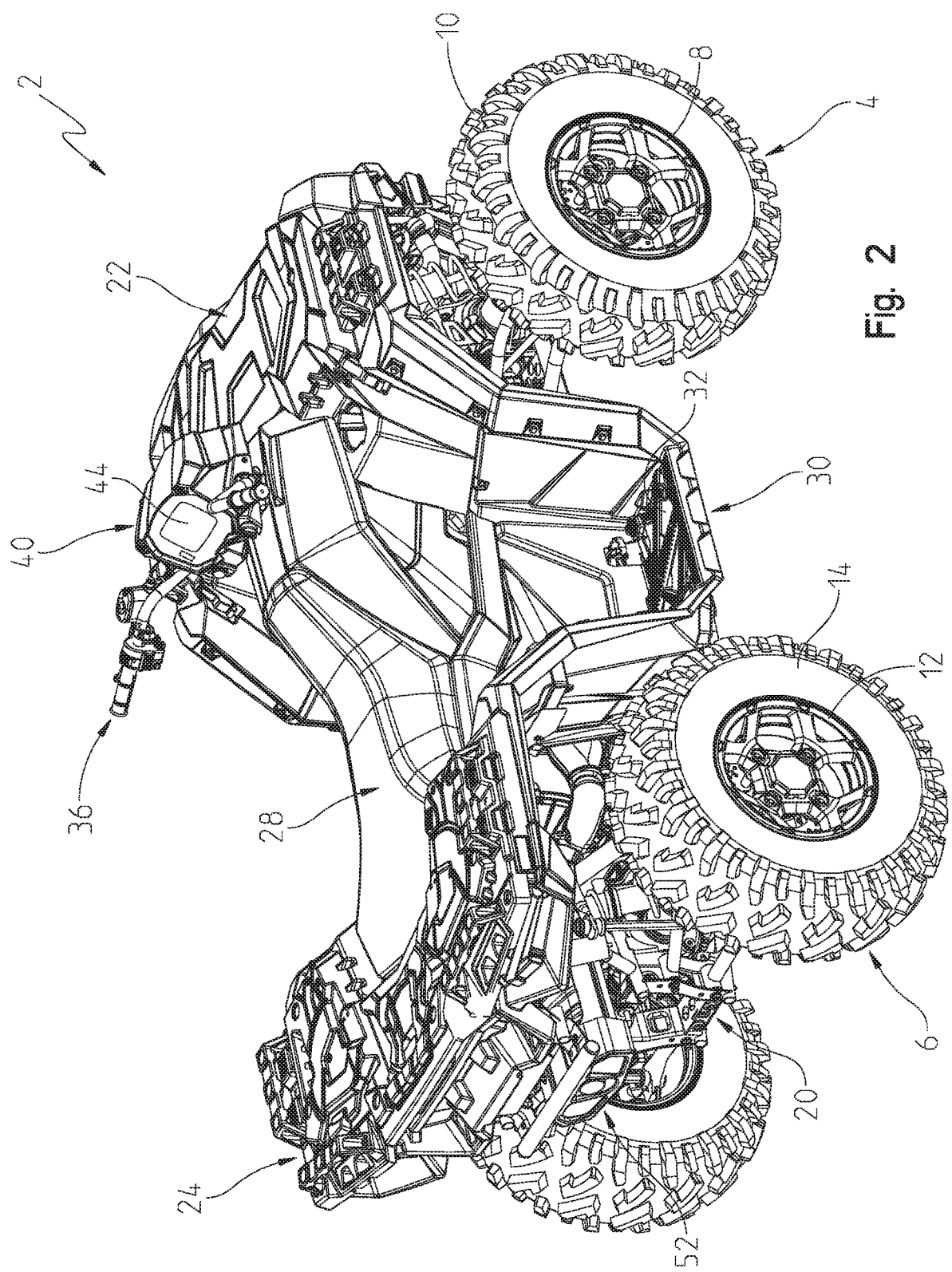
FIG. 2 is a right rear perspective view of the ATV of FIG. 1.
Figure 3:
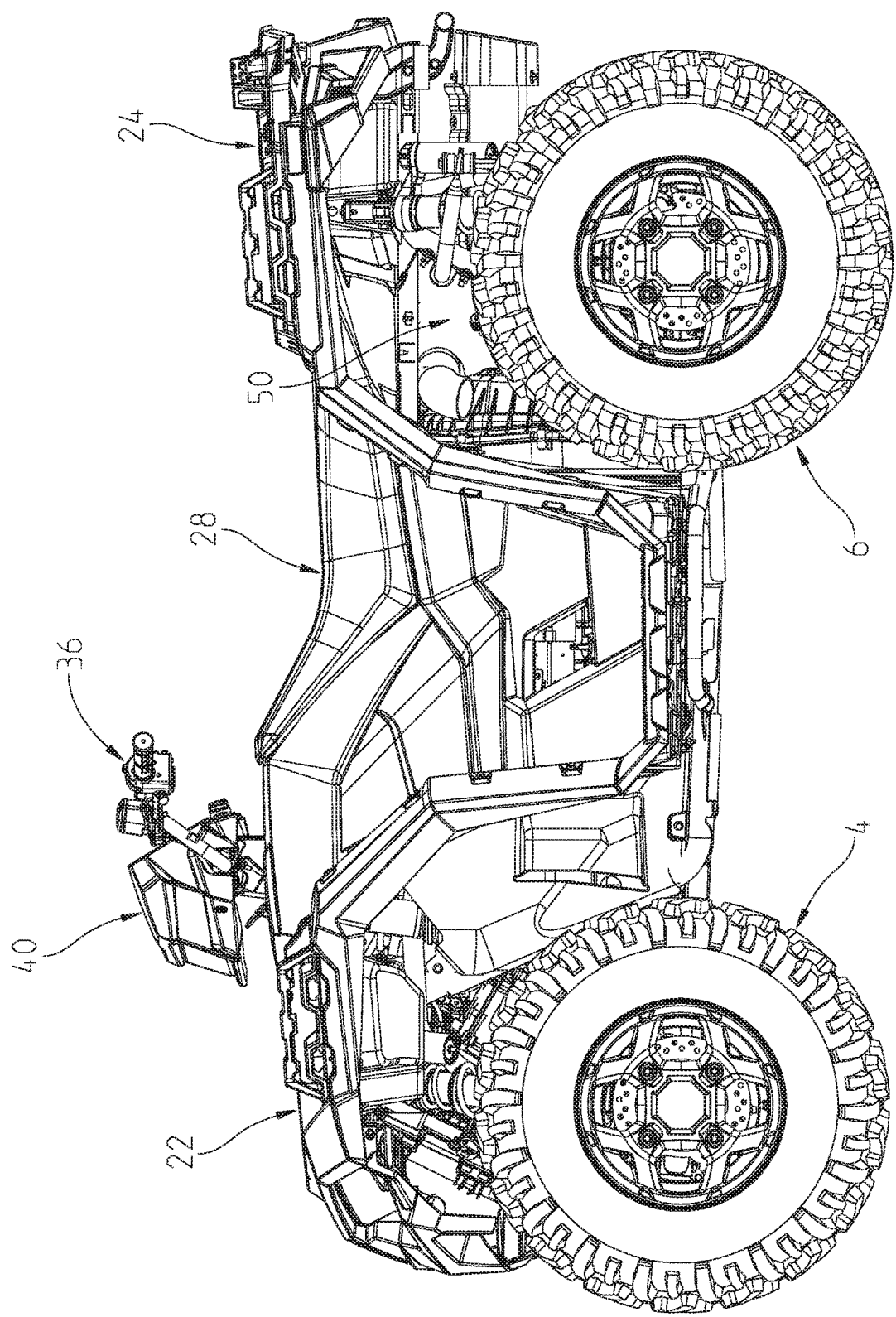
FIG. 3 is a left side view of the ATV.
Figure 4:
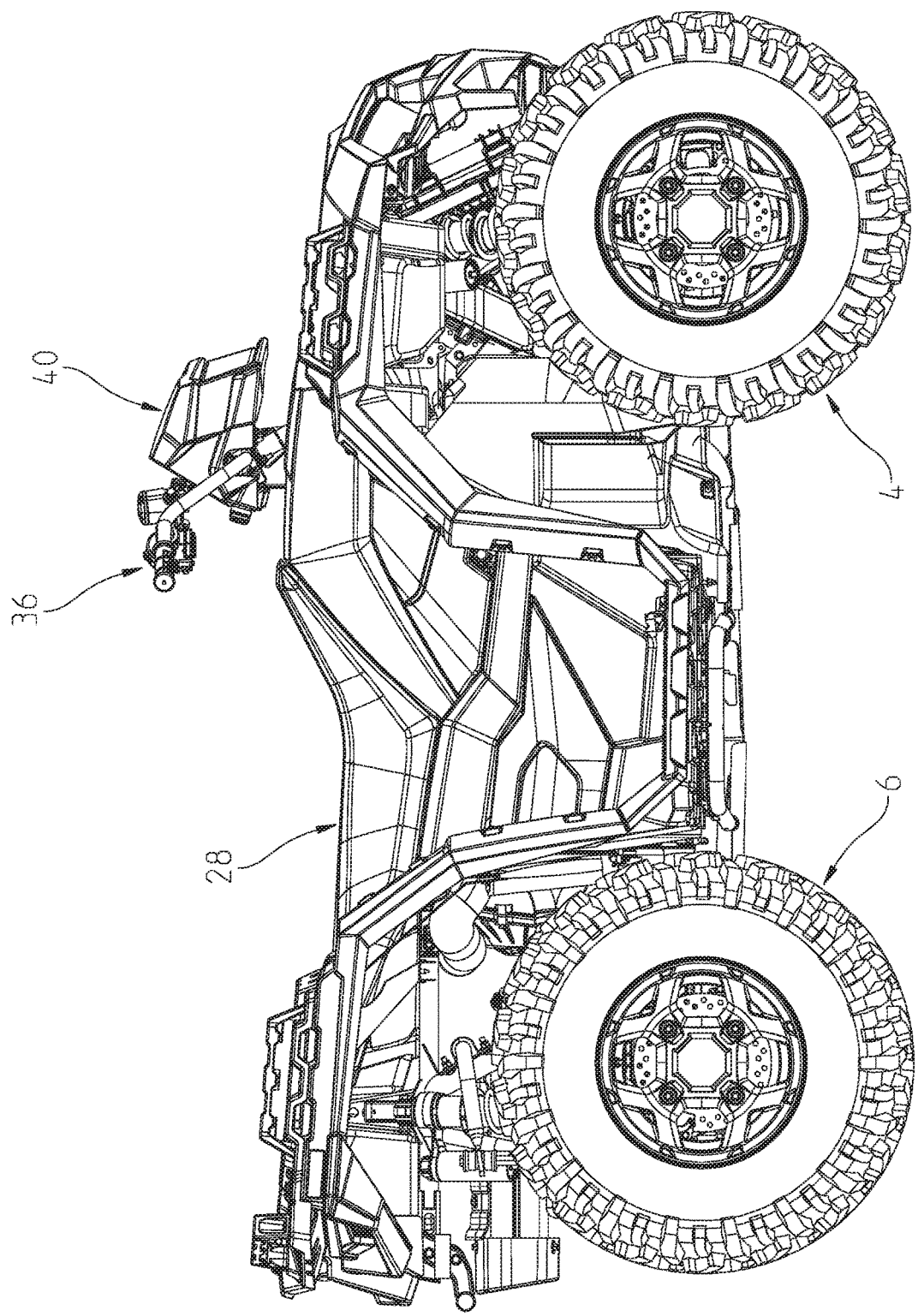
FIG. 4 is a right side view of the ATV.
Figure 5:
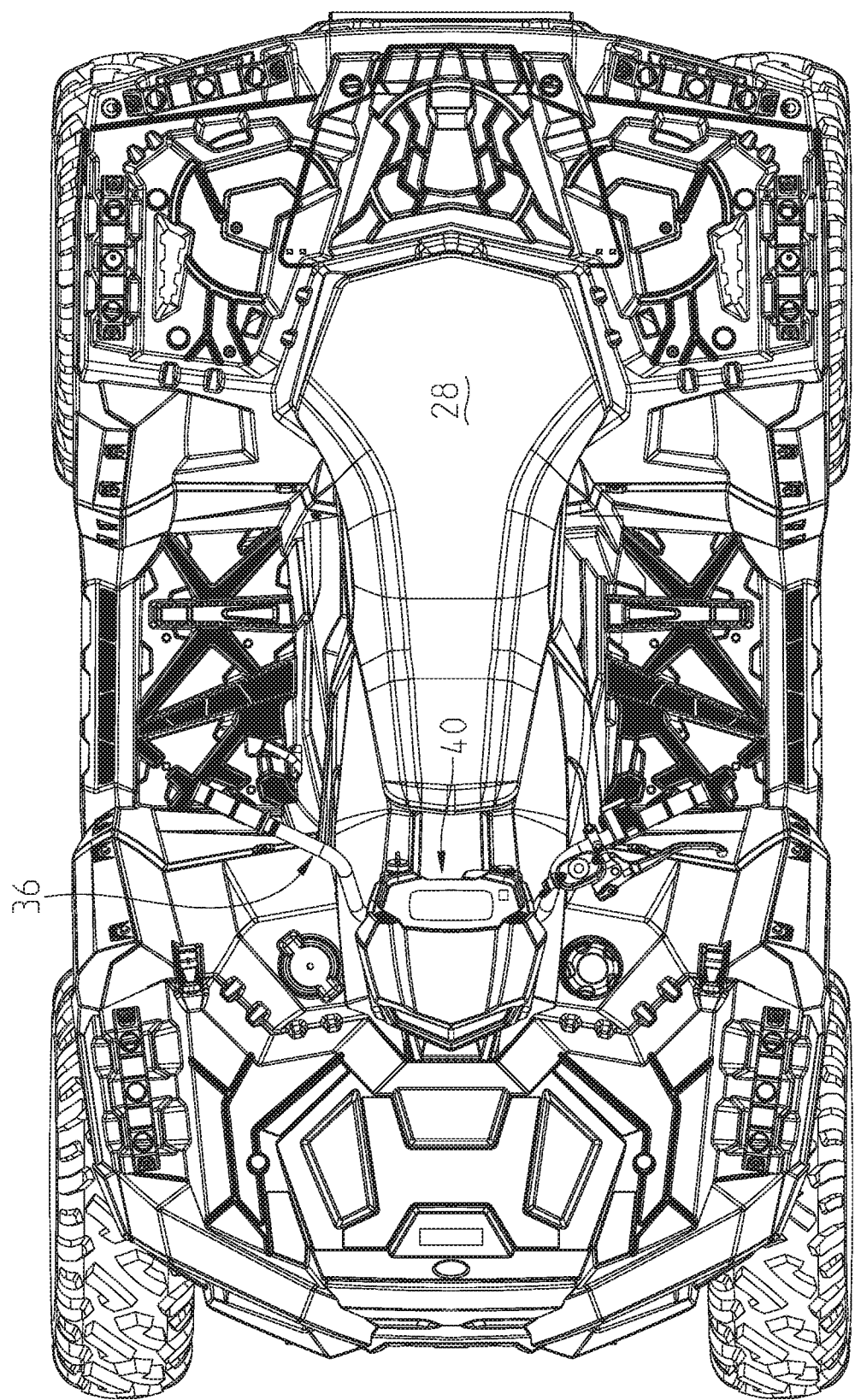
FIG. 5 is a top view of the ATV.
Figure 6:
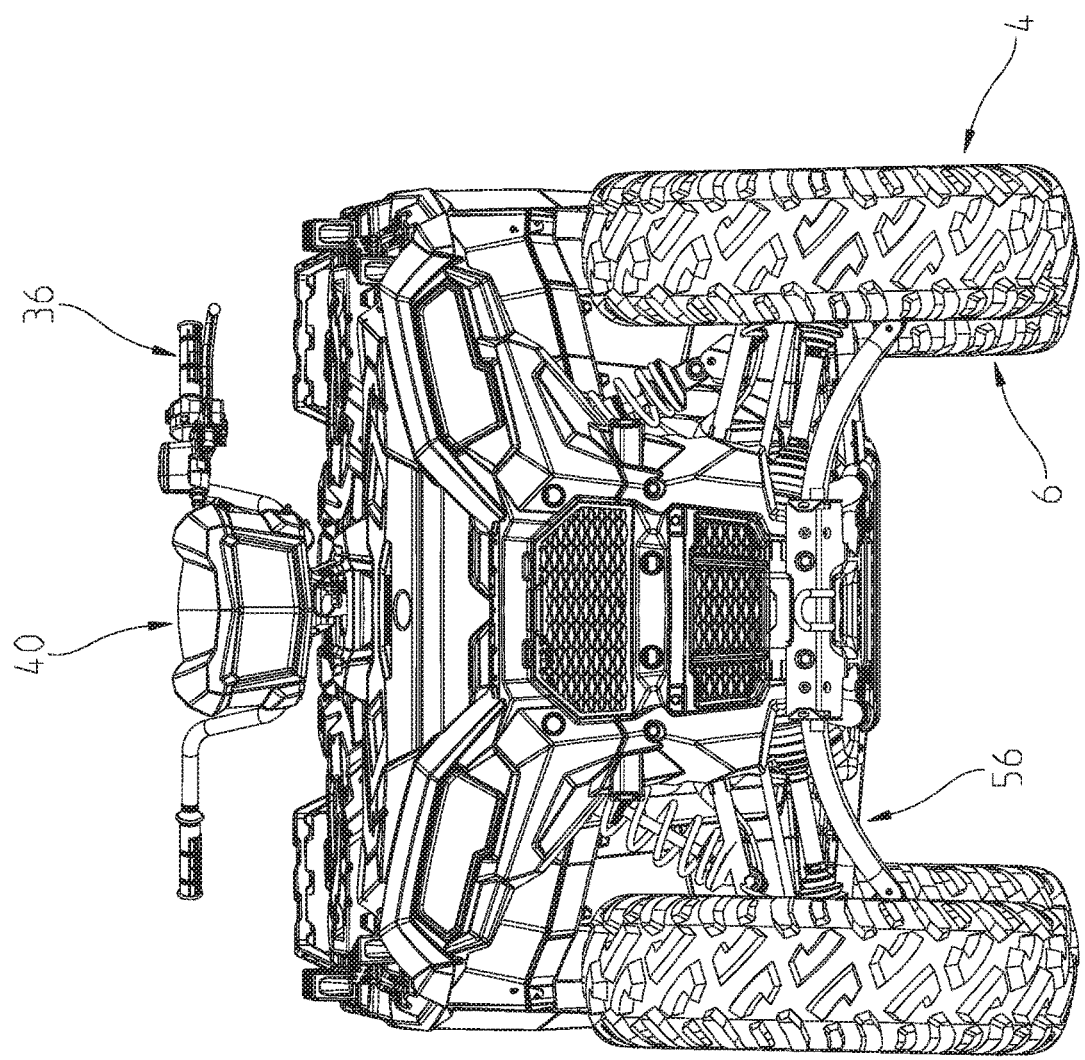
FIG. 6 is a front view of the ATV.
Figure 7:
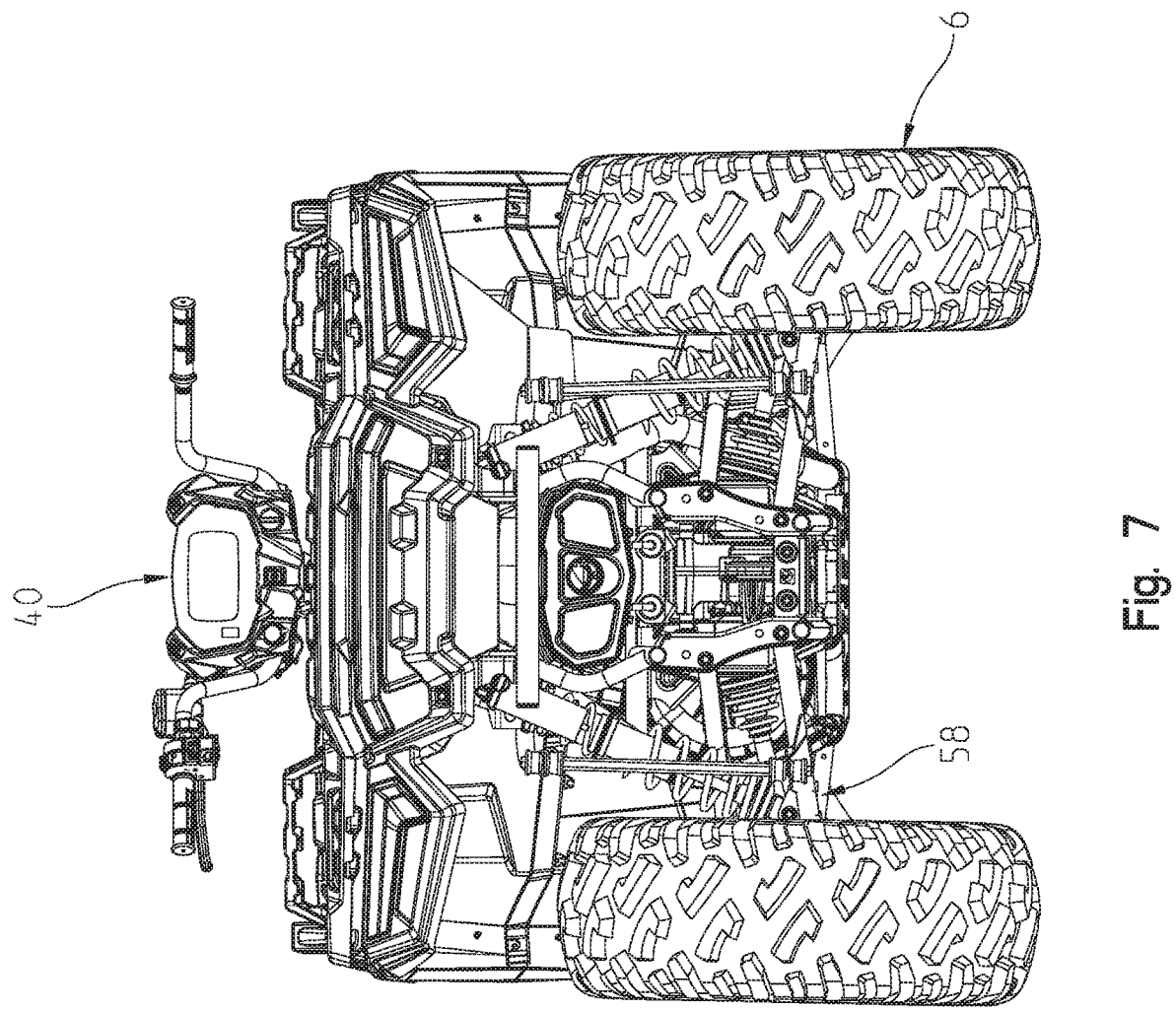
FIG. 7 is a rear view of the ATV.

With reference first to FIGS. 1-7, the ATV of the present disclosure will be described in greater detail. As shown, ATV is shown generally at 2 and comprises front wheels 4 and rear wheels 6. Front wheels 4 include rims 8 and tires 10, whereas rear wheels 6 include rims 12 and tires 14. Wheels 4 and 6 support a frame 20 which in turn supports a front body portion 22, a rear body portion 24 including a rack 26, a seat 28 and a mid-body portion 30 including a foot well 32. ATV 2 includes a steering system 36 including handlebars 38 for steering ATV 2, as described herein. A pod 40 is coupled to handlebars 38 and includes a headlight 42 (FIG. 1) and a control display 44 (FIG. 2). ATV 2 further comprises a powertrain 50 (FIG. 3) including an exhaust system 52 (FIG. 2). Finally, ATV 2 includes a front suspension system 56 (FIG. 6) and a rear suspension 58 (FIG. 7).

As will be disclosed herein, ATV 2 can be provided in two widths, that is a 48" width and a 55" width. In accordance with the present disclosure, the frame 20, body components 22, 24 and 30, and powertrain 50 are identical for the two vehicle widths. Rather, the front and rear suspensions 56, 58 interchange to provide the wider vehicle, as disclosed herein.

Figure 8:
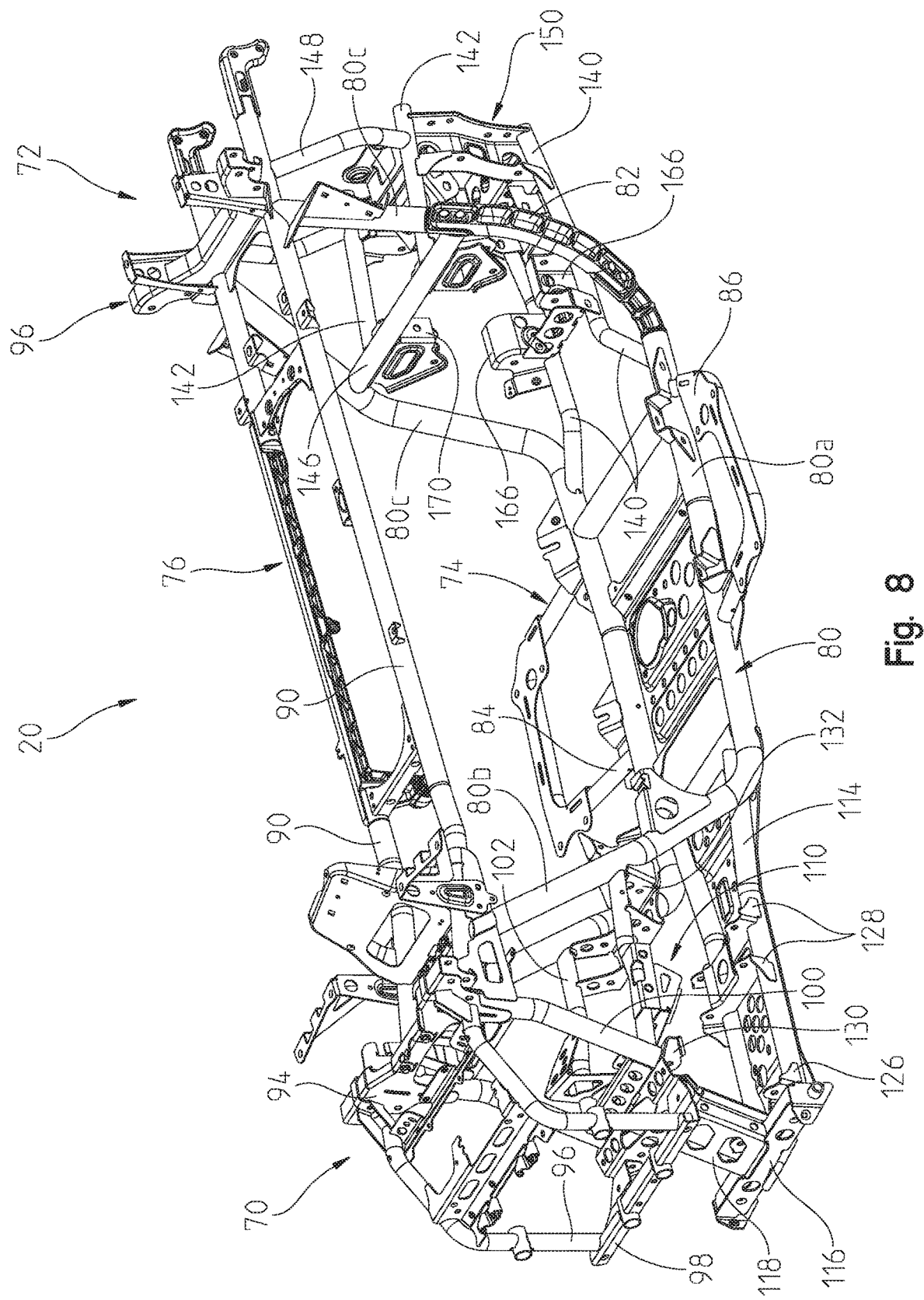
FIG. 8 is a front left perspective view of the frame for the ATV of FIGS. 1-7.
Figure 9:
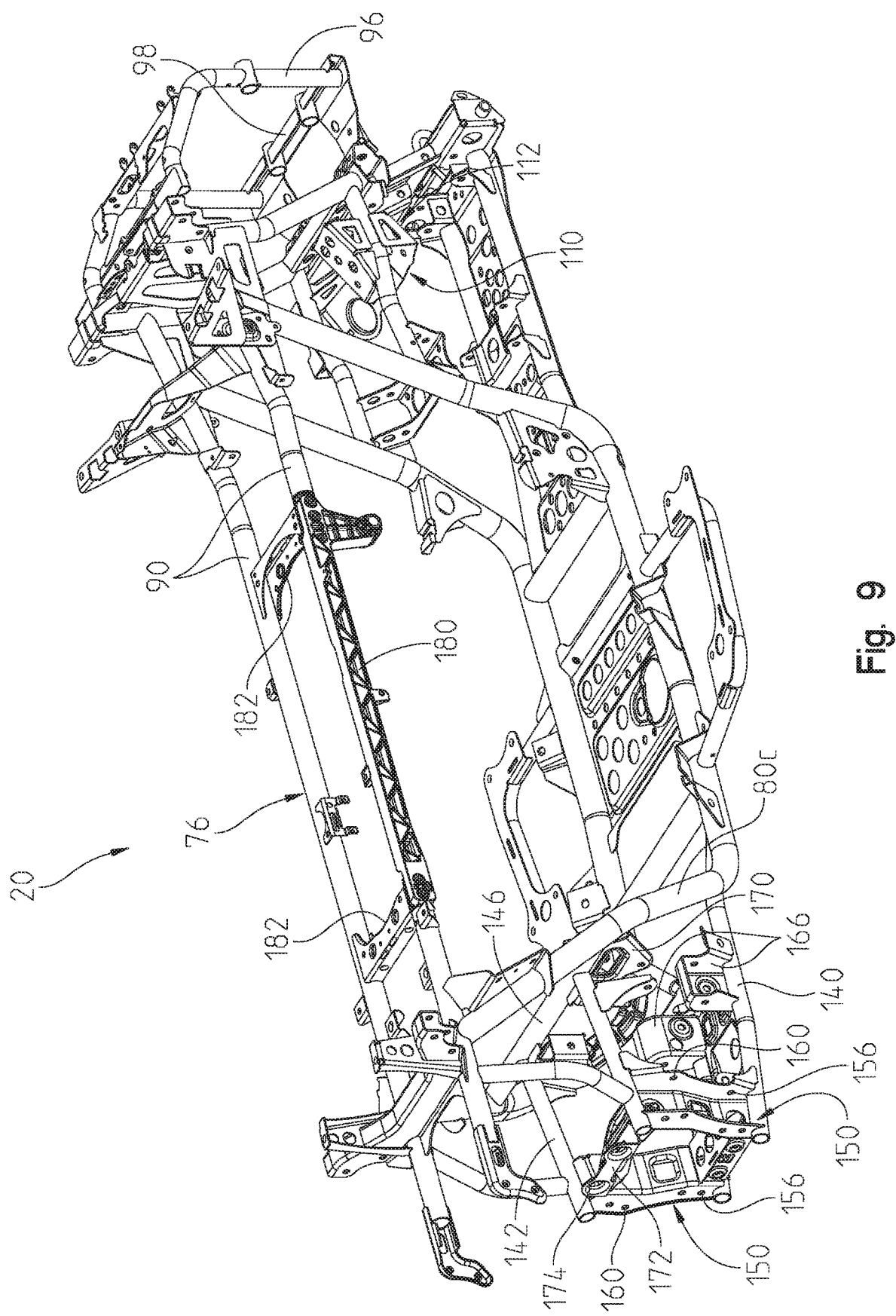
FIG. 9 is a right rear perspective view of the frame of FIG. 8.

With reference now to FIGS. 8 and 9, frame 20 will be described in greater detail. As shown, frame 20 includes a front frame portion 70, a rear frame portion 72, a foot support portion 74 and a seat support portion 76. Frame 20 is generally defined by longitudinally extending tubes 80 having horizontal sections 80a, which turn upwardly and forwardly at portions 80b and turn upwardly and rearwardly at portions 80c. A removable forging 82 is provided on the driver's side of the vehicle, such that removal provides an access opening for installing or servicing components of the ATV. Foot support portion 74 is defined by a U-shaped tube 84 coupled to the two portions 80a and including mounting brackets 86. Seat support portion 76 is defined by longitudinally extending tubes 90 which couple at the top ends of frame tube portions 80b and 80c. Front ends of tubes 90 terminate in a cross brace 94, while tubes 90 support a rear cross brace 96.

Front frame portion 70 includes front tubes 96 extending upwardly from a cross brace 98 to couple to a front side of cross brace 94. Upright tubes 100 extend upwardly from cross brace 98 and couple with tubes 96. Tubes 102 extend longitudinally between tube portions 80b and tubes 100, and support a steering system support bracket 110, as described further herein. Bracket 110 includes a lower bracket portion 112 fixed to tubes 102, for example, by welding. Frame 20 further includes lower tubes 114 which couple between tubes 80 and a front brace 116, where brace 116 includes an upright portion 118 which couples to cross brace 98. Four attachment brackets are provided for mounting of the front suspension 56, namely, a front lower bracket 126, a lower rear bracket 128, an upper front bracket 130 and an upper rear bracket 132. These same brackets 126, 128, 130 and 132 are replicated on the right hand side in a mirror image configuration.

Rear frame portion 72 includes lower tubes 140 coupled to tubes 80a which extend rearwardly, while longitudinal tubes 142 extend rearwardly from a cross tube 146. Vertical tubes 148 extend upwardly between tubes 142 and 90. Braces 150 extend upwardly between tubes 140 and 142 and provide a first attachment point 156 (FIG. 9) for a rear lower coupling for the rear suspension 58 and an upper coupling point 160 for the rear suspension 58. A front lower bracket 166 is coupled to each of the tubes 140 for a front lower coupling point of rear suspension 58, while an upper bracket 170 provides coupling for a front upper coupling point for rear suspension 58. A muffler support 172 is positioned at a rear of the frame 20 and straddles frame members 142, and includes apertures 174.

Finally and with respect to seat support portion 76, a forging 180 is provided, interrupting a length of the passenger side tube 90 which couples to cross braces 182 and which is removable for the assembly and/or servicing of the vehicle components, such as powertrain components.

Figure 10:
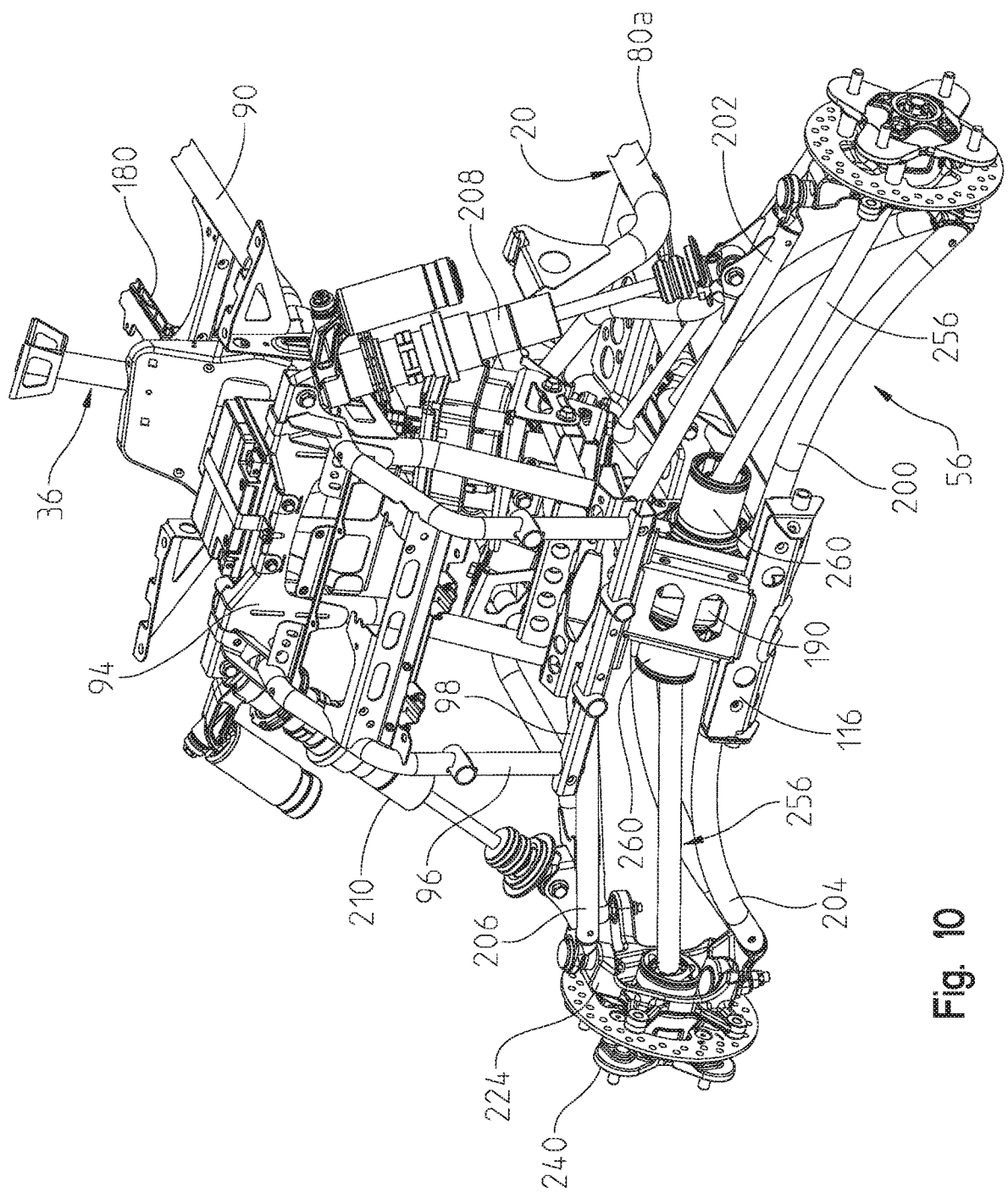
FIG. 10 is a front left perspective view of a 55" wide version of the ATV showing the front suspension and steering system.

With reference now to FIGS. 10-16, the front suspension 56 of the 55" vehicle will be described. With reference first to FIG. 10, a front end of the vehicle is shown without the wheels and the front body 22 which exposes the front suspension 56 and frame 20. A front drive 190 is also shown to drive the front wheels 4 from the powertrain. As is known, at the front end of the vehicle, the steering system 36, the front suspension 56 and the front drive 190 all cooperate together.

As shown in FIG. 10, front suspension 56 includes a lower left A-arm 200, upper left A-arm 202, lower right A-arm 204 and upper right A-arm 206. Shock absorbers 208 and 210 couple between upper A-arms 202, 206 and upper brace 94, respectively. Inner ends of lower left A-arm 200 couple to coupling points 126, 128 (FIG. 8), while inner ends of upper left A-arm 202 couple to coupling points 130, 132 (FIG. 8). Right A-arms 204, 206 are likewise coupled to like coupling points of the frame 20 on the right-hand side. As shown best in FIG. 12, upper A-arms 202 and 206 have an upwardly directed bend at 220 which is profiled to provide clearance for steering arm 222. As will be discussed further herein, steering arm 222 is coupled at an inner end to a motor of the steering system 36, and is coupled at its outer end to knuckle 224. Knuckle 224 is coupled to A-arms 204, 206 by way of pins 230, 232. Knuckle 224 includes an extension 234 which couples to threaded posts 236 of steering arm 222. Wheel hubs 240 are provided having studs 242 for mounting wheels 4.

Figure 13:
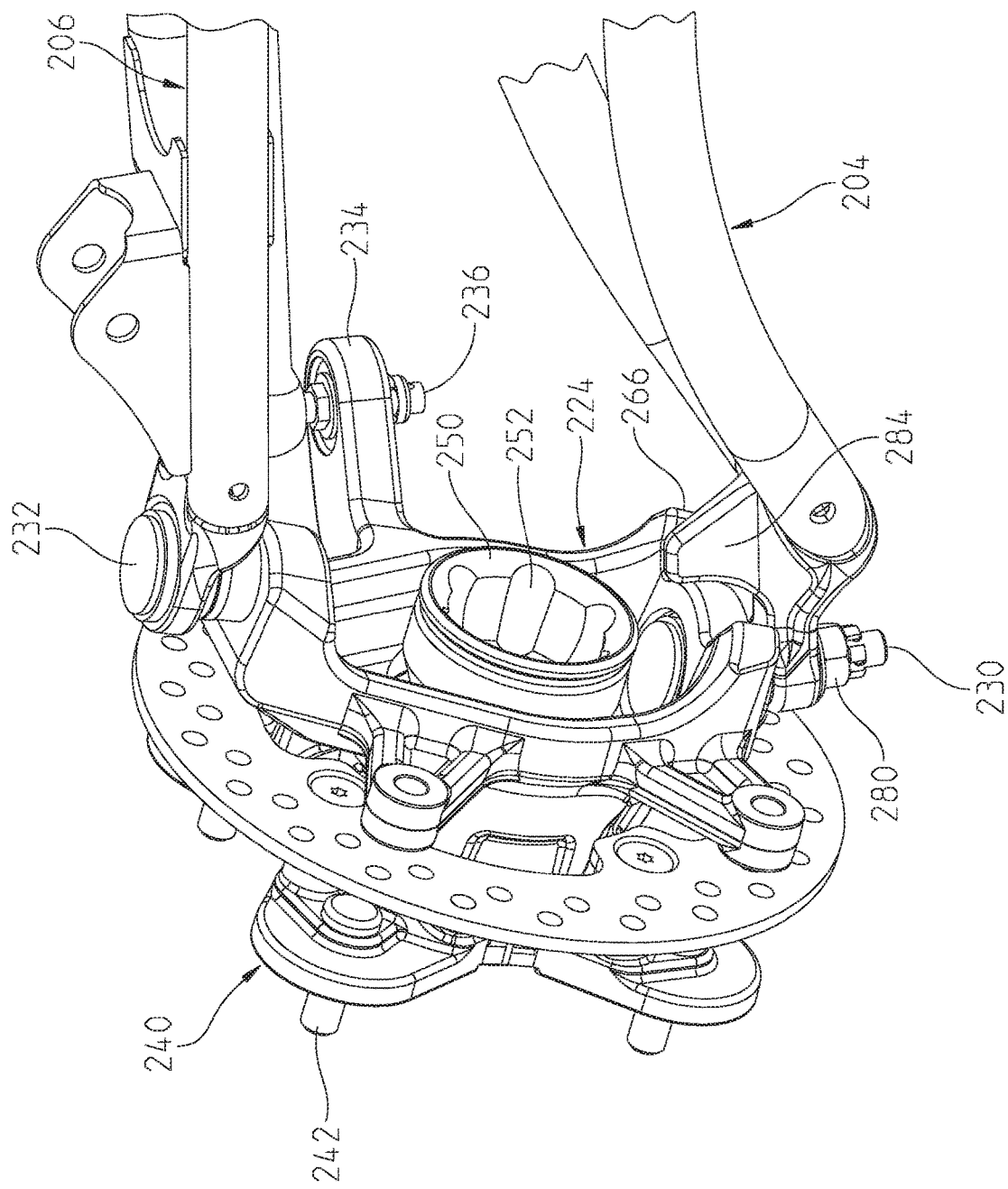
FIG. 13 is a front left perspective view of the wheel hub shown in FIG. 12.
Figure 14:
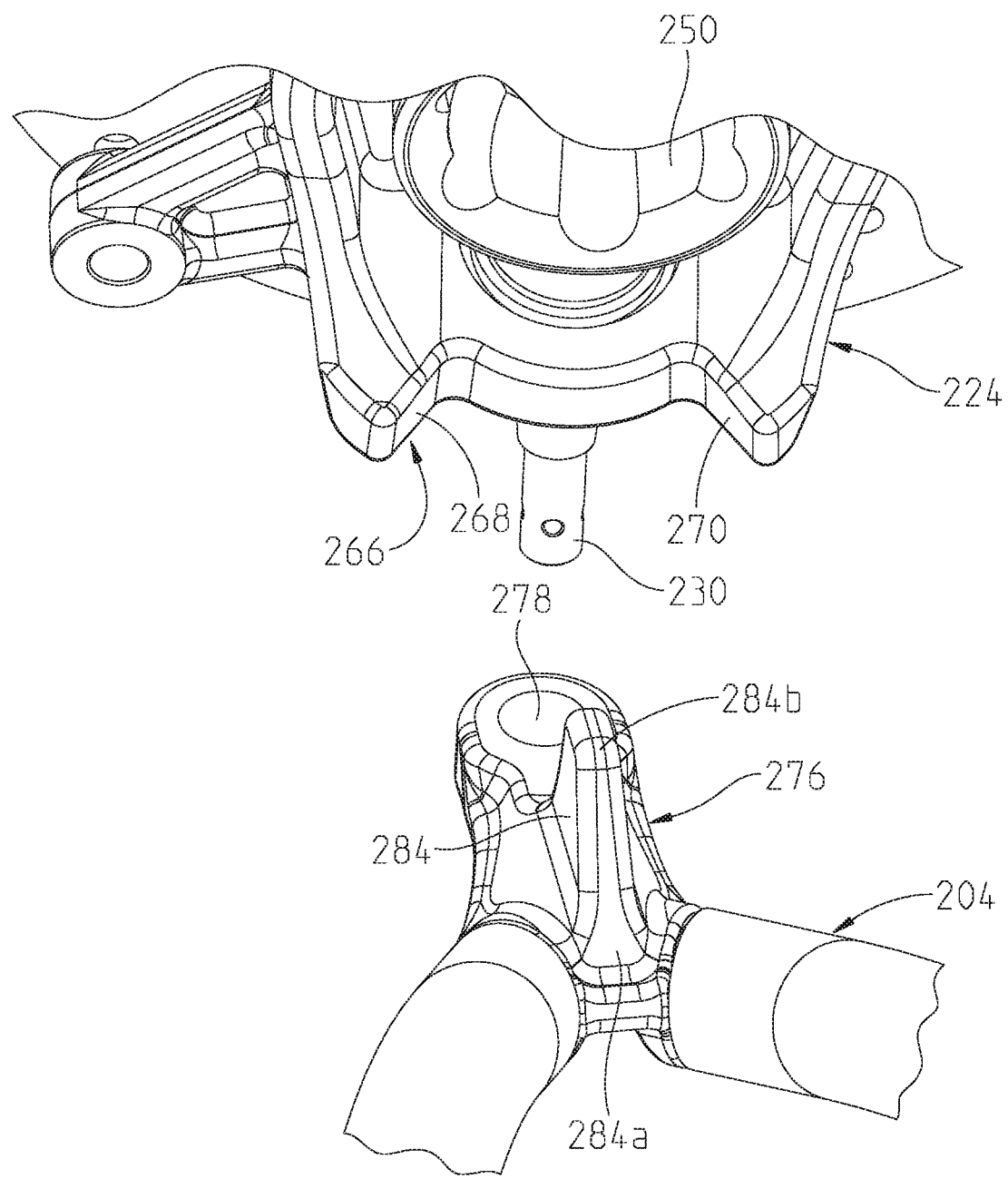
FIG. 14 is an exploded view of the wheel hub coupling to the lower A-arm of FIG. 13.

As shown best in FIG. 13, hub 240 includes a constant velocity joint 250 having an inner profiled geometry 252 which is suitable for driving by way of a half shaft (or constant velocity (CV) shaft) 256 (FIG. 10), as is known in the art. Inner ends of half shafts 256 likewise include drive portions to be driven by constant velocity couplings 260 (FIG. 10) from the drive unit 190. As shown best in FIGS. 13 and 14, knuckle 224 includes an integrated stop member 266 in the form of an arcuate slot having extreme contact surfaces 268 and 270 (FIG. 14). Meanwhile, lower right A-arm 204 includes a coupling 276 having an opening at 278 which is received over pin 230 to receive a castellated nut 280 (FIG. 13) to couple lower A-arm 204 to knuckle 224. As shown, coupling 276 includes an integrated stop member 284 defining an upstanding post having a shark fin geometry, whereby hub 224 can rotate about an axis defined by pins 230, 232 to the extreme positions where surface 268 or 270 contacts stop member 284.

The forging also makes contact at a 45° angle instead which increased the strength significantly. This design is lighter and gives greater control to the stop. The shark fin 284 is wider at the base 284a, as compared to the top 284b, (see FIG. 14) which allows a progressive steering stop and limits the steering angle as the wheel travels downward to protect the half shafts 256 (FIG. 10) at suspension full extension.

Figure 15:
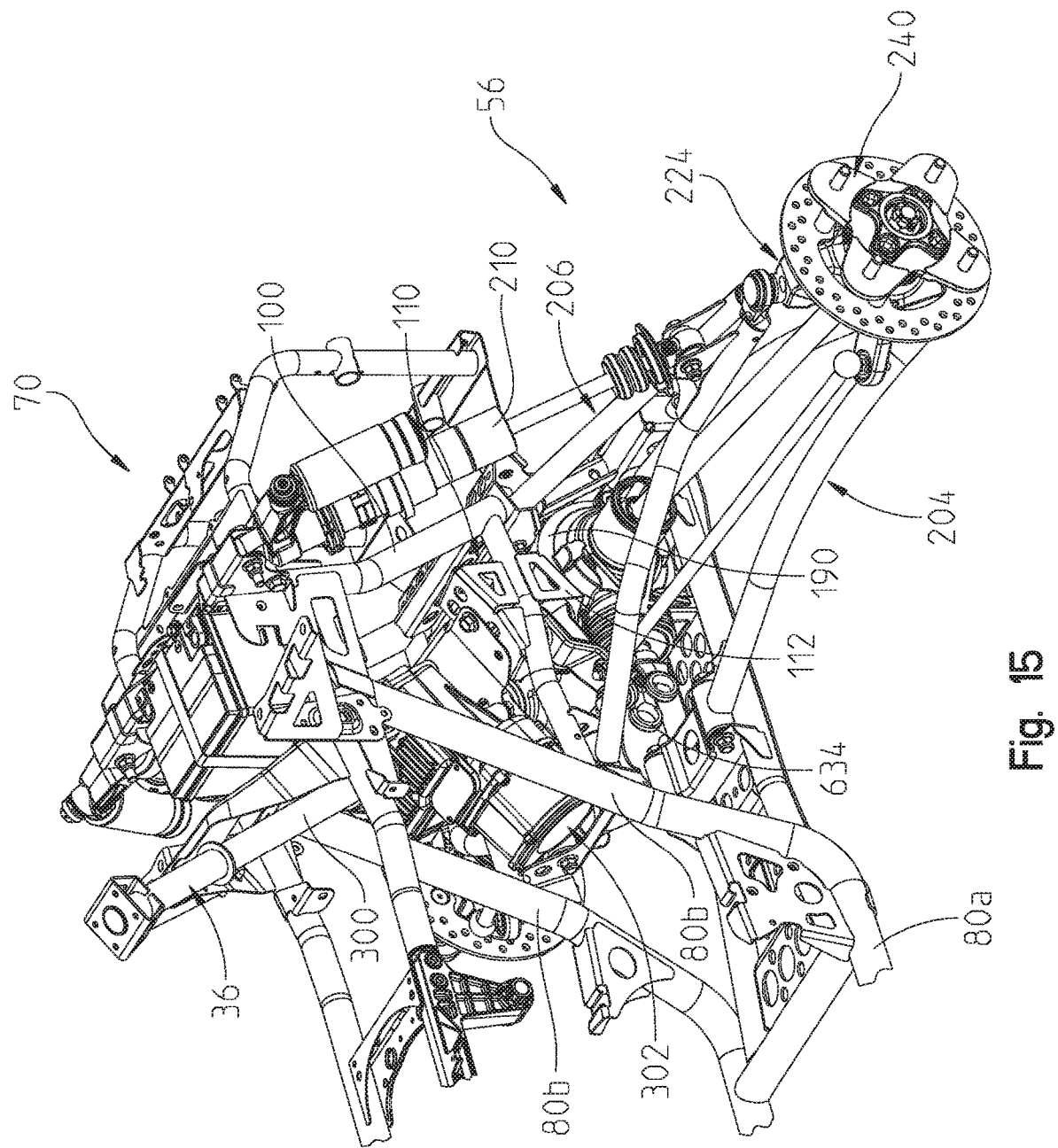
FIG. 15 is a right rear perspective view of the ATV shown in FIG. 10.
Figure 16:
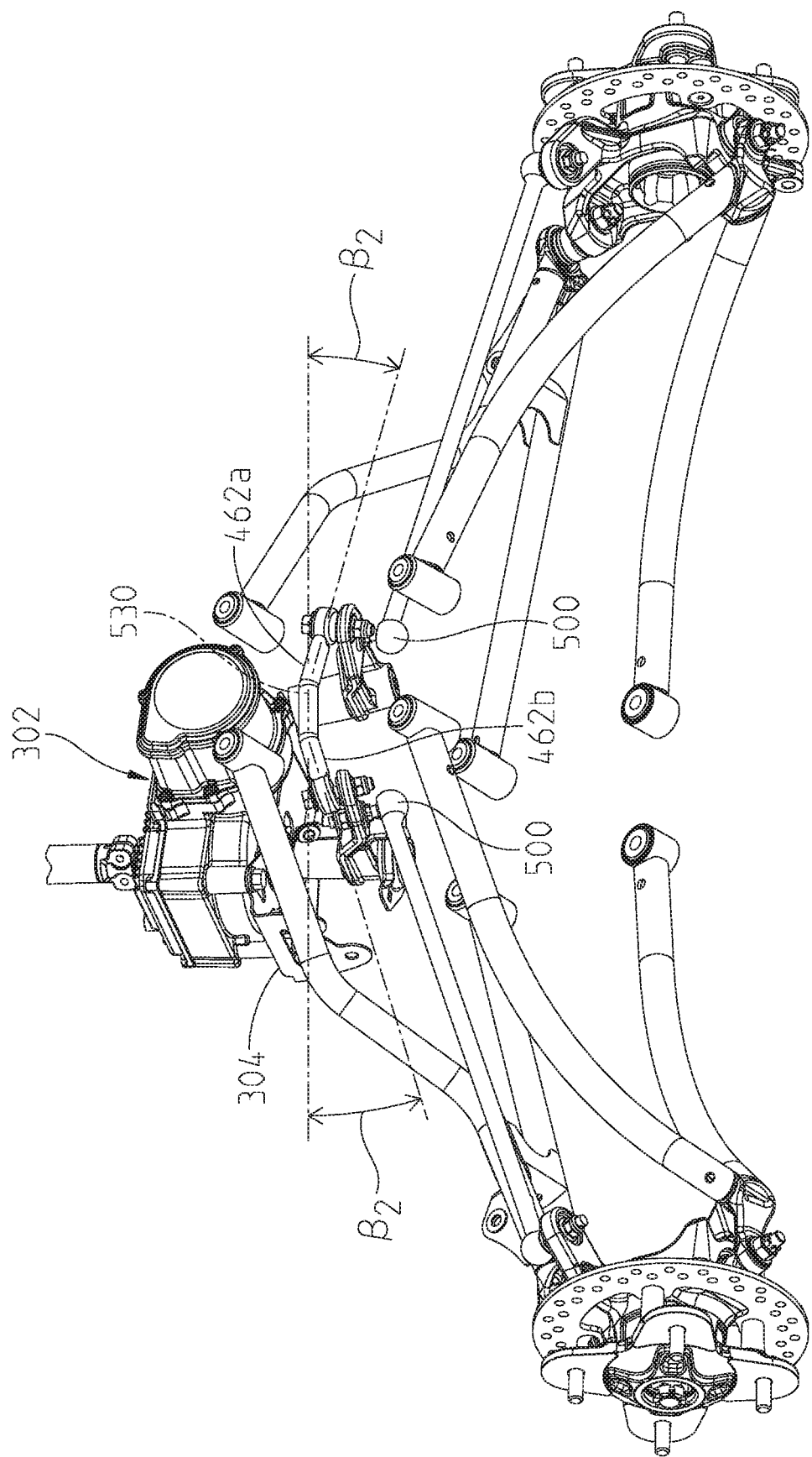
FIG. 16 is an underside perspective view of the suspension and steering system.
Figure 17:
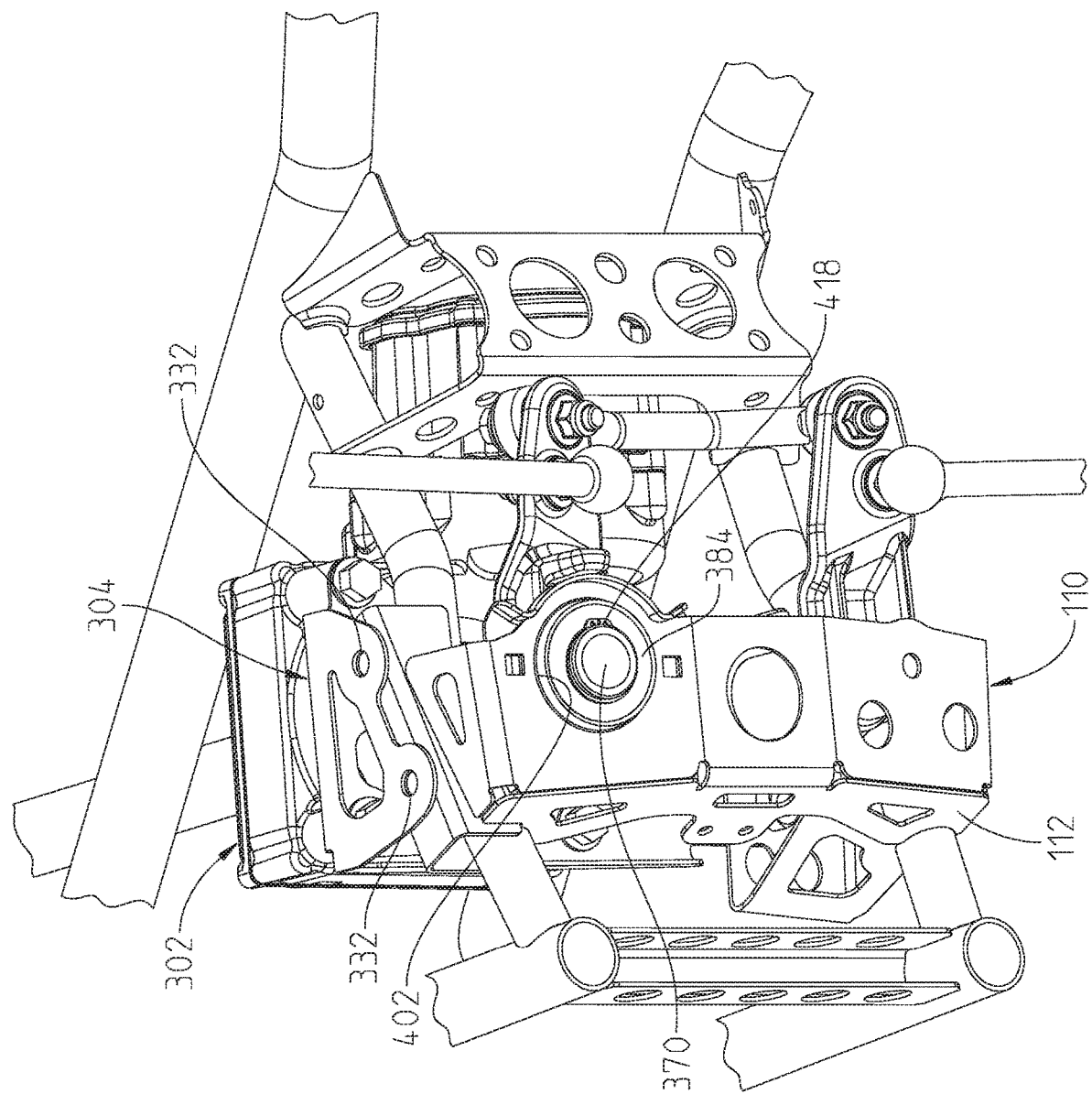
FIG. 17 is an underside perspective view showing the electric power steering unit mounting and the steering arm linkage.
Figure 18:
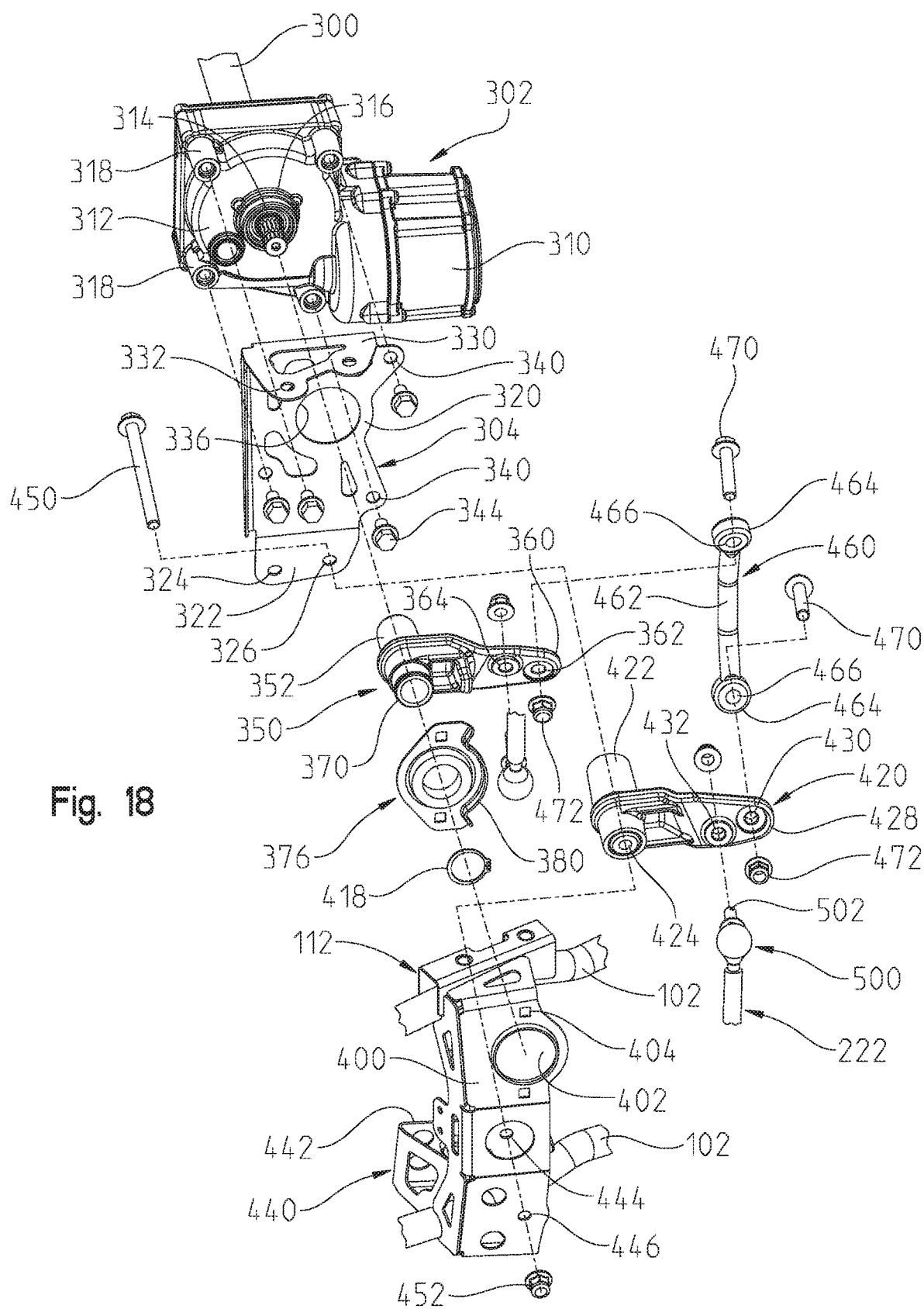
FIG. 18 is an exploded view of the electric power steering unit mounting and steering linkage of FIG. 17.

With reference now to FIGS. 15-21, steering system 36 will be described in greater detail. With reference first to FIG. 15, steering system 36 includes a steering post 300 extending downwardly from handlebars 38 (FIG. 1) to a power steering motor 302. As shown best in FIG. 17, steering system support bracket 110 further comprises an upper bracket portion 304. Steering motor 302 is coupled to bracket portion 304 (FIG. 16), which in turn couples to lower bracket portion bracket 112 (FIG. 15). With reference now to FIGS. 17 and 18, the mounting of steering motor 302 will be described in greater detail. As shown best in FIG. 18, power steering motor 302 includes a motor portion 310 and an output portion 312 having a splined drive shaft 314 extending through a bearing cap 316. Four threaded bosses 318 are provided for coupling to bracket 304. As shown, bracket 304 includes an upper plate 320 having a bracket tab 322 extending from one end thereof having apertures 324 and 326. At the opposite end, a bracket sidewall is provided at 330 having apertures at 332 (FIG. 17). Plate portion 320 includes an enlarged aperture at 336 (FIG. 19) which fits over bearing cap 316, as best shown in FIG. 17. Plate portion 320 further includes apertures 340 (FIG. 19) which align with the threaded bosses 318 to receive fasteners 344 therethrough coupling bracket 304 to a lower side of steering motor 302, as shown best in FIG. 18.

Figure 19:
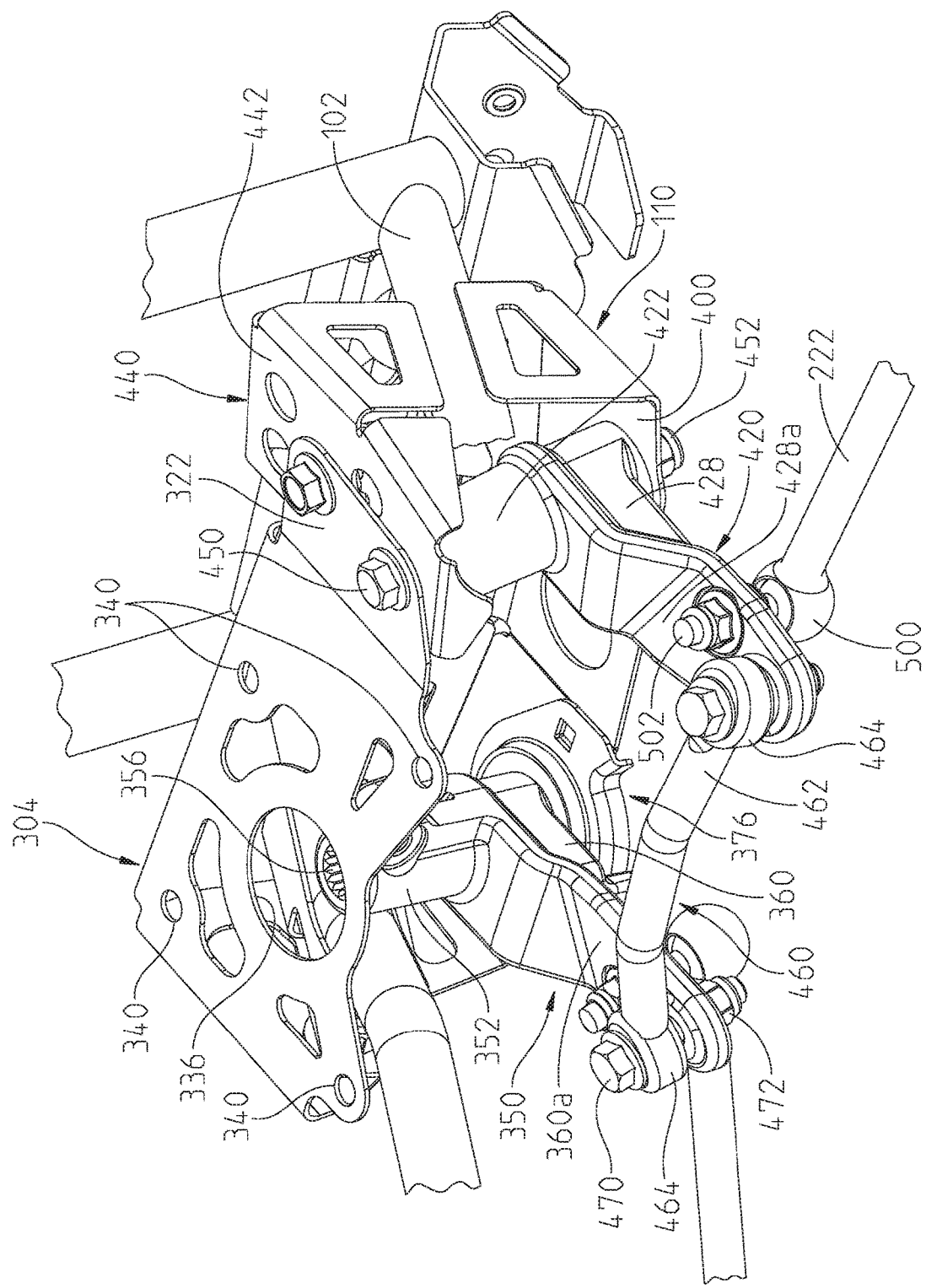
FIG. 19 shows a rear right perspective view of the steering linkage of FIG. 18.

As should be appreciated, when bracket 304 is coupled to the bottom of steering motor 302, splined shaft 314 protrudes through aperture 336. A drive pitman arm 350 is provided having a coupling 352 having an inner spline 356 (FIG. 19). Pitman arm 350 includes an arm portion 360 having an aperture 362 adjacent a free end of the arm 360 and an aperture 364 intermediate aperture 362 and shaft portion 370. Shaft portion 370 is received in a bearing assembly 376 having a plate portion 378 (FIG. 21) including a rotatable stop portion 380 having stop surfaces 380a and 380b with a bearing 384 extending therethrough. Bearing assembly 376 can be coupled to lower bracket 110 as described herein. Lower bracket 112 includes a plate portion 400 (FIG. 18) having an aperture at 402 to receive bearing portion 384. Plate portion 400 includes square apertures 404 which align with square apertures 406 on bearing assembly 376 which, as can be appreciated, receive carriage bolts therethrough to couple the bearing assembly 376 to the plate portion 400.

Figure 21:
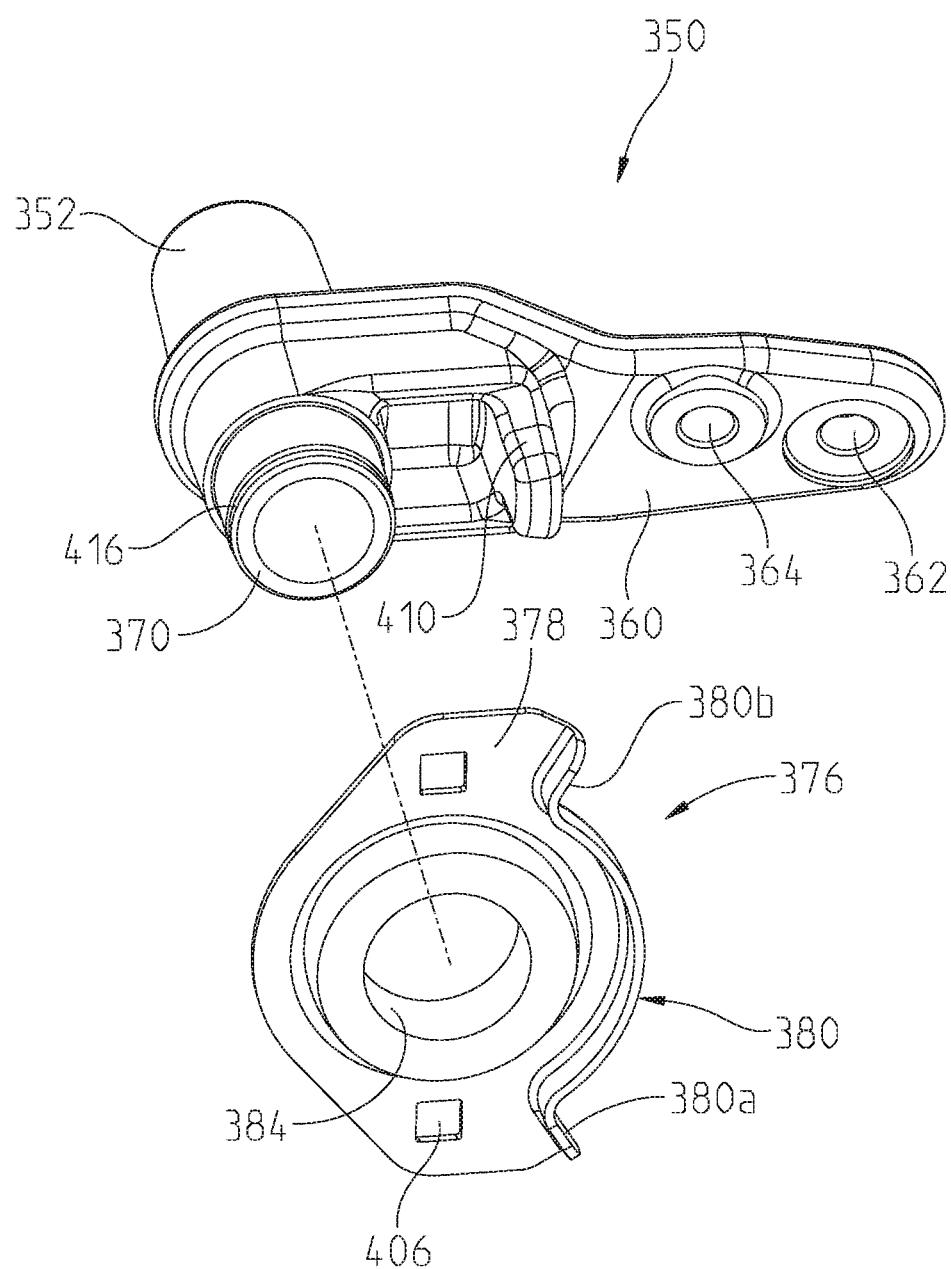
FIG. 21 is a lower perspective view showing the driven pitman arm together with the steering stop.

As shown best in FIG. 21, drive pitman arm 350 includes a stop member 410 which rotates between the extreme portions of surfaces 380a and 380b under the influence of splined shaft 314. Finally, drive pitman arm 350 includes a groove 416 (FIG. 21) to receive a snap ring 418 (FIG. 18), therein which retains the shaft portion 370 in the bearing 384, and the pitman arm 350 to the splined shaft 314. The steering stop 380, 410 on the post protect the CV shafts 256 primarily, the post stop protects the wheels 4 from contacting the bodywork during neutral suspension position. The plate 380 is interchangeable and allows adjustment of the stop position which is important at the neutral position when larger tires are desired.

Figure 20:
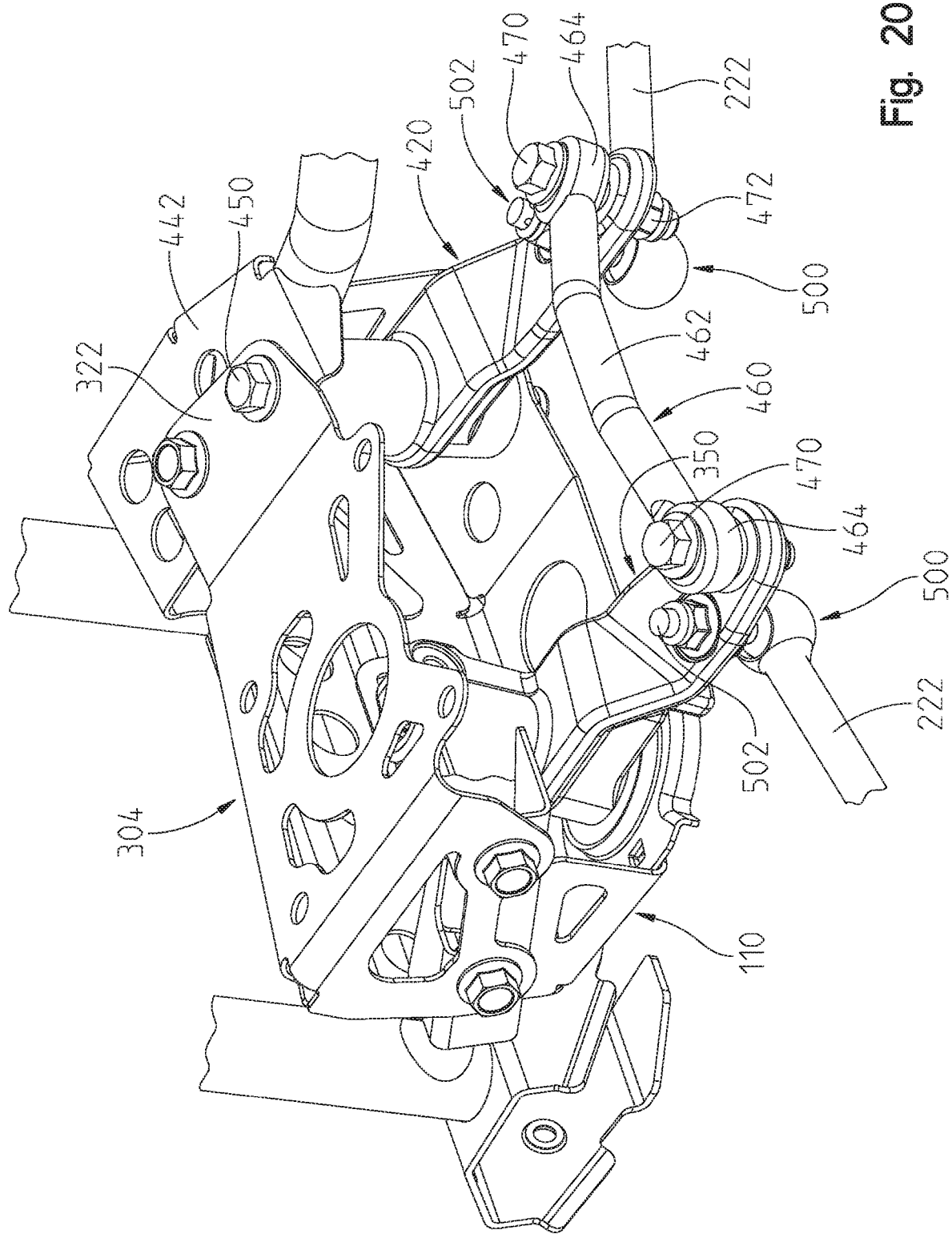
FIG. 20 is a rear left perspective view of the linkage of FIG. 19.

As shown best in FIG. 18, a driven pitman arm is shown at 420 which is similarly constructed as pitman arm 350, however it does not have a splined shaft as it is driven by pitman arm 350. Rather, pitman arm 420 includes a cylindrical bearing portion 422 having a through opening at 424. Pitman arm 420 also includes an arm portion 428 having apertures 430 and 432. As shown best in FIG. 18, bracket 112 includes a portion 440 (FIGS. 18-19), which is coupled to tubes 102 having upper plate portion 442 having an aperture 444 aligned with aperture 446 of lower plate portion 400. Thus, as shown in FIGS. 19, 20, driven pitman arm 420 can be coupled between bracket portions 112, 304 by way of a fastener 450 extending through aperture 326 of tab portion 322 extending downwardly through aperture 424 of driven pitman arm 420 and through apertures 444, 446 of bracket portion 112. A complementary fastener 452 may be coupled to fastener 450 to retain driven pitman arm 420 in place.

With reference still to FIGS. 18 and 19, drive and driven pitman arms 350, 420 are coupled together by way of a drag link 460, where drag link 460 includes a bar portion 462 having couplings 464 at each end. Each coupling 464 includes an aperture 466 which align with apertures 362 and 430 to receive fasteners 470 therethrough. Fasteners 470 couple with fasteners 472 to retain drag link 460 in a coupling relationship with the drive pitman arm 350 and driven pitman arm 420, as shown best in FIG. 19.

Finally, with respect to FIG. 18, steering arms 222 each include a ball joint 500 having a threaded end 502, where each of the threaded ends 502 is received in one of the apertures 364 or 432. Thus, as should be appreciated, input from the splined shaft 314 to drive pitman arm 350 causes a like rotation of the driven pitman arm 420 by way of drag link 460, which in turn causes transverse movement of the steering arms 222 in a push-pull relationship with the pitman arms 350, 420 depending upon the direction of rotation.

Figure 11:
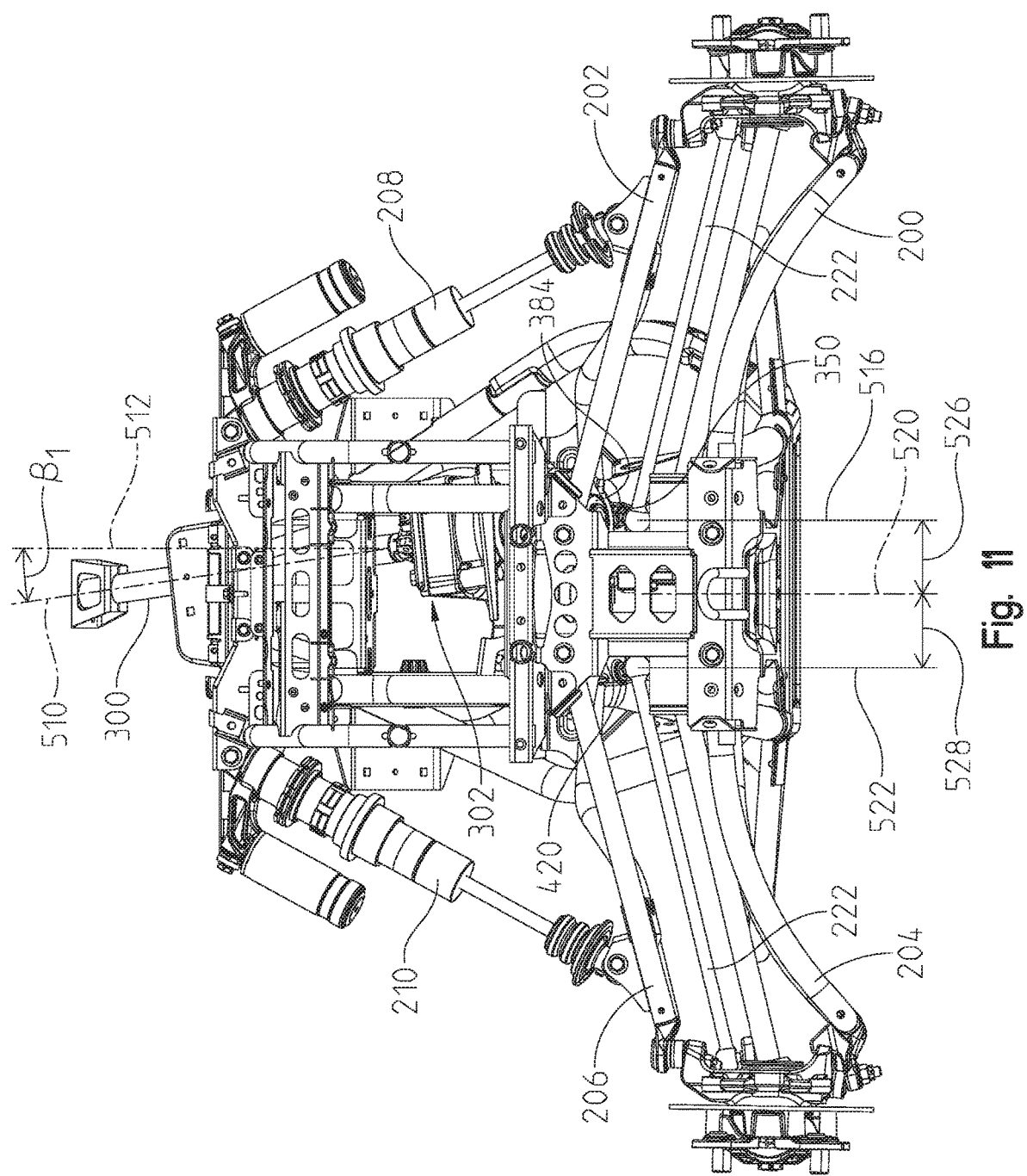
FIG. 11 is a front view of the ATV front suspension and steering system of FIG. 10.
Figure 12:
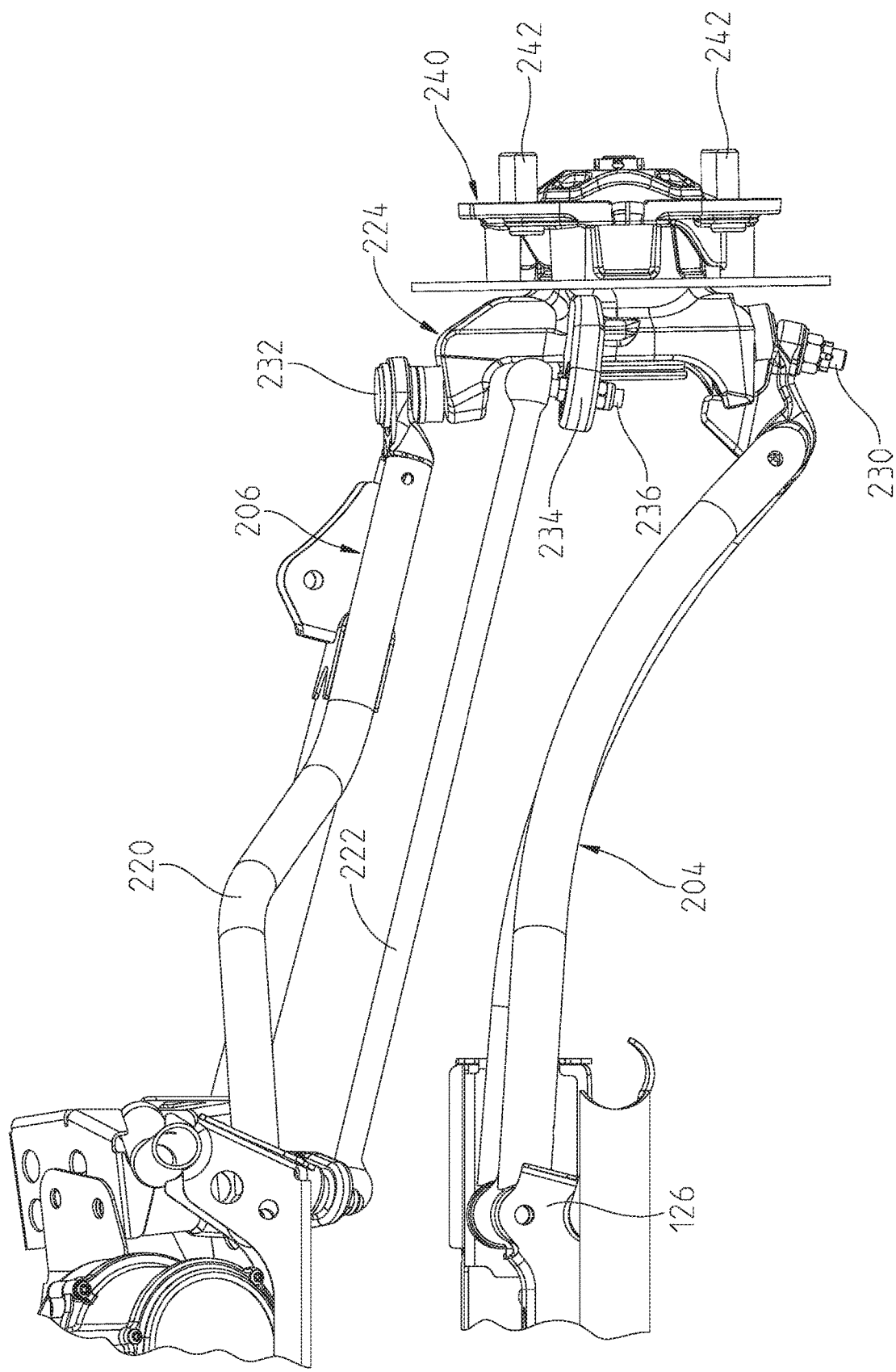
FIG. 12 is an enlarged rear view of the right-hand suspension system of FIG. 11.

With reference now to FIGS. 11 and 16, further features of the steering system will be described. As shown best in FIG. 11, the steering shaft 300 extends along a non-vertical axis 510 with respect to vertical axis 512 to provide an angular offset $\beta_1$, where $\beta_1$=approximately 8.5°, but could be in a range from 5°-12°, and more particularly from 7°-10°. This positions the center of the left inner ball joint 500 (FIG. 16) at a left vertical position 516. As shown in FIG. 11, vertical position 516 is offset from the vertical center line 520 and the vertical center 522 of the right inner ball joint 500 is laterally offset from vertical center line 520 as well. As shown, left inner ball joint 500 is offset from the vertical center line 520 by a distance of 526, whereas the right inner ball joint 500 is offset from the vertical center line 520 by a distance of 528, where distances 526 and 528 are equal, and are equal to 3.25", but could be in a range from 2"-5. Thus, the laterally offset steering motor in combination with the drag link 460 eliminates the bump steer that is introduced into the suspension.

Furthermore, with reference to FIGS. 16 and 19, each of the arm portions 360 and 428 of respected pitman arms 350 and 420 include portions skewed at 360a and 428a relative to a horizontal axis 530 such that portions 462a and 462b of drag link 460 form angles $\beta_2$ relative to horizontal axis 530, where $\beta_2=15°$, but could be in range from 10°-20°.

Figure 22:
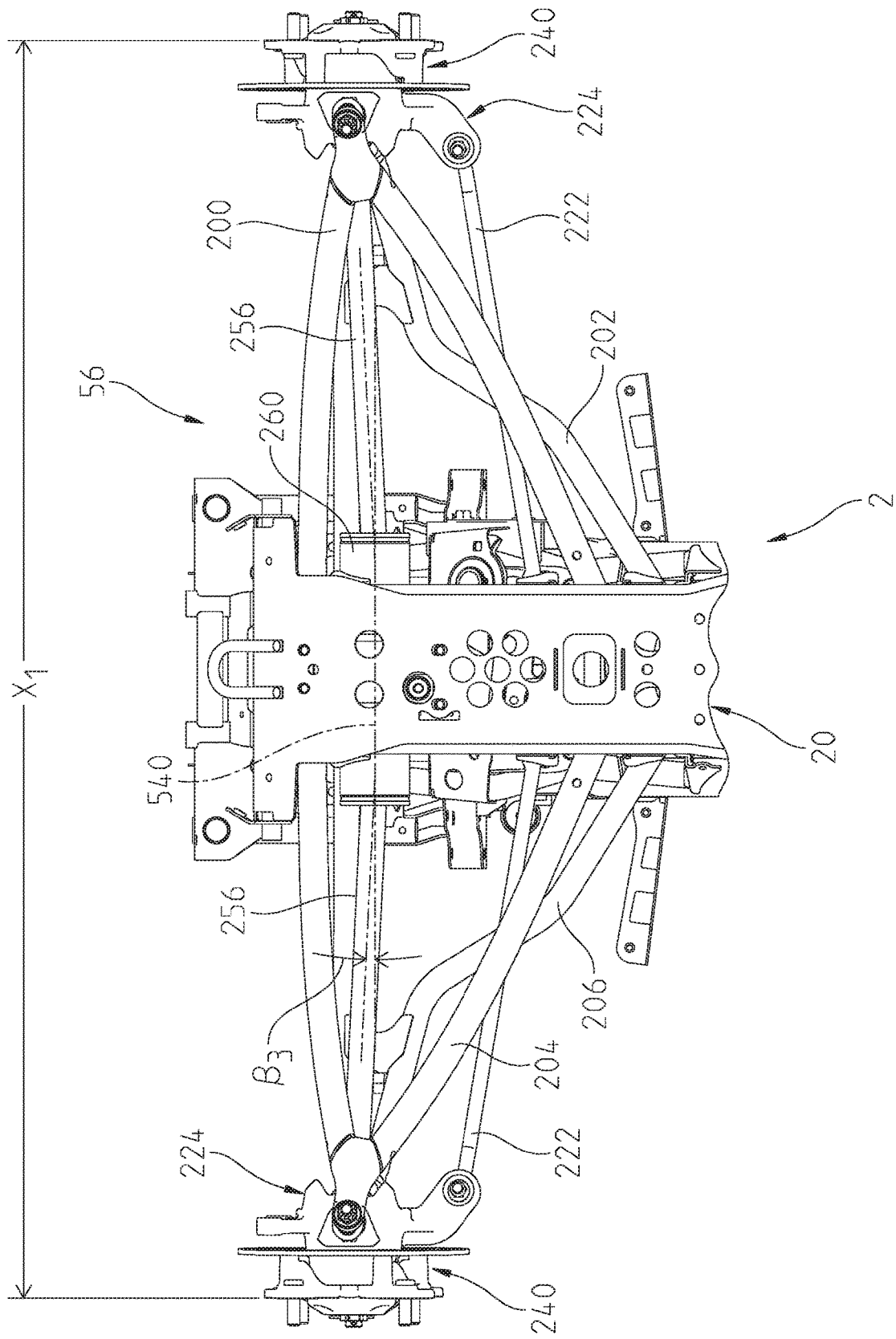
FIG. 22 is an underside view showing the suspension of a 55" wide ATV.
Figure 23:
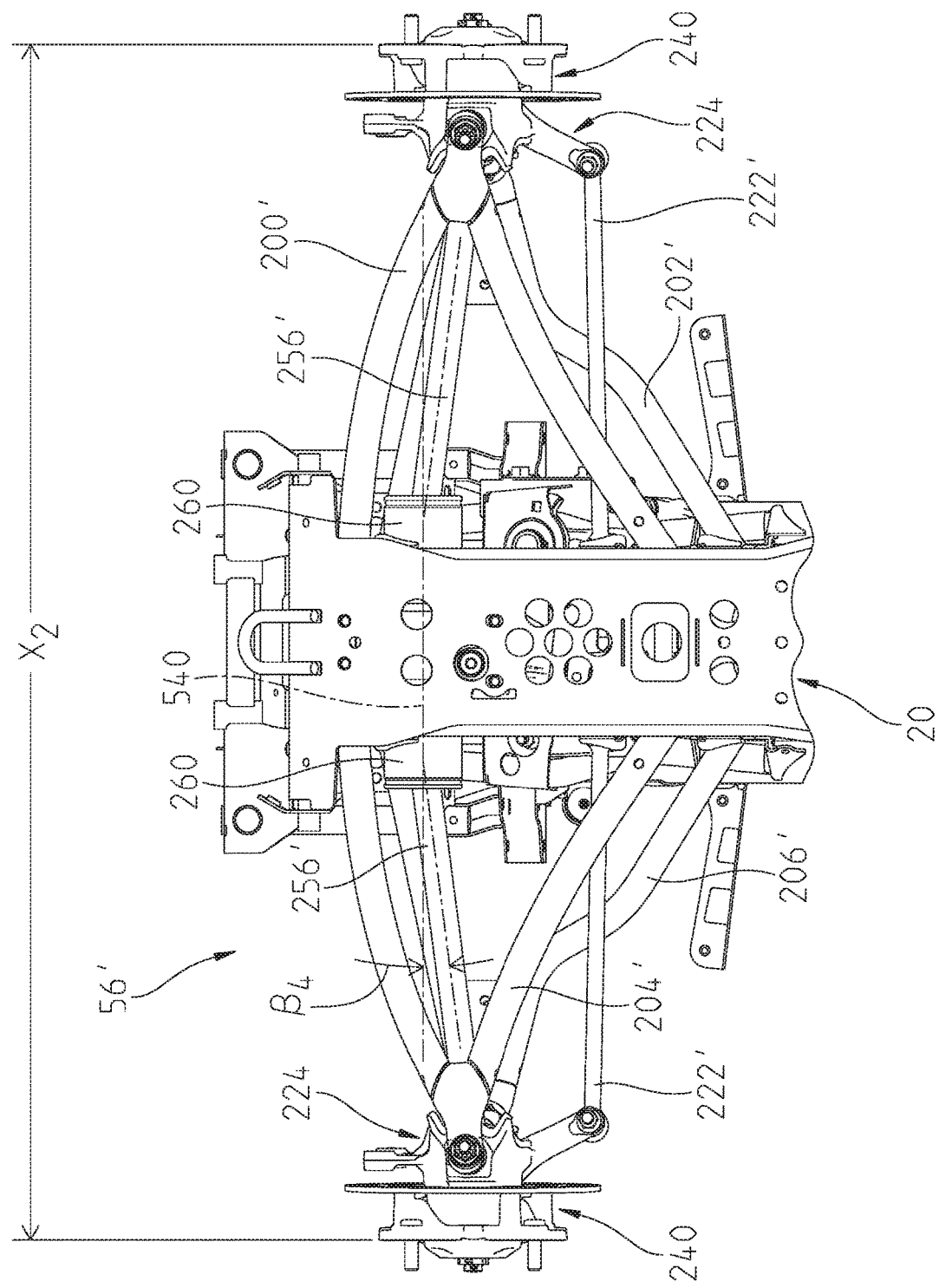
FIG. 23 shows a view similar to that of FIG. 22 showing the suspension of a 48" wide ATV.

With reference now to FIGS. 22 and 23, the front suspension of the 48" and 55" vehicles will be distinguished. With reference first to FIG. 22, ATV 2 is in the form of the 55" vehicle where a distance from outer faces of wheel hubs 240 is shown by a lateral distance $X_1$, where $X_1=49$". In this way, the distance $X_1$ plus the width dimensions of the tires would approximate the 55" width vehicle. It should also be understood that the suspension as described with respect to FIGS. 10-16, depict the 55" vehicle such that the upper and lower A-arms 200, 202; 204, 206 relate to the 55" vehicle. The half shafts 256 are also of a different length to accommodate the wider vehicle. As shown in FIG. 22, the wheel hubs 240 are positioned further forward relative to the frame 20 such that the half shafts 256 sweep forward relative to a horizontal center line 540 through the couplings 260. As shown, the half shafts 256 are swept forward by an angle $\beta_3$, where $\beta_3=2.8°$, but could be in a range from 0°-5°.

With reference now to FIG. 23, the front suspension for the 48" vehicle is shown at 56', where the front suspension 56' includes left A-arms 200' and 202' and right A-arms 204' and 206'. The half shafts 256' are also of a different length to accommodate the lateral difference between the couplings 260 and the hubs 240. As shown, the lateral distance between front faces of the hubs 240 is $X_2$, such that the distance $X_2$ plus the width of the wheels equates to the 48" vehicle. As shown, $X_2=42$". As also shown in FIG. 23, the half shafts 256' are swept rearwardly relative to the lateral center line 540 such that an angle $\beta_4$ is defined which reduces the wheel base of the vehicle relative to the 55" vehicle described in FIG. 22. As shown, the steering system 36 of the 48" and 55" vehicle are identical with the exception that the steering arms 22' of the 48" vehicle are somewhat shorter to accommodate the width difference of the vehicles. As also shown, $\beta_4=7.4°$, but could be in a range from but could be in a range from 5°-10°.

Figure 24:
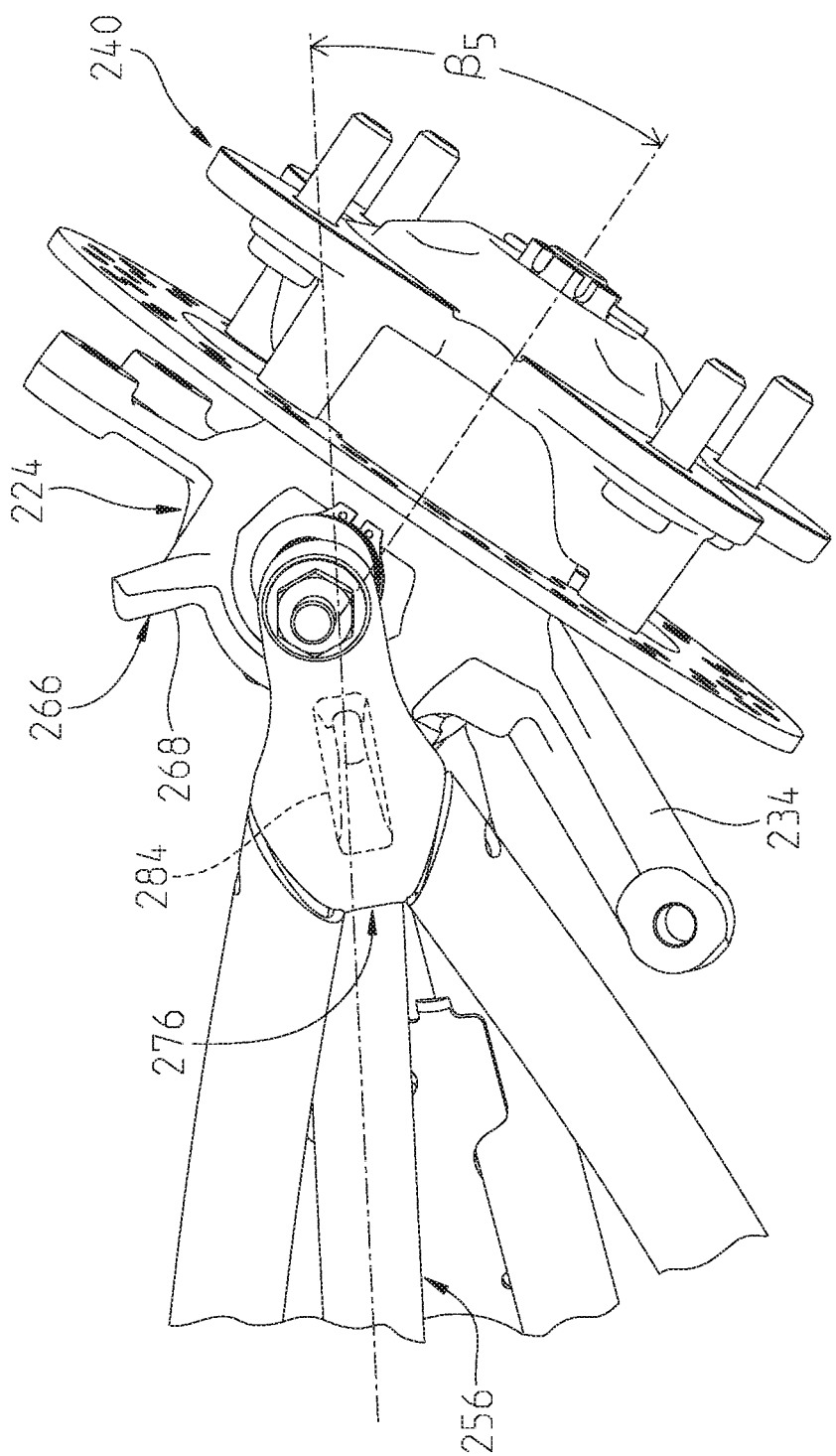
FIG. 24 shows a bottom view of the left side suspension of a 55" wide ATV.
Figure 25:
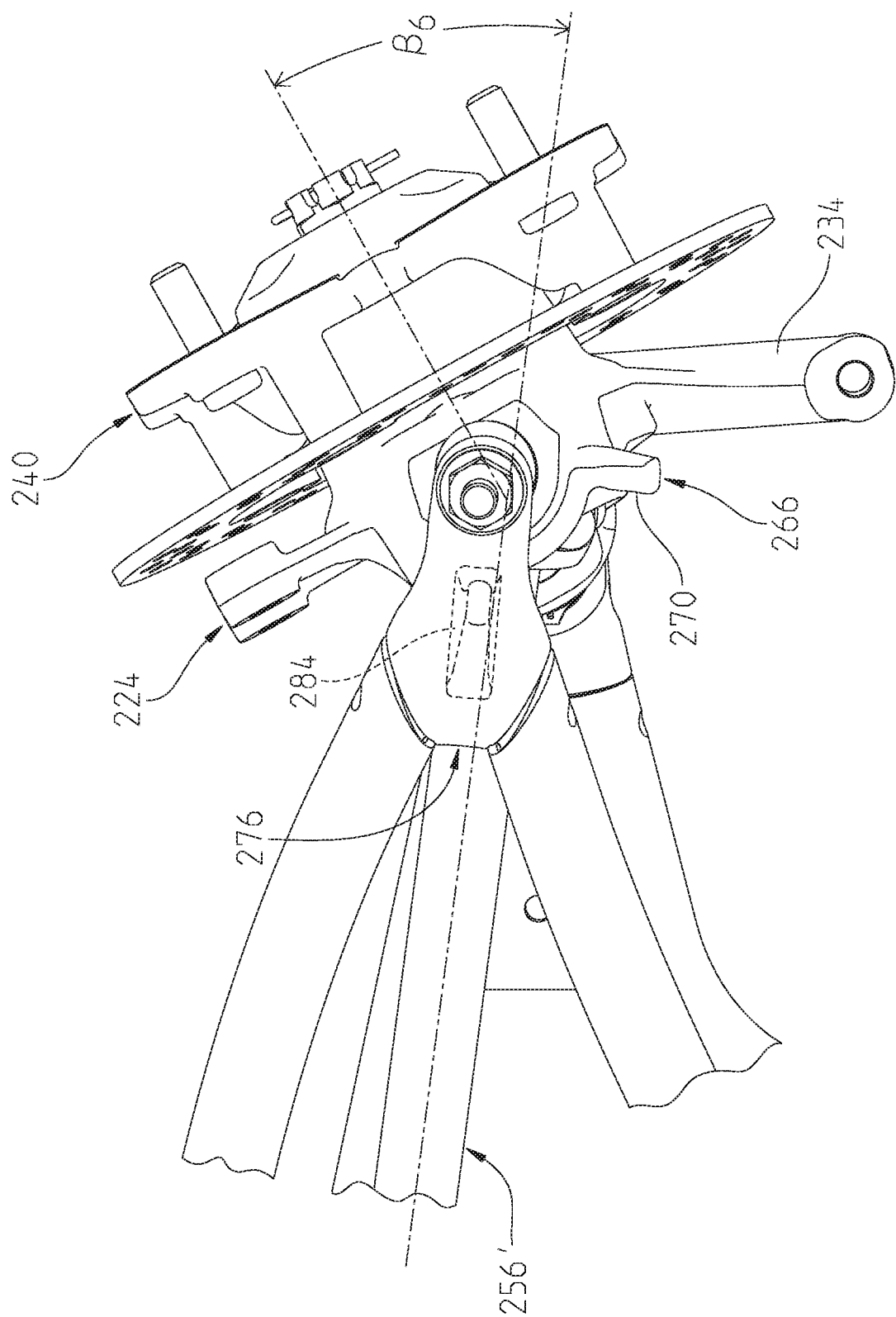
FIG. 25 shows a bottom view of the left side suspension of a 48" wide ATV.
Figure 26:
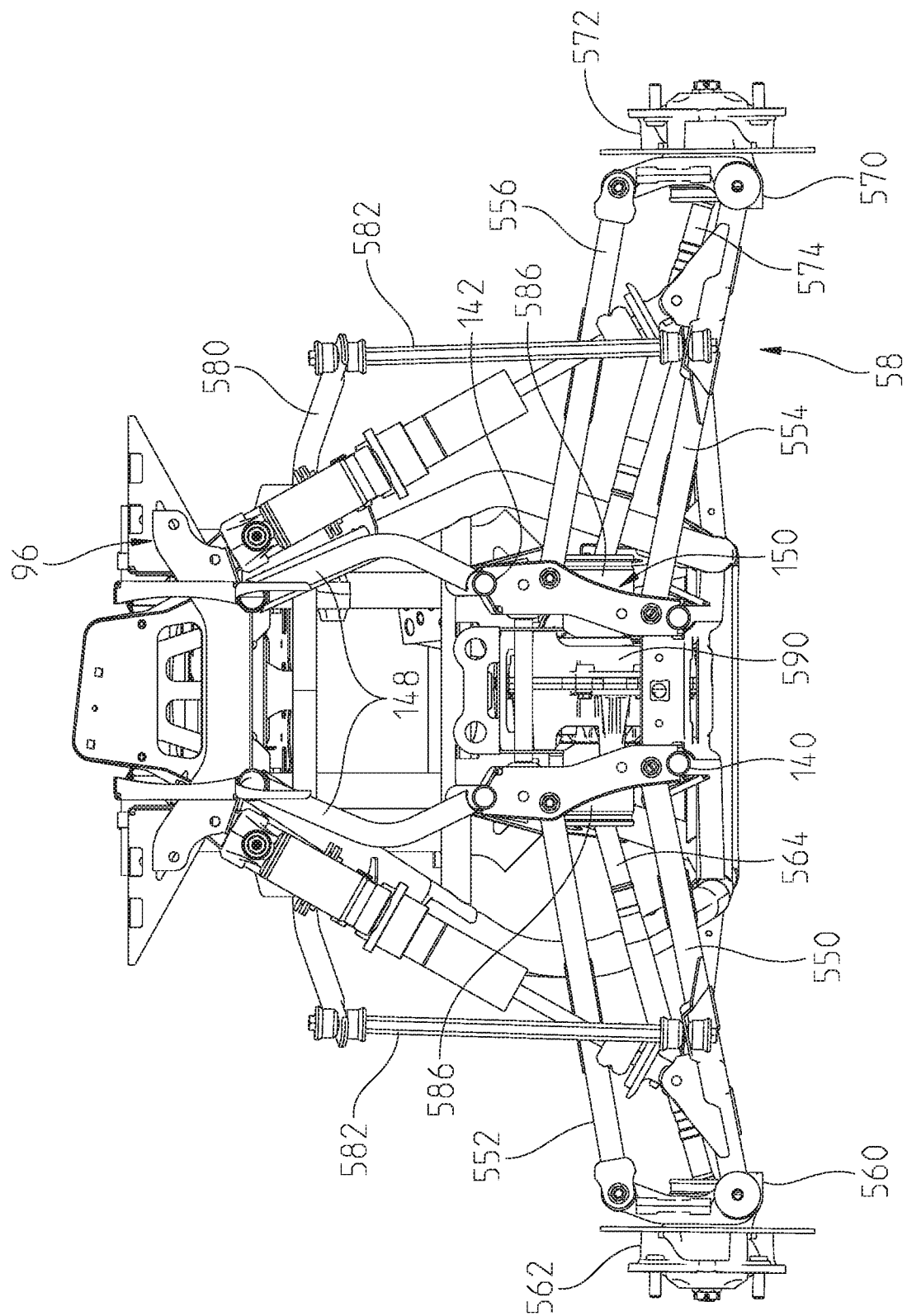
FIG. 26 shows a rear view of the rear suspension of a 55" wide ATV.
Figure 27:
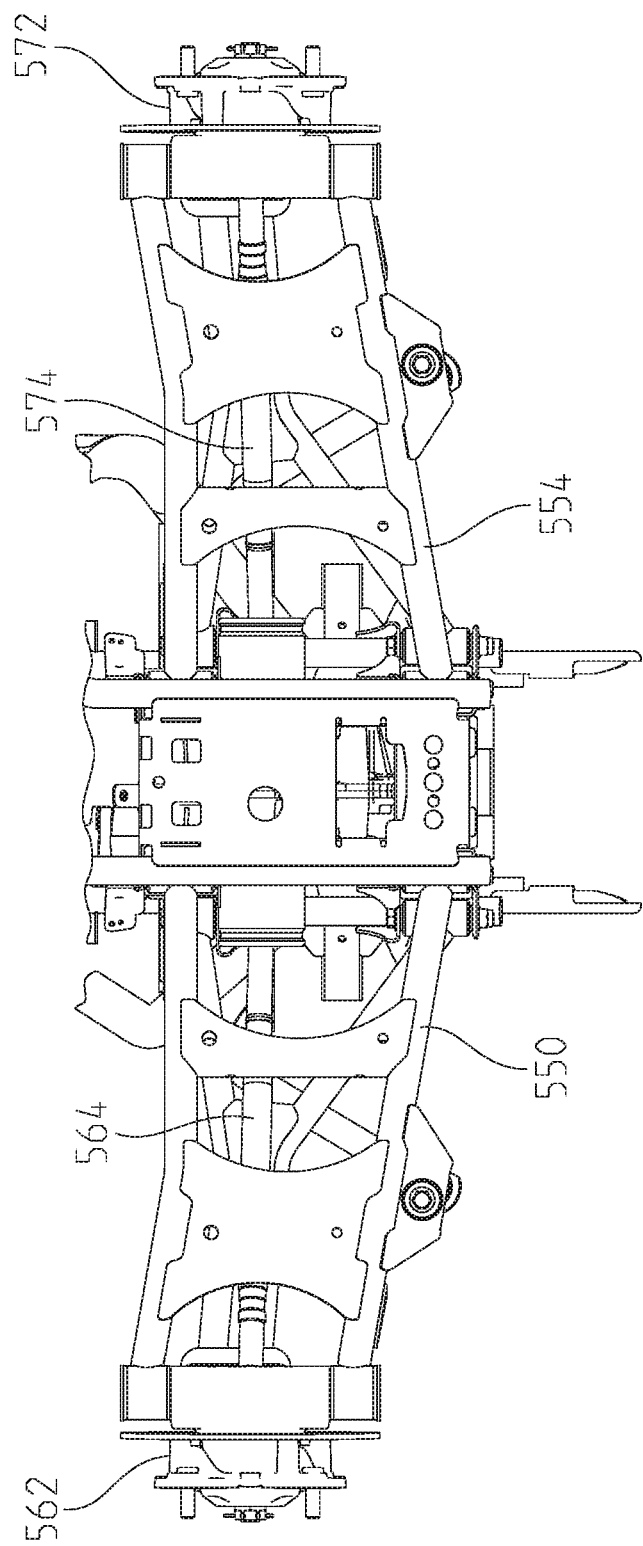
FIG. 27 shows a bottom view of the suspension of FIG. 24.

With reference now to FIGS. 24 and 25, the front suspension of the 48" and 55" vehicles will be described. With reference first to FIG. 24, the 55 inch vehicle is shown where the front left wheel is turned to the maximum left position, to a rotation of $\beta_5=35°$. Due to the fact that the half shafts 256 sweep forward on the 55" vehicle (FIG. 22) the first contact between the CV joint 250 (FIG. 13) and the half shaft 256, would be at the rearward side of the CV joint 250. Thus the upstanding post 284 on the 55" vehicle contacts the rear contact surface 270 to form the extreme position for the 55" vehicle.

With reference now to FIG. 25, the 48 inch vehicle is shown where the front left wheel is turned to the maximum right position, to a rotation of $\beta_6=35°$. Due to the fact that the half shafts 256' sweep rearward on the 48" vehicle (FIG. 23), the first contact between the CV joint 250 (FIG. 13) and the half shaft 256', would be at the forward side of the CV joint 250. Thus the upstanding post 284 on the 48" vehicle contacts the front contact surface 268 to form the extreme position for the 48" vehicle.

It should also be understood that the knuckles 224, hubs 240 and the couplings 276 are identical for the 48" and 55" vehicles and that the stops 268, 270 are defined for providing the extreme position for both vehicles.

With reference now to FIGS. 26-31, the rear suspension 58 of the ATV 2 will be described. With reference first to FIGS. 24 and 25, the suspension of the 55" vehicle will be described. As shown, the suspension 58 is comprised of a left lower A-arm 550, a left upper A-arm 552, a lower right A-arm 554 and a right upper A-arm 556. The left A-arms 550, 552 are coupled to a knuckle 560 which retains a left rear wheel hub 562. Wheel hub 562 is driven by a rear left half shaft 564. The right A-arms 554 and 556 are coupled to a right rear knuckle 570 and a right rear wheel hub 572 where wheel hub 572 is driven by a right rear half shaft 574. A torsion bar 580 couples the lower A-arms 550, 554 by way of vertical posts 582. As shown, half shafts 564, 574 are driven by couplings 586 of a final drive 590.

Figure 28:
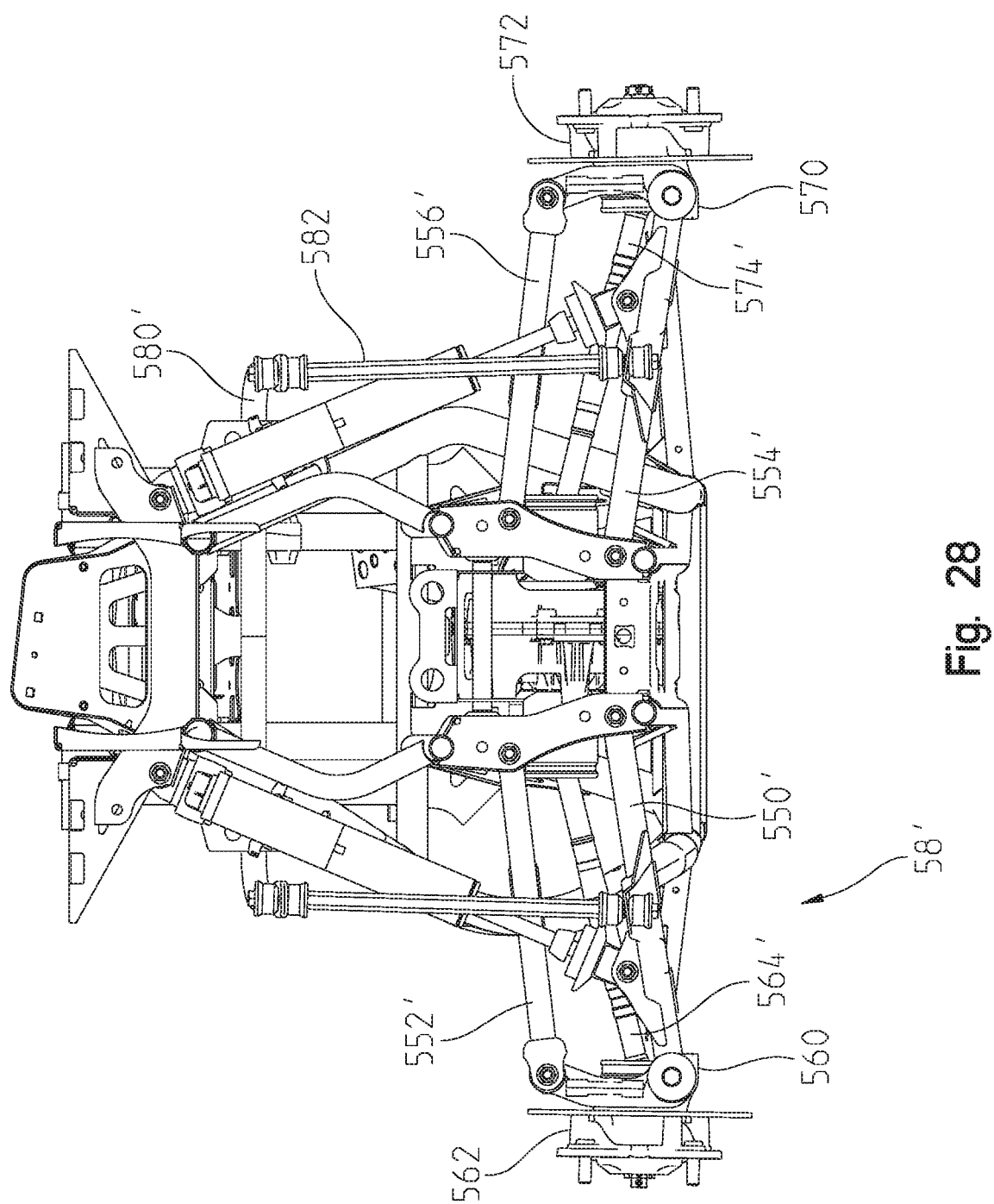
FIG. 28 shows a rear view of the 48" rear suspension.
Figure 29:
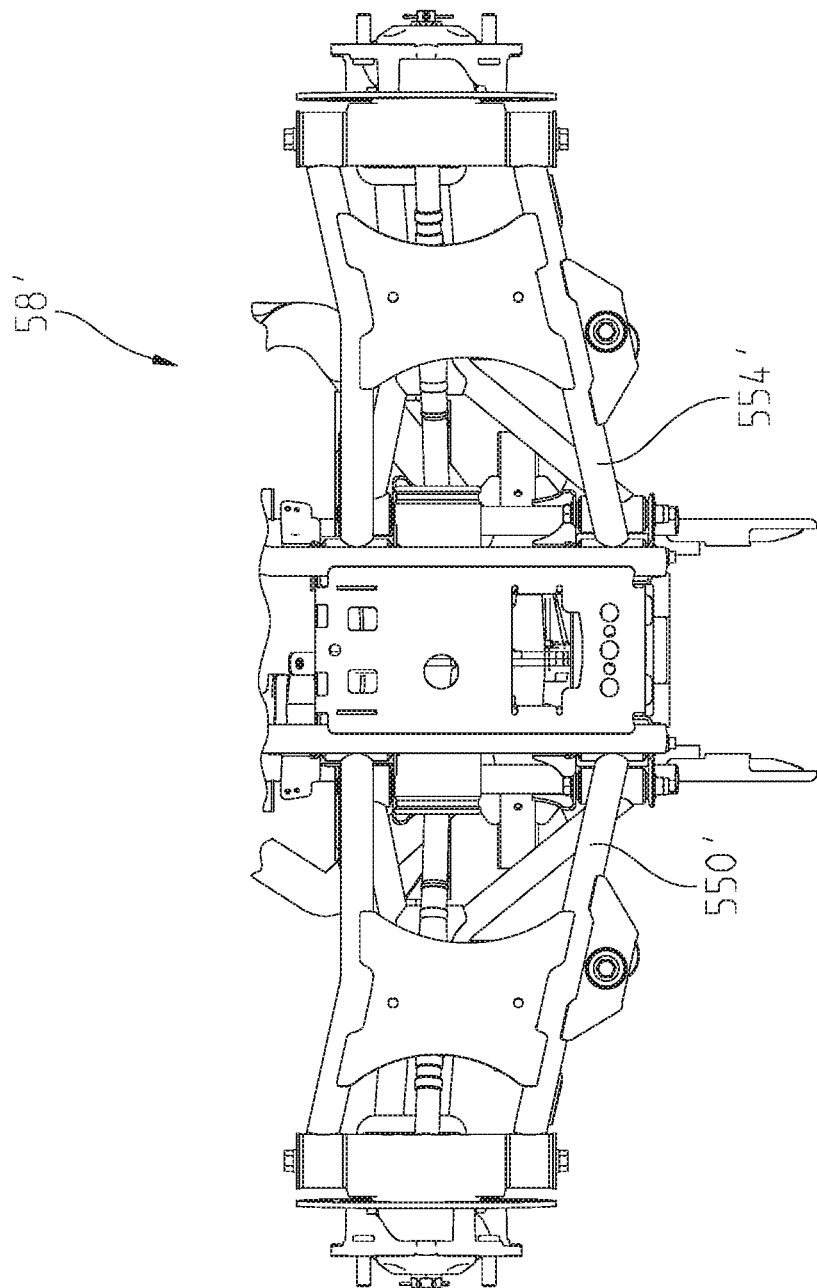
FIG. 29 shows a bottom view of the suspension of FIG. 26.
Figure 30:
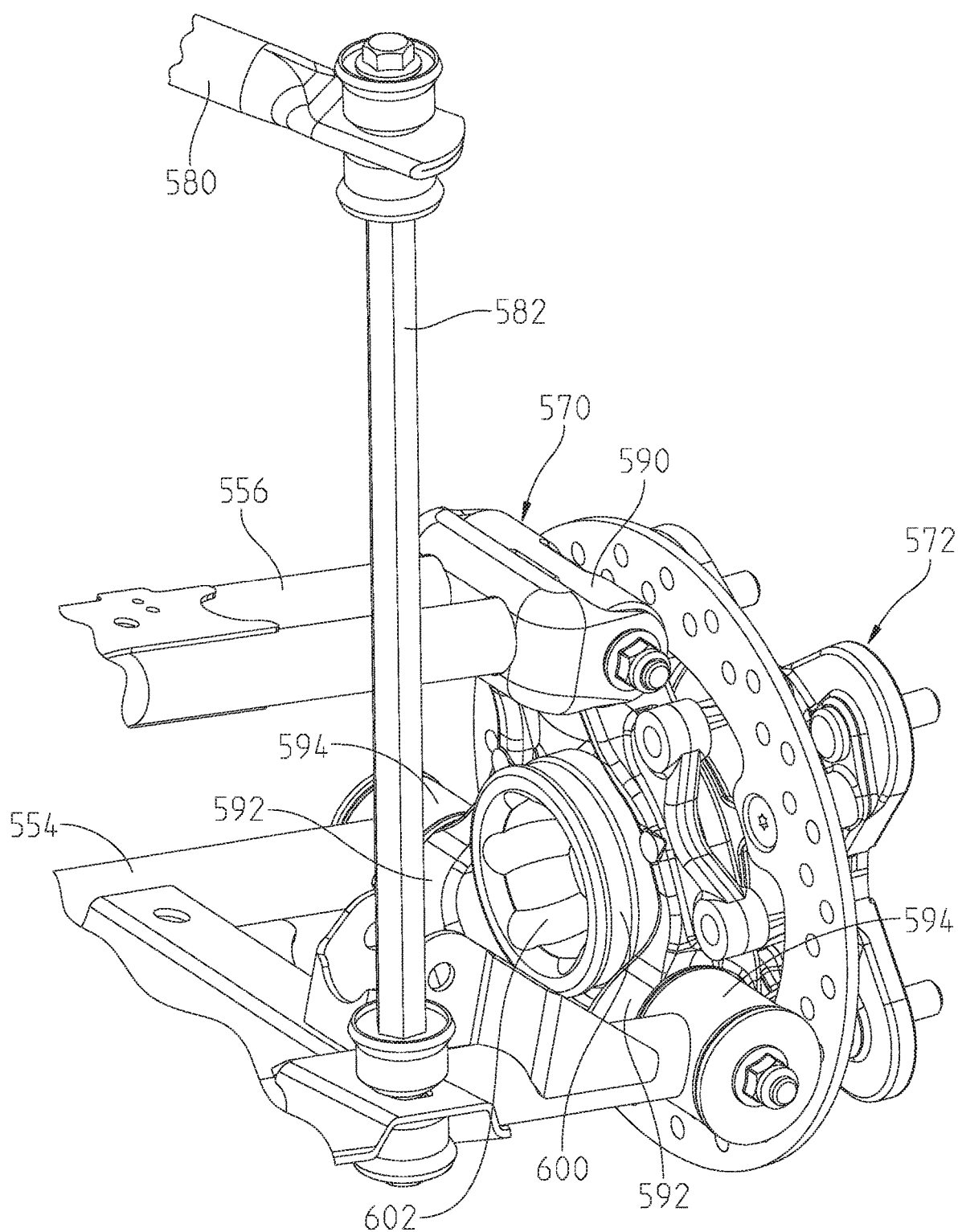
FIG. 30 shows a right rear perspective view of the right rear wheel hub.

With reference now to FIGS. 28 and 29, the rear suspension 58' for the 48" vehicle will be described. As with the front suspension, the majority of the components of the vehicle remain the same, but the left A-arms 550', 552' and half shaft 564' are replaced to compensate for the vehicle width. Similarly, the right-hand side suspension is also changed with lower A-arm 554', upper A-arm 556' and half shaft 574' having the reduced dimensions like the left-hand side. The torsion bar 580' is also different to accommodate the width of the vehicle.

With reference now to FIG. 28, the coupling between the A-arms and the knuckle will be described. As shown in FIG. 28, the right rear suspension is shown where A-arms 554 and 556 are coupled to knuckle 570. This is also the same knuckle and wheel hub used on the 48" vehicle and mirror images of the left-hand side wheel hub. The knuckle 570 includes a single elongate coupling 590 at the upper end thereof for coupling to upper A-arm 556 and includes two lower couplings at 592 for attachment of A-arm couplings 594. Wheel hub 572 includes a constant velocity joint 600 extending through the knuckle 570 which includes a drive profile 602 for matching with a constant velocity joint on half shaft 574. As shown in FIG. 28, the coupling points 592 are raised relative to the constant velocity coupling 600 such that the top of the coupling points 594 are higher than the inner geometry 602.

Figure 31:
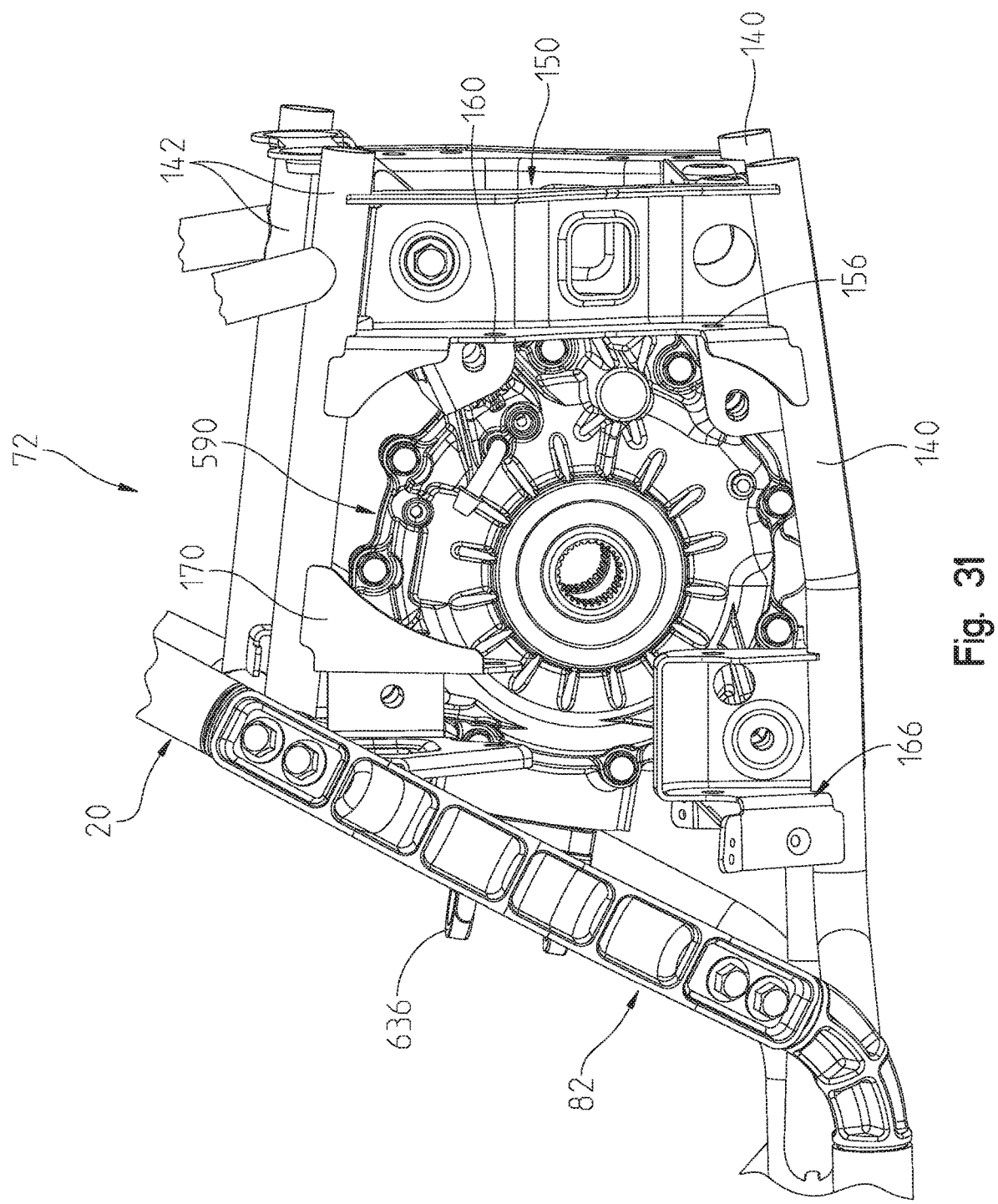
FIG. 31 shows a left rear perspective view of the mounting of the rear final drive and the frame of the ATV.

With reference now to FIG. 31, the rear final drive 590 is shown mounted in the rear frame portion 72 positioned above frame tubes 140 and below frame tubes 142. Rear suspension mounts 150, 166 and 170 are shown in greater detail. Final drive 590 is shown positioned adjacent to forging 82 which may be removed to access the final drive 590.

With respect now to FIGS. 32-35, the exhaust system 52 will be described in greater detail. As shown, exhaust system 52 includes an exhaust pipe 610 coupled to engine 612 at a front end thereof, and extending rearwardly past continuously variable transmission (CVT) 614 to an elbow 616, and then to a front end of muffler 620. As shown, muffler is centered in the vehicle frame 20 above tube 146, intermediate tubes 80c and below tubes 90. As shown best in FIG. 32, muffler 620 includes a muffler mounting post 630, having post portions 632 extending into apertures 174 (FIG. 35) of muffler mount 172. The muffler 620 is centrally mounted because with the extended travel of suspension the muffler 620 cannot be packaged in the wheel well at full rebound/jounce.

Figure 32:
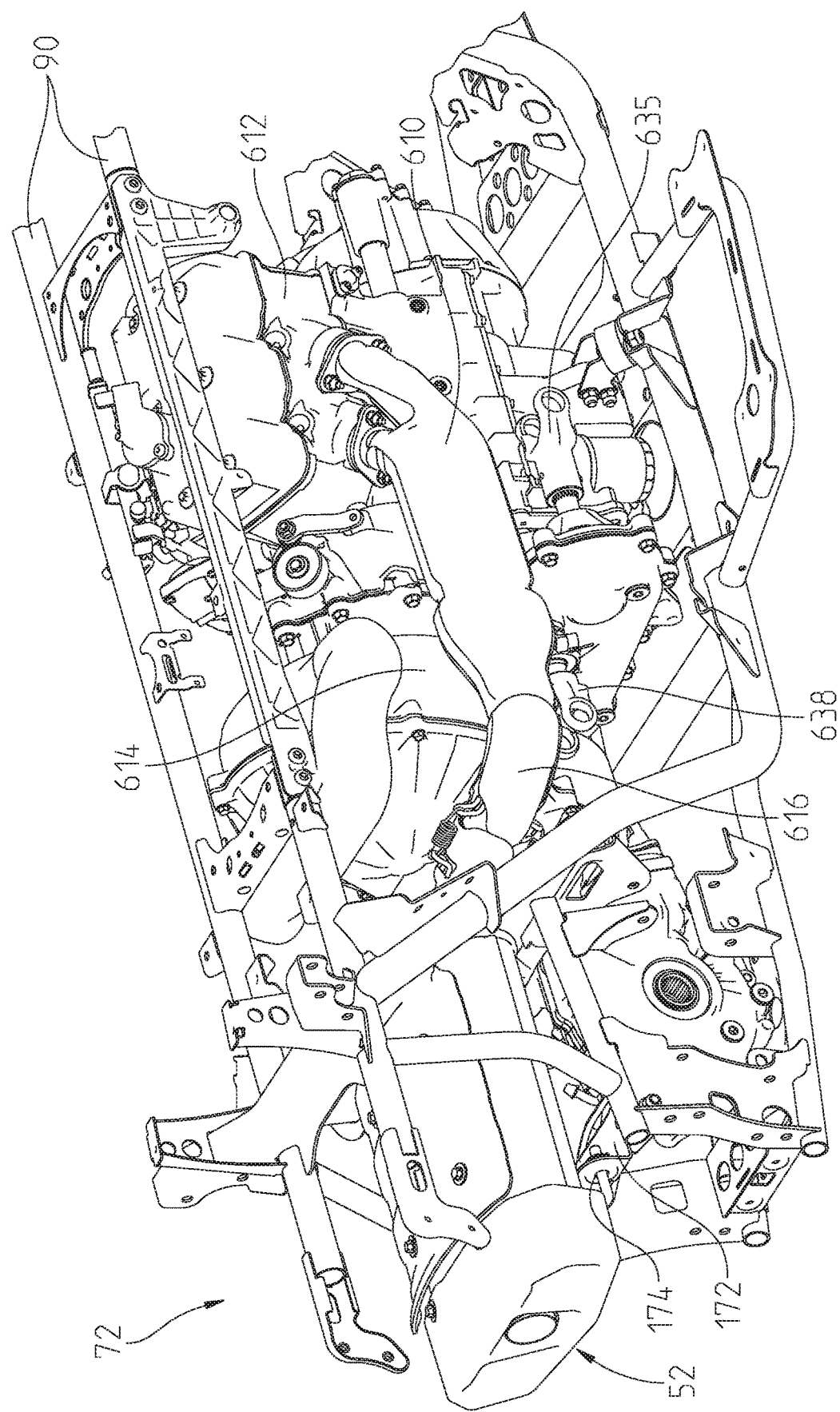
FIG. 32 shows a right rear perspective view showing the engine mounting together with the exhaust routing for the ATV frame.
Figure 33:
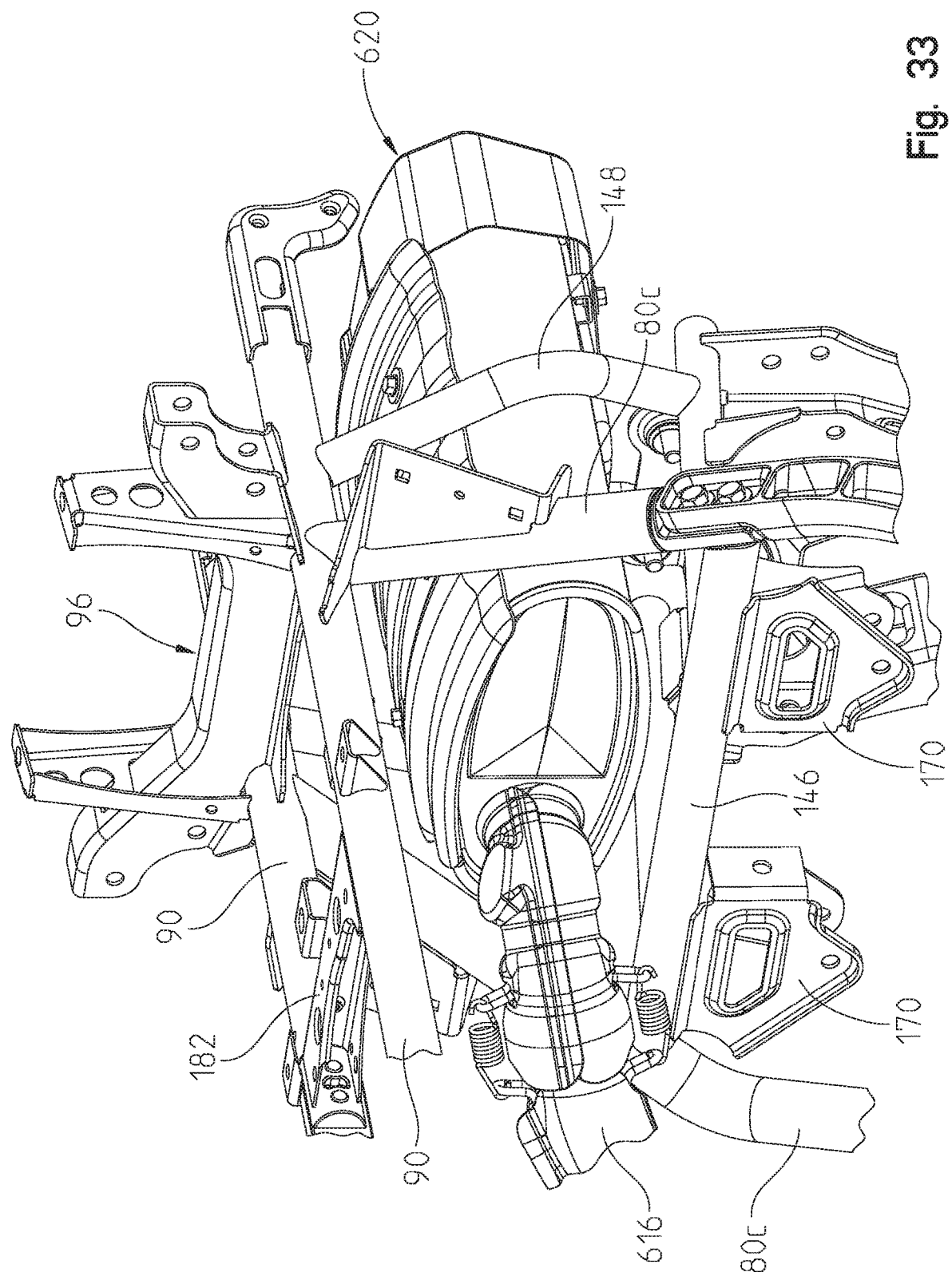
FIG. 33 shows a front left perspective view of the ATV muffler of FIG. 32.
Figure 34:
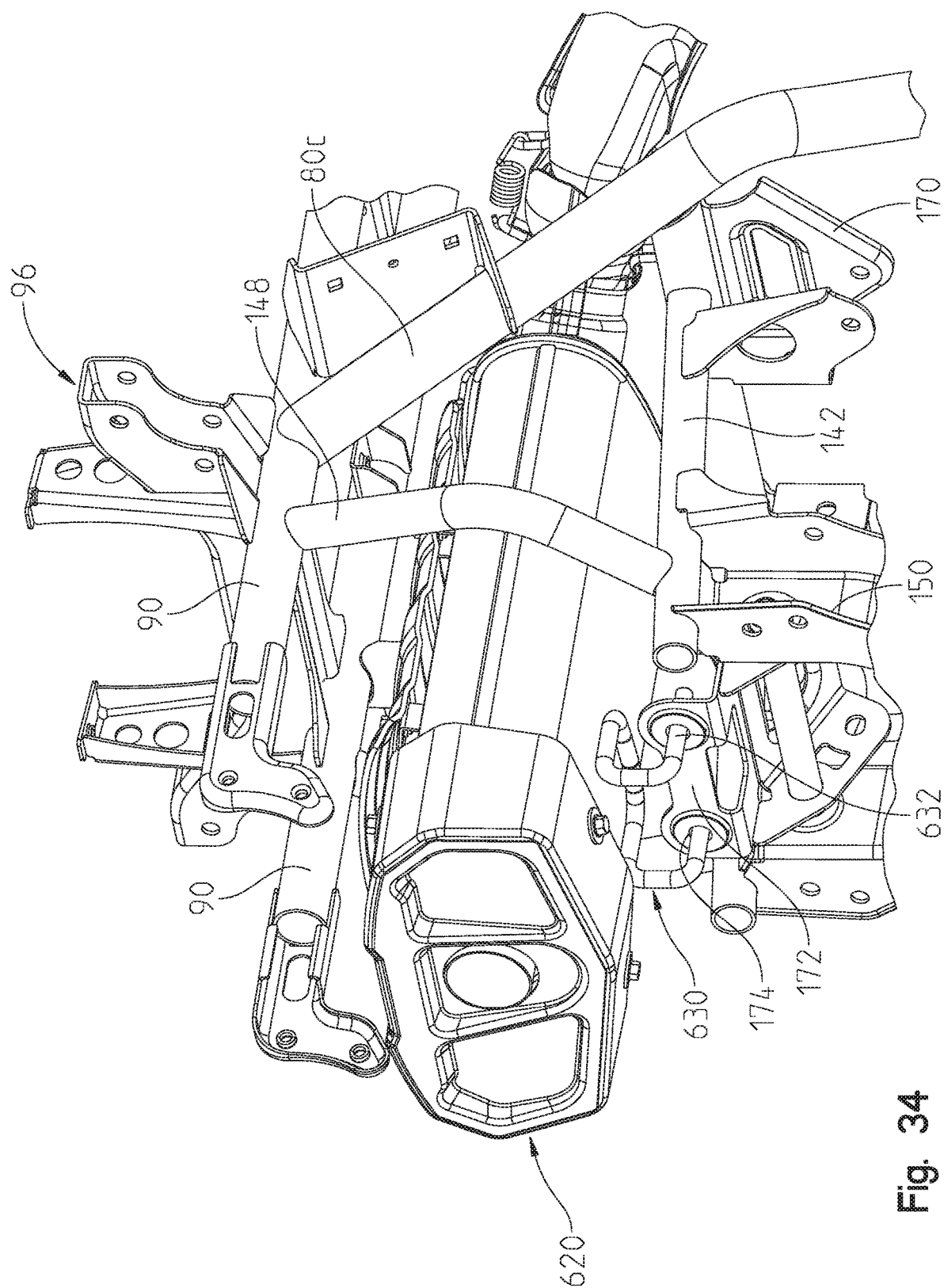
FIG. 34 shows a right rear view of the muffler of FIG. 31.
Figure 35:
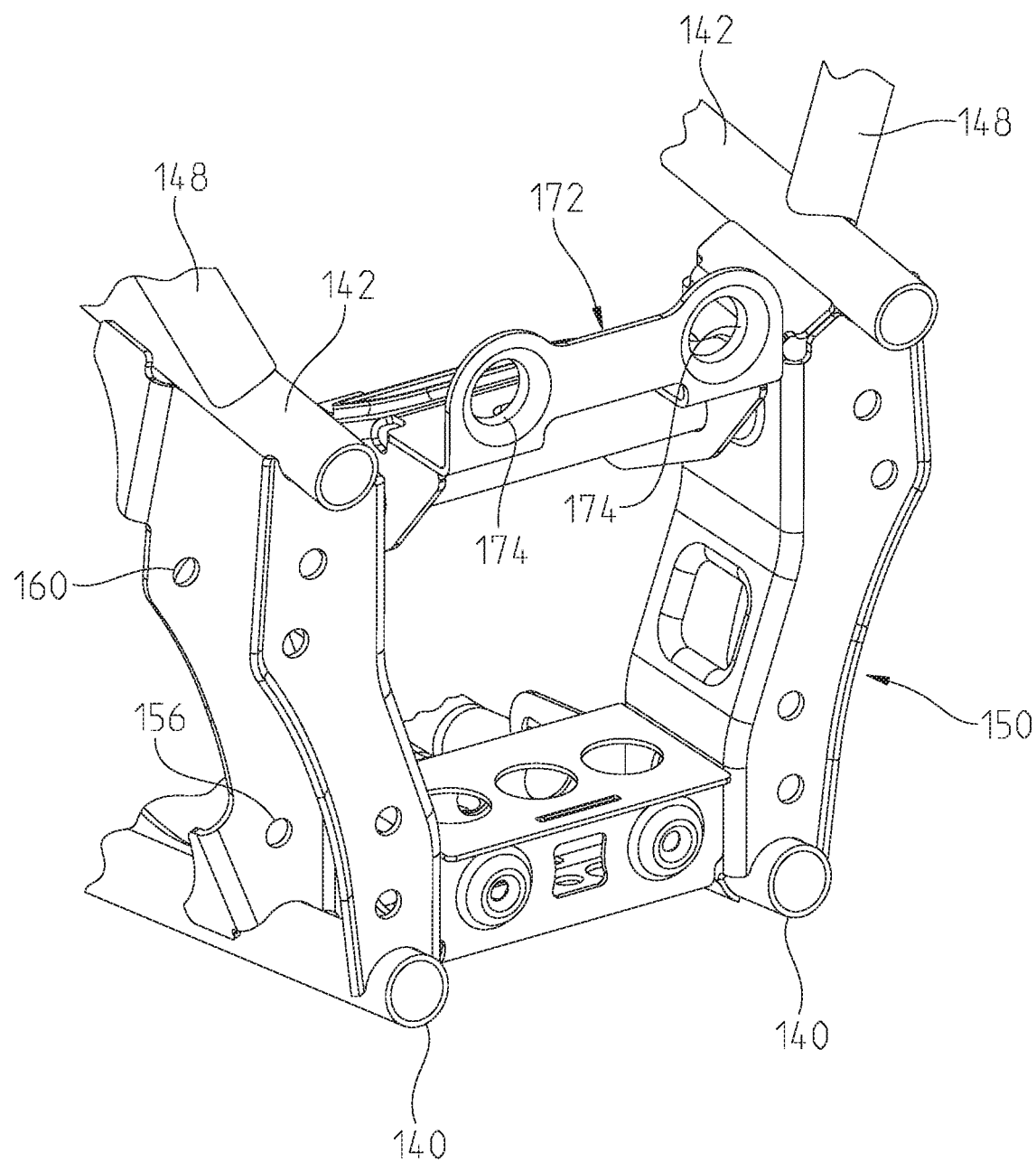
FIG. 35 shows a rear left perspective view of the hitch mount on the ATV.

It should be understood that the vehicle 2 includes front and rear drive shafts coupled between U-joint 634 of front drive 190 (FIG. 15) and output U-joint 635 (FIG. 32); and between U-joint 636 of rear drive 590 (FIG. 31) and output U-joint 638 (FIG. 32). The drive shafts are similar to those described in U.S. Pat. No. 9,873,316, the subject matter of which is incorporated herein by reference.

Figure 36:
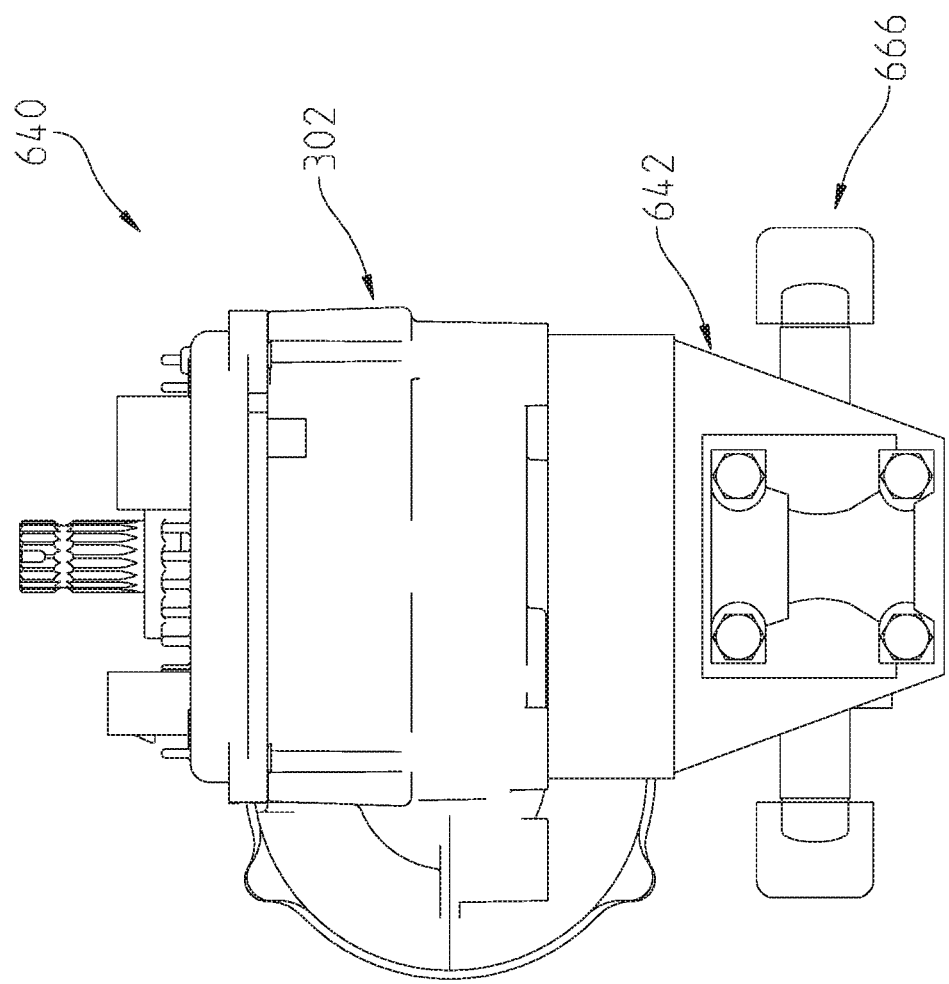
FIG. 36 is a front view of an alternate rack and pinion steering system.
Figure 37:
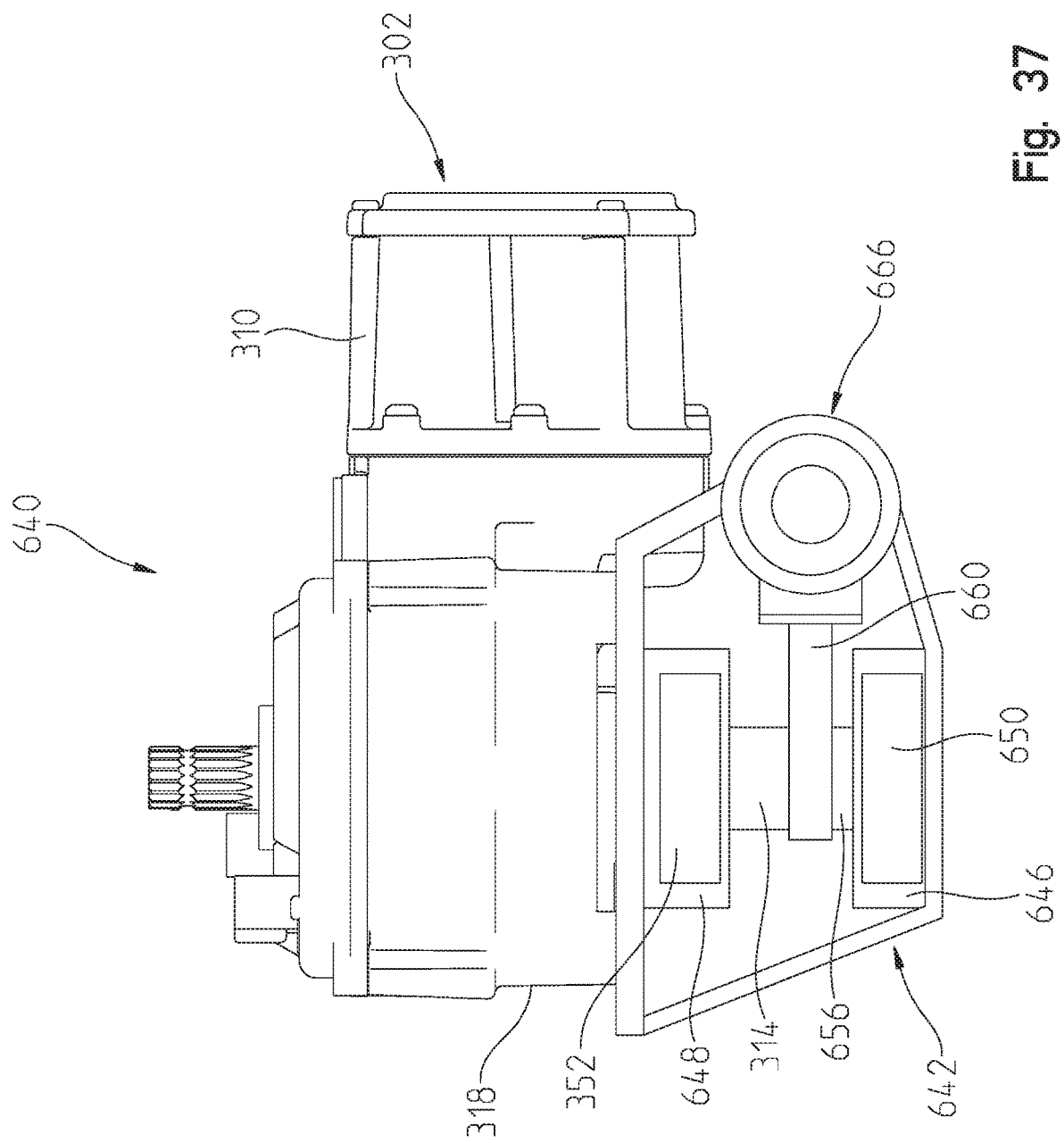
FIG. 37 is a left hand side view of the rack and pinion steering system of FIG. 36.
Figure 38:
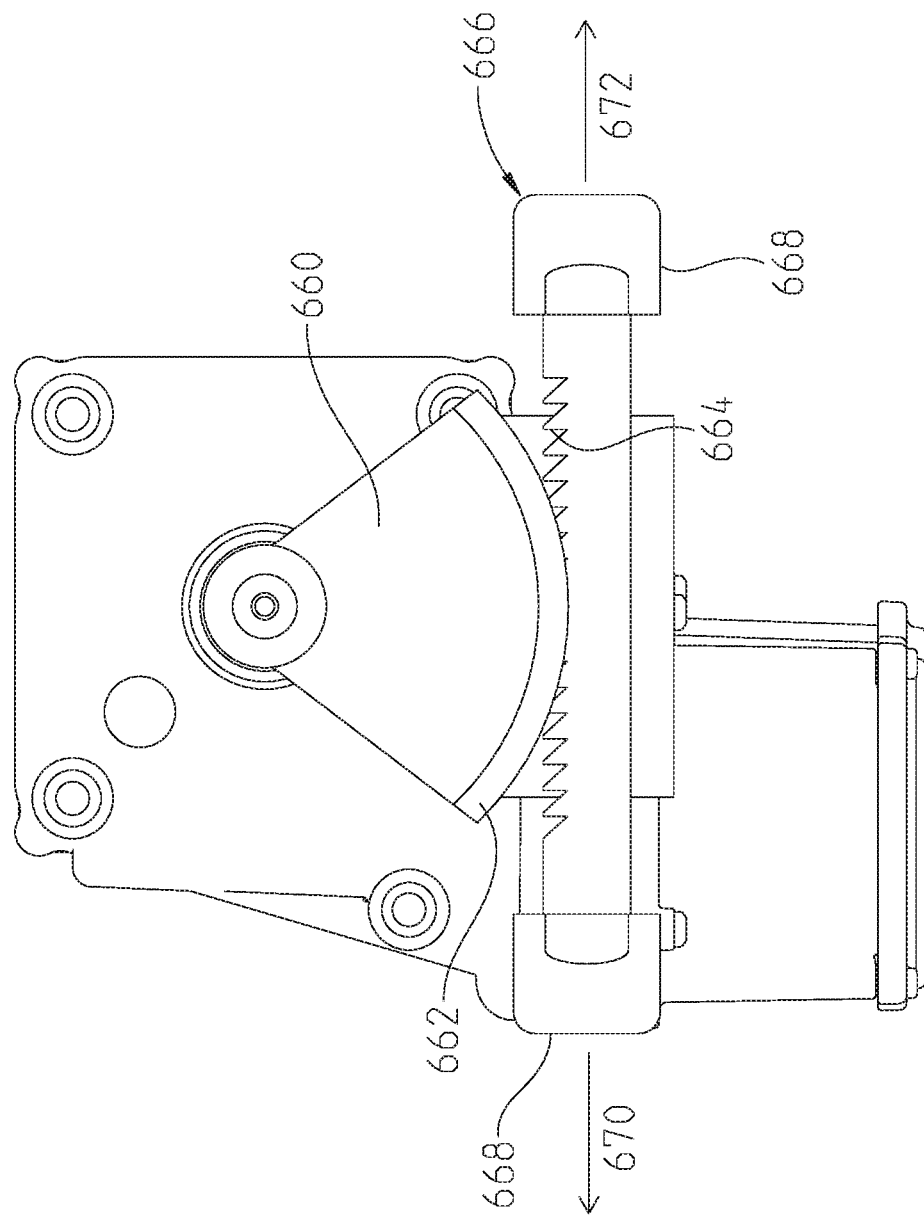
FIG. 38 is a bottom view of the rack and pinion steering system of FIG. 36.

With reference now to FIGS. 36-38, an alternate steering system is shown as a rack and pinion system 640 which is an alternative to the steering system shown in FIG. 18. Rack and pinion system 640 utilizes the power steering motor 302 as disclosed in the embodiment of FIG. 18, but couples to it a rack and pinion subassembly 642. As shown, subassembly 642 includes a housing 644 having bearing covers 646 and 648 housing bearings 650, 652. Bearings 650 and 652 support a stub shaft 656 which includes a splined internal shaft which couples to splined drive shaft 314 of power steering motor 310. A pinion 660 is coupled to stub shaft 656, and as best shown in FIG. 38, pinion 660 has an arcuate shape at 662 having gear teeth which mesh with teeth 664 of a rack 666. The rack includes couplers 668 which couple to steering arms 222 (FIG. 18) as opposed to the utilization of pitman arms 350, 420. Thus, as shown in FIG. 38, when pinion 660 rotates in a clockwise direction, rack 666 moves linearly in the direction of arrow 670 and when pinion 660 rotates in a counterclockwise direction, rack 666 moves linearly in the direction of arrow 672.

Figure 39:
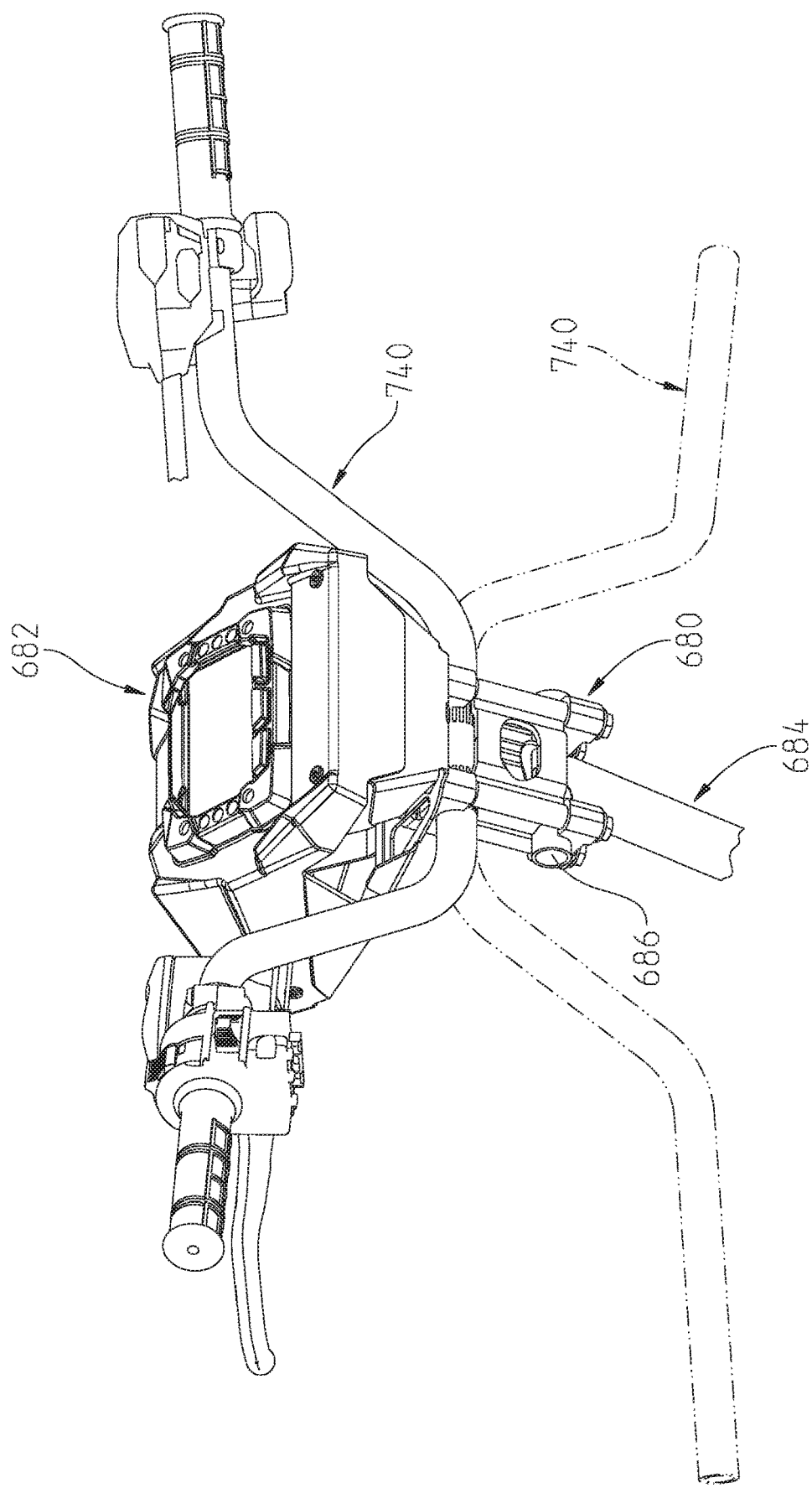
FIG. 39 is a left rear view of a riser block assembly usable with the handle bars.

With reference now to FIGS. 39 and 40, a steering riser block assembly 680 and an adjustable instrument cluster 682 will be described herein. As shown, riser block assembly 680 is coupled to an alternate steering arm 684 having a T-shaped post at 686. Riser block assembly 680 includes the main body portion 690, which in the disclosed embodiment is an aluminum block extruded in the direction of apertures 692 in post 694. Block 690 includes an upper surface 696 and a lower surface 698 which receives upper clamps 700 and lower clamps 702 respectively. Lower clamps 702 include an arcuate opening at 706 for placement against T-shaped post 686 whereby fasteners 708, 710 may be utilized to attach clamps 702 to bottom surface 698 trapping T-shaped post 686 therebetween. Lower end of main body portion 690 includes an arcuate opening at 712 to receive the T-shaped post 686. It should be appreciated that a lower end of aperture 692 is threaded, to receive threads on fasteners 708.

As shown best in FIG. 40, instrument cluster 682 includes a bracket 716 including a lower plate portion 718 having apertures 720. Apertures 720 align with apertures 722 of upper clamps 700. Thus, fasteners 726 may be received through apertures 720 of bracket 716, through apertures 722 of clamps 700 into the upper end of apertures 692. It should be appreciated that the upper ends of apertures 692 are also threaded to receive threads on fasteners 726. Thus, when bracket 716 is coupled to riser block 690, handlebar 740 is coupled therebetween and upper clamps 700 and riser block 690 grips a knurled surface 742 to retain the position of the handlebars 740. Upper end on main housing 690 includes an arcuate opening 744 and clamp 700 includes an arcuate opening 745 to grip knurled surface 742. Bracket 716 includes a plurality of bracket arms 746, 748, 750 which allows coupling of upper housing 760 of pod 682 by way of fasteners 762 to bracket 716.

Thus, given the geometry of the riser block 690, the riser block 690 may rotate towards and away from the rider on T-shaped post 686 which moves handlebars 740 towards or away from the rider to accommodate the ergonomic feel for different sized riders. This also adjusts the pod 682 to accommodate different sized riders. Furthermore, the riser block 690 allows the handlebars 740 to be rotated downwardly in a stored or shipped position as shown in the phantom lines of FIG. 39.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of making multiple widths of all-wheel drive vehicles, comprising the steps of:
   providing a frame having a front portion and a rear portion;
   providing a power train and coupling the power train to the frame, the power train comprising a primary motive unit, a transmission, a front final drive, a rear final drive and couplings between the transmission and the front and rear final drives;
   providing a plurality of front and rear suspension components of different lengths;
   providing a plurality of front and rear half shafts of different lengths;
   selecting sets of front and rear suspension components and front and rear half shafts to define a measured distance from a longitudinal centerline of the vehicle;
   providing front and rear wheels, where a distance measured from outside the front and rear wheels is different for the different sets;
   providing front knuckles coupling the front wheels to the selected front suspension components; and
   providing steering stops usable with all of the plurality of front suspension components of different lengths.

2. The method of claim 1, further comprising the steps of:
   providing a power steering unit;
   providing a plurality of steering arms of different lengths; and
   selecting a steering arm to cooperate with the set of front and rear suspension components and front and rear half shafts.

3. The method of claim 1, wherein:
   providing the plurality of front and rear suspension components of different lengths includes providing first front and rear suspension components having a first length and providing second front and rear suspension components having a second length; and
   providing the plurality of front and rear half shafts of different lengths includes providing first front and rear half shafts having a first length and providing second front and rear half shafts having a second length, wherein, together, the first front and rear suspension components and the first front and rear half shafts provide a first width vehicle and, together, the second front and rear suspension components and the second front and rear half shafts provide a second width vehicle, where the first width is less than the second width.

4. The method of claim 3, wherein on the first width vehicle, the first front and rear half shafts sweep rearwardly to define a first wheelbase of the first width vehicle.

5. The method of claim 4, wherein on the second width vehicle, the second front and rear half shafts sweep forwardly to define a second wheelbase of the second width vehicle, wherein the first wheelbase is less than the second wheelbase.

6. The method of claim 5, wherein the steering stops are comprised of a first stop member positioned on each of the front right and left suspension; and a second stop member positioned on each of the right and left knuckles; wherein the first and second stop members cooperate to provide extreme rotational positions.

7. The method of claim 6, wherein one of the first and second stop members is defined as an upstanding post.

8. The method of claim 7, wherein the other of the first and second stop members is defined as an arcuate slot in which the upstanding post rotates, the arcuate slot includes stop surfaces profiled for contacting sides of the upstanding post, wherein the upstanding post contacts different stop surfaces of the arcuate slot for the first and second vehicle.

9. The method of claim 3, wherein the first width vehicle has a maximum width in the range of 45-51".

10. The method of claim 9, wherein the first width vehicle has a maximum width of 48".

11. The method of claim 3, wherein the second width vehicle has a maximum width in the range of 52-58".

12. The method of claim 11, wherein the second width vehicle has a maximum width of 55".

13. The method of claim 1, wherein the frame is defined by upper and lower longitudinally extending tubes.

14. The method of claim 13, wherein the front and rear suspension components are defined by upper and lower A-arms extending generally transversely from the frame.

15. An all-terrain vehicle (ATV), comprising:
a frame;
ground engaging members supporting the frame, including front and rear ground engaging members;
front right and left suspension;
a front wheel steering mechanism comprising right and left knuckles pivotally coupled to the respective front right and left suspension;
a power steering unit coupled to the frame, the power steering unit including an output shaft which is laterally offset from a vertical centerline of the vehicle;
right and left steering arms coupled to respective right and left knuckles, and a linkage coupling the output shaft to the steering arms, where the right and left steering arms are substantially the same length;
the linkage comprising:
a drive pitman arm coupled to the output shaft at a first end, and coupled to one of the front right or left steering arms at a second end;
a driven pitman arm coupled to the drive pitman arm by way of a drag link;
wherein the steering arms are coupled to the drive and driven pitman arms at a first location, and the drag link is coupled to the drive and driven pitman arms at a second location.

16. The ATV of claim 15, wherein the power steering unit output shaft is laterally offset on a left hand side of the vertical centerline of the vehicle.

17. The ATV of claim 15, wherein the front right and left suspension each includes an upper and lower A-arm, and the upper A-arm is defined by front and rear tubular members, wherein the rear tubular member is jogged upwardly to prove clearance over the steering arms.

18. The ATV of claim 15, wherein the front wheel steering mechanism further comprising a steering post coupled to the power steering unit, and further comprising a riser block coupled to the steering post and a steering actuation member coupled to the riser block, the riser block being movable forwardly and rearwardly to adjust the position of the steering actuation member.

19. The ATV of claim 18, wherein the steering actuation member is a handle bar.

20. The ATV of claim 15, wherein the first location is intermediate a point of rotation for the drive and driven pitman arms and the second location.

21. An all-terrain vehicle (ATV), comprising:
a frame;
ground engaging members supporting the frame, including front and rear ground engaging members;
front right and left suspensions;
front wheel steering mechanisms including right and left knuckles pivotally coupled to the respective front right and left suspension;
a power steering unit coupled to the frame, the power steering unit including an output shaft which is coupled to the right and left knuckles for steering;
a first stop member positioned on each of the front right and left suspension; and
a second stop member positioned on each of the right and left knuckles;
wherein the first and second stop members cooperate to provide extreme rotational positions, and one of the first and second stop members is defined as an upstanding post and the other of the first and second stop members is defined as an arcuate slot in which the upstanding post rotates.

22. The ATV of claim 21, wherein the arcuate slot includes stop surfaces profiled for contacting sides of the upstanding post.

23. The ATV of claim 22, wherein the upstanding post is in the profile of a shark fin.

24. The ATV of claim 23, wherein the front right and left suspension each include a first A-arm coupled to the right and left knuckles, and the upstanding post and arcuate slot are positioned adjacent to an intersection of the knuckle and the A-arm.

25. The ATV of claim 24, wherein the upstanding post is positioned on the A-arm adjacent the knuckle.

26. The ATV of claim 25, wherein the upstanding post is progressively thinner from a position adjacent the A-arm upwardly towards an end thereof.

27. An all-terrain vehicle (ATV), comprising:
a frame;
ground engaging members supporting the frame, including front and rear ground engaging members;
front right and left suspensions; and
a power steering unit coupled to the frame at a position directly adjacent the front right and left suspensions, the power steering unit comprising:
a power steering motor having an output shaft wherein the power steering motor is coupled to the frame at a position directly adjacent the front right and left suspensions;
a rack and pinion subassembly having a housing and a pinion gear drivingly coupled by the output shaft, and a rack drivingly coupled to the pinion gear;
wherein the pinion gear has an arcuate shape defined by a first linear side, a second linear side, and a curved end extending between the first and second linear sides;
a steering post providing torsional input to the power steering unit; and steering arms coupled to the rack;
wherein torsional input to the power steering unit causes rotation of the output shaft and pinion gear, and linear movement of the rack and steering arms.

28. The ATV of claim 27, wherein the power steering unit further comprises a stub shaft operably coupled to the output shaft, and the pinion gear is operably coupled with the stub shaft and the output shaft.

29. The ATV of claim 28, wherein the housing of the rack and pinion subassembly includes at least one bearing, and the stub shaft is supported by the at least one bearing.

* * * * *